United States Patent [19]
Tamaoki et al.

[11] Patent Number: 5,935,772
[45] Date of Patent: Aug. 10, 1999

[54] SILVER HALIDE PHOTOGRAPHIC LIGHT-SENSITIVE MATERIAL AND PACKAGE THEREOF

[75] Inventors: Hiroshi Tamaoki; Keiji Mihayashi, both of Kanagawa, Japan

[73] Assignee: Fuji Photo Film Co., Ltd., Kanagawa, Japan

[21] Appl. No.: 08/752,563

[22] Filed: Nov. 21, 1996

[30] Foreign Application Priority Data

Nov. 21, 1995 [JP] Japan ................................. 7-325252

[51] Int. Cl.$^6$ ............... G03C 1/36; G03C 1/09; G03C 1/34; G03C 3/00
[52] U.S. Cl. ................ 430/501; 430/496; 430/607; 430/613; 430/606; 430/567; 430/523; 430/140
[58] Field of Search .................... 430/607, 613, 430/606, 567, 523, 140, 496, 501

[56] References Cited

U.S. PATENT DOCUMENTS

| | | | |
|---|---|---|---|
| 4,330,606 | 5/1982 | Sobel et al. ........................ | 430/17 |
| 4,339,515 | 7/1982 | Schranz et al. ..................... | 430/17 |
| 4,835,093 | 5/1989 | Janusonis et al. .................. | 430/567 |
| 4,933,272 | 6/1990 | McDugle et al. .................... | 430/567 |
| 5,037,732 | 8/1991 | McDugle et al. .................... | 430/567 |
| 5,206,131 | 4/1993 | Matsuda et al. .................... | 430/559 |
| 5,563,025 | 10/1996 | Ishii et al. ...................... | 430/503 |
| 5,647,552 | 7/1997 | Takatori .......................... | 242/348.4 |

FOREIGN PATENT DOCUMENTS

A-2-219051  8/1990  Japan ............................. G03C 1/035

Primary Examiner—Mark F. Huff
Attorney, Agent, or Firm—Sughrue, Mion, Zinn, Macpeak & Seas, PLLC

[57] ABSTRACT

A silver halide photographic light-sensitive material comprising a support having thereon at least one light-sensitive silver halide emulsion layer and at least one light-insensitive layer, wherein at least one of the at least one of light-sensitive silver halide emulsion layer is a light-sensitive silver halide emulsion layer in which 50% or more of the entire projected area of all silver halide grains are tabular silver halide grains having an aspect ratio of 2.0 or more, at least a part of the tabular silver halide grains contains a desensitizer, and the light-sensitive material contains a compound represented by formula (A-I), (A-II) or (A-III); and a package obtained by housing the light-sensitive material in a specific cartridge.

18 Claims, 7 Drawing Sheets

SILVER HALIDE PHOTOGRAPHIC LIGHT-SENSITIVE MATERIAL AND PACKAGE THEREOF

FIELD OF THE INVENTION

The present invention relates to a silver halide photographic light-sensitive material (hereinafter sometimes referred to as a "light-sensitive material") and a package thereof, more specifically, the present invention relates to a silver halide photographic light-sensitive material improved in storability such that change in the photographic properties is reduced when the light-sensitive material is stored with age, excellent in sharpness and in the case of a multi-layer color light-sensitive material, improved in the image quality due to excellent interlayer effect as well as reduced in the coated silver amount, and a package of the light-sensitive material.

BACKGROUND OF THE INVENTION

In the photographic light-sensitive material for photographing, the silver halide grain is basically required to have capabilities of high sensitivity, low fogging and excellent graininess.

One of the techniques for improving the above-described basic capabilities is to use a silver halide emulsion comprising tabular silver halide grains as described, for example, in U.S. Pat. Nos. 4,439,520, 4,425,425 and 4,414,304.

To further improve the above-described basic capabilities, use of a silver halide emulsion comprising tabular silver halide grains containing a noble metal such as platinum, iridium palladium or rhodium, is described, for example, in JP-A-2-219051 (the term "JP-A" as used herein means an "unexamined published Japanese patent application").

Under these circumstances, it is known that when, for example, an electron capturing desensitizer is used, it traps electrons in a silver halide grain to reduce sensitivity and provide contrast. Therefore, a relatively large size silver halide grain can be reduced in sensitivity to give a contrast and as a result, an emulsion having a broad sensitivity region can be prepared using silver halide grains having the same halogen composition, the coated silver amount can be reduced, sharpness can be improved because light scattering in the light-sensitive layers can be suppressed due to the large size silver halide grain, and in the case of a color light-sensitive material, a superposed layer effect (sometimes called an interlayer effect or layer-to-layer effect) can be easily achieved, thereby improving color reproducibility and giving excellent improvement effect on the image quality.

Further, availability of reduction in the coated silver amount is very important because desilverization failures during the processing can be prevented and further, low costs result.

However, when the above-described light-sensitive material is stored with age, there arises a problem of change in the photographic properties such that sensitivity gradually increases and fog is intensified. Further, as described in JP-A-53-127714 and JP-A-58-143335, use of an electron trapping desensitizer disadvantageously brings about great change in the photographic properties. In particular, when the light-sensitive material is left in a car under the burning sun, these problems are more accelerated due to high temperature and come to be serious.

As described in the foregoing, conventional techniques cannot succeed in satisfying all improvements on storability and image quality such as sharpness and interlayer effect, of light-sensitive materials.

Use of a specific hydroxylamine derivative in a photographic light-sensitive layer is described, for example, in U.S. Pat. Nos. 4,339,515 and 4,330,606. These publications improve storability of a dye image produced by the coupling reaction of a coupler with an oxidation product of the color developing agent, however, they have no description nor suggestion of improvements on storability with age or image quality such as sharpness and interlayer effect of light-sensitive materials.

Further, as a means to improve storability with age of light-sensitive materials, a compound having an S-triazine (1,3,5-triazine) ring is known, for example, in JP-A-59-162546, to improve storability of a latent image when it is used in combination with a compound having an active vinyl group and, in JP-A-59-97134, to reduce fogging when it is used in combination with an emulsion comprising tabular silver halide grains. However, even this technique using a compound having an S-triazine (1,3,5-triazine) ring cannot prevent change in the photographic properties caused when a light-sensitive material containing silver halide is stored with age, and further this technique cannot improve sharpness and interlayer effect.

SUMMARY OF THE INVENTION

An object of the present invention is to provide a silver halide photographic light-sensitive material capable of preventing change in the photographic properties, such as increase of sensitivity and fog, when the light-sensitive material is stored with age, providing excellent sharpness and in the case of a color light-sensitive material, giving excellent interlayer effect to improve the image quality as well as reducing the coated silver amount.

Another object of the present invention is to provide a package housing the light-sensitive material.

Other objects and effects of the present invention will be apparent from the following description.

The present inventors have found that the above-described objects can be achieved by a silver halide photographic light-sensitive material comprising at least one light-sensitive silver halide emulsion layer containing an emulsion comprising silver halide grains in which 50% or more of the entire projected area of all silver halide grains are tabular silver halide grains having an aspect ratio of 2.0 or more and at least a part of the tabular grains containing a desensitizer, the layer containing the emulsion and/or a light-insensitive layer or other light-sensitive silver halide emulsion layer using a specific hydroxylamine-base compound, and also by a package obtained by housing the light-sensitive material in a specific cartridge. The present invention has been accomplished based on this finding.

The present invention relates to:

(1) A silver halide photographic light-sensitive material comprising a support having thereon at least one light-sensitive silver halide emulsion layer and at least one light-insensitive layer, wherein at least one of said at least one of light-sensitive silver halide emulsion layer is a light-sensitive silver halide emulsion layer in which 50% or more of the entire projected area of all silver halide grains are tabular silver halide grains having an aspect ratio of 2.0 or more, at least a part of said tabular silver halide grains contains a desensitizer, and said light-sensitive material contains a compound represented by formula (A-I), (A-II) or (A-III):

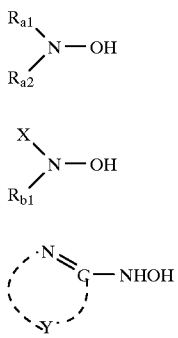

(A-I)

(A-II)

(A-III)

wherein in formula (A-I), $R_{a1}$ represents an alkyl group, an alkenyl group, an aryl group, an acyl group, an alkylsulfonyl group, an arylsulfonyl group, an alkylsulfinyl group, an arylsulfinyl group, a carbamoyl group, a sulfamoyl group, an alkoxycarbonyl group or an aryloxycarbonyl group, $R_{a2}$ represents a hydrogen atom or a group represented by $R_{a1}$, with the proviso that when $R_{a1}$ is an alkyl group, an alkenyl group or an aryl group, $R_{a2}$ is an acyl group, an alkylsulfonyl group, an arylsulfonyl group, an alkylsulfinyl group, an arylsulfinyl group, a carbamoyl group, a sulfamoyl group, an alkoxycarbonyl group or an aryloxycarbonyl group, and $R_{a1}$ and $R_{a2}$ may be combined with each other to form a 5-, 6- or 7-membered ring, with the proviso that an S-triazine ring is not formed, in formula (A-II), X represents a heterocyclic group excluding an S-triazine ring, $R_{b1}$ represents an alkyl group, an alkenyl group or an aryl group, and X and $R_{b1}$ may be combined with each other to form a 5-, 6- or 7-membered ring, with the proviso that an S-triazine ring is not formed, and in formula (A-III), Y represents a nonmetallic atom group necessary for forming a 5-membered ring together with —N=C—, or Y represents a nonmetallic atom group necessary for forming a 6-membered ring together with —N=C— group and the end of the group represented Y bonded to the carbon atom of the —N=C— group is a group selected from —N($R_{c1}$)—, —C($R_{c2}$)($Rc_{c3}$)—, —C($R_4$)=, —O— and —S—, where the left hand site of each group is bonded to the carbon atom of —N=C—, with the proviso that an S-triazine ring is not formed, and $R_{c1}$, $R_{c2}$, $R_{c3}$ and $R_{c4}$ each represents a hydrogen atom or a substituent;

(2) A silver halide photographic light-sensitive material as described in (1), wherein said desensitizer is at least one compound containing a metal atom belonging to Period 4, Period 5 or Period 6 of either Group 7, Group 8 or Group 9 and at least a part of said tabular silver halide grain is doped with said metal ion;

(3) A silver halide photographic light-sensitive material as described in (1) or (2), wherein a magnetic recording layer containing magnetic particles is provided on said support on the side opposite to the side having said emulsion layer; and (4) A package of a light-sensitive material comprising a cartridge body rotatably housing a spool wound around by a photographic light-sensitive material having an emulsion layer on a support, a leading end of said photographic light-sensitive material being able to be freely delivered outside said cartridge by rotation of said spool, said cartridge body having a photographic light-sensitive delivering passage with a light-shielding mechanism for delivering said photographic light-sensitive material, and said spool having a spool shaft having fixed to an inner side of respective edges thereof a pair of flanges each with a lip for holding said photographic light-sensitive material, wherein said photographic light-sensitive material is a silver halide photographic light-sensitive material described in any one of (1) to (3).

The present invention is a silver halide photographic material comprising at least one light-sensitive silver halide emulsion layer and at least one light-insensitive layer, at least one of light-sensitive silver halide emulsion layers containing an emulsion comprising silver halide grains in which 50% or more of the entire projected area of all silver halide grains are tabular silver halide grains having an aspect ratio of 2.0 or more and at least a part of the tabular grains containing a desensitizer, and the layer which contains the emulsion and/or a light-insensitive layer or other light-sensitive silver halide emulsion layer using a specific hydroxylamine-base compound.

By using a specific hydroxylamine-base compound in the light-sensitive layer containing silver halide grains specified as above and/or in a light-insensitive layer or other light-sensitive layer, the objects of the present invention can be satisfactorily attained, more specifically, change in the photographic properties to be caused when the light-sensitive material is stored with age, such as increase of sensitivity and fog, can be prevented to improve storability and further, excellent sharpness and in the case of a color light-sensitive material, excellent interlayer effect are provided to improve image quality.

A preferred embodiment of the present invention is such that the above-described desensitizer is at least one compound containing a metal atom belonging to Period 4, Period 5 or Period 6 of either Group 7, Group 8 or Group 9 and at least a part of tabular silver halide grains are doped with the metal ion, and by using the above-described specific hydroxylamine-base compound in the light-sensitive layer containing silver halide grains specified as above and/or in a light-insensitive layer or other light-sensitive layer, the objects of the present invention can be satisfactorily attained.

The objects of the present invention can be attained even in the case of a light-sensitive material having a magnetic recording layer containing magnetic particles on the support on the side opposite to the side having the emulsion layer. Usually, when a light-sensitive material has a magnetic recording layer and stored with age, the photographic properties greatly change, however, the present invention can effectively overcome this problem and the objects can be satisfactorily attained. Further, the image quality is likewise improved.

Further, in the specific cartridge for use in the present invention, pressure applied onto a light-sensitive material is intensified upon winding of the light-sensitive material and when the light-sensitive material is stored for a long period of time, particularly, at a high temperature, the photographic properties (e.g., sensitivity and fog) more and more greatly change, however, a package obtained by housing the above-described light-sensitive material of the present invention in a specific cartridge of the present invention satisfactorily overcomes the problem of aging storability and the image quality is also likewise improved.

DETAILED DESCRIPTION OF THE INVENTION

Figure 1:
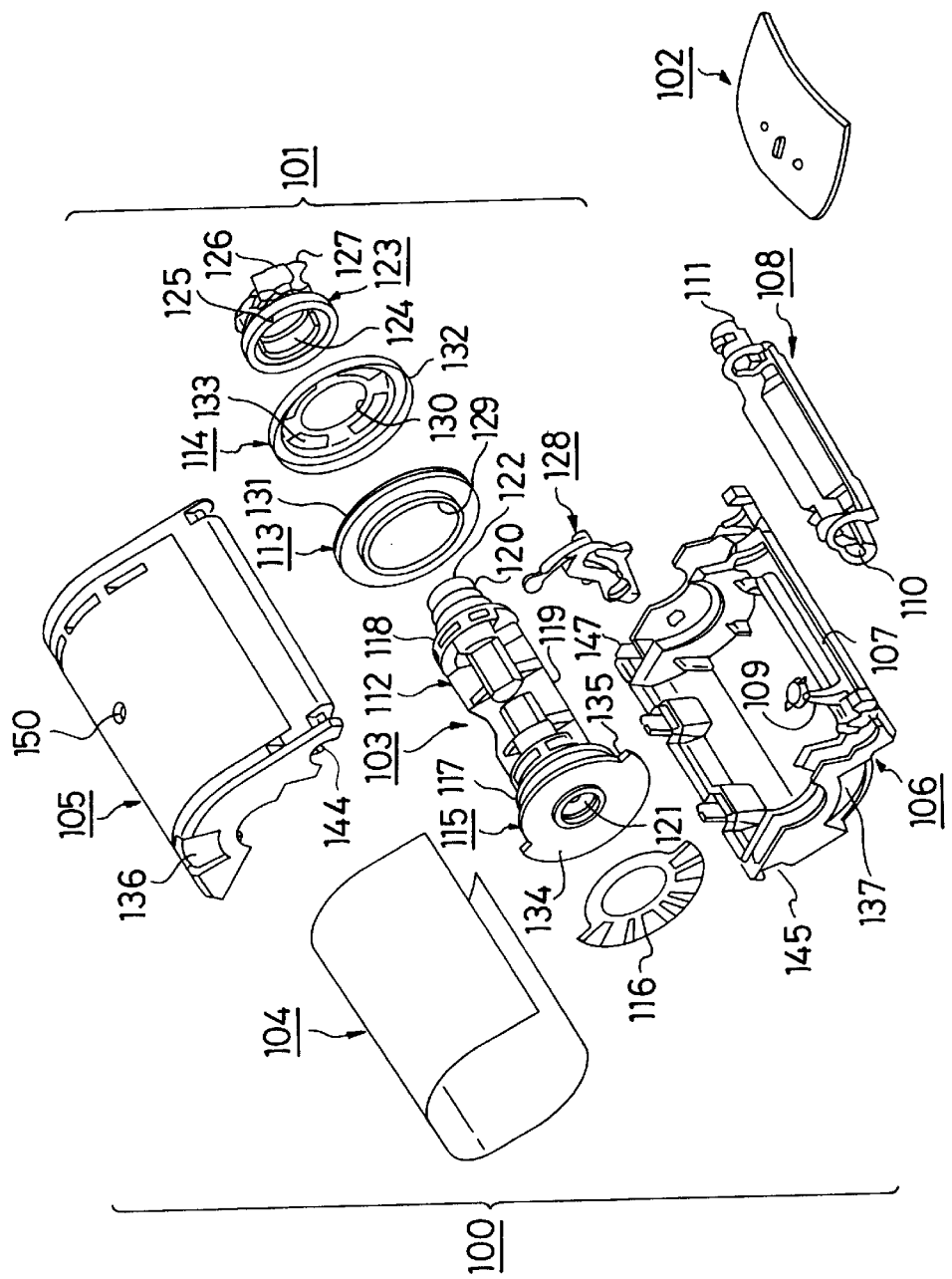
FIG. 1 is an exploded perspective view of a package of a photographic light-sensitive material (photographic film patrone) according to one embodiment of the present invention.

The tabular silver halide grain (hereinafter referred to as "tabular grain") of the present invention is described in more detail below.

The tabular grain of the present invention has an aspect ratio of 2 or more and occupies 50% or more, preferably 65% or more, still more preferably 80% or more, with an upper limit of 100%, of the entire projected area of all silver halide grains in at least one of light-sensitive silver halide emulsion layers.

The aspect ratio as used in the present invention is defined as a value obtained by dividing the circle-corresponding diameter of two opposing parallel main planes (diameter of a circle having the same projected area as the main plane) by the distance between main planes (namely, thickness of a grain), and a number average of aspect ratios of individual grains is used.

The tabular grain having an aspect ratio of 2 or more used in the present invention preferably has an aspect ratio of from 3 to 100, more preferably from 5 to 30.

In the present invention, the tabular grain preferably has a relative standard deviation of the grain size distribution of 35% or less. The term "relative standard deviation" as used herein means a value obtained by dividing the distribution (standard deviation) in the circle-corresponding diameters of the projected area of the tabular grains by an average of the circle-corresponding diameters of the projected area of the tabular grains and multiplying the product by 100.

In the case of a silver halide emulsion comprising silver halide grains which are uniform in the grain form and small in the distribution of grain sizes, the grain size distribution is almost normal and the standard deviation can be easily obtained. The tabular grain of the present invention has a relative standard deviation of the grain size distribution of preferably 30% or less, more preferably 25% or less.

The tabular grain of the present invention has a (circle-corresponding) diameter of from 0.10 to 3 µm, preferably from 0.15 to 2 µm.

The grain thickness is preferably from 0.05 to 0.5 µm, more preferably from 0.08 to 0.3 µm.

The grain diameter and the grain thickness of the present invention can be measured by an electron microscopic photograph of a grain as in the method described in U.S. Pat. No. 4,434,226.

The tabular grain of the present invention has a value obtained by dividing the average circle-corresponding diameter by the square of the average thickness (value defined as ECD/t$^2$ in Research Disclosure, Item No. 37038, Chapter XV, Item A (p. 90, left column) (hereinafter referred to as "tabulation degree")), of 5 or more, preferably 10 or more, more preferably from 25 to 250.

The silver halide grain is prepared using gelatin as a protective colloid. An alkali-treated gelatin is commonly used. In particular, an alkali-treated gelatin subjected to deionization or ultrafiltration to remove impurity ions or impurities is preferred. Examples of the gelatin other than the alkali-treated gelatin include an acid-treated gelatin, a derivative gelatin such as phthalated gelatin and esterified gelatin, a low molecular weight gelatin (having a molecular weight of from 1,000 to 80,000 and including gelatin decomposed with an enzyme, gelatin hydrolyzed with an acid and/or an alkali and thermally decomposed gelatin), a high molecular weight gelatin (having a molecular weight of from 110,000 to 300,000), a gelatin having a methionine content of 50 µmol/g or less, a gelatin having a tyrosine content of 20 µmol/g or less, an oxidation treated gelatin and a gelatin having methionine inactivated by alkylation. A mixture of two or more kinds of gelatins may also be used. The gelatin is used in the grain formation process in a concentration of generally from 1 to 60 g/mol-Ag, preferably from 3 to 40 g/mol-Ag. In the process subsequent to the grain formation process, for example, in the chemical sensitization process, the gelatin is used in a concentration of preferably from 1 to 100 g/mol-Ag, more preferably from 1 to 70 g/mol-Ag. The present invention is particularly effective when a relatively large amount (10 g/mol-Ag or more) of gelatin is used.

The tabular grain of the present invention may have any halogen composition and any silver halide such as silver chloride, silver bromide, silver iodide, silver chlorobromide, silver iodobromide, silver chloroiodobromide, silver chloroiodide and a mixture thereof, may be used.

The preparation of monodisperse tabular grains is described in JP-A-63-11928. A monodisperse hexagonal tabular grain is described in JP-A-63-151618. A circular monodisperse tabular grain emulsion is described in JP-A-1-131541. An emulsion in which 95% or more of the entire projected area are occupied by tabular grains having two parallel twin planes and the size distribution of the tabular grains is monodisperse, is disclosed in JP-A-2-838. Further, a tabular grain emulsion prepared using a polyalkylene oxide block copolymer and having a coefficient of variation of the grain size of 10% or less is disclosed in EP-A-514742.

A tabular grain having (100) main surface and a tabular grain having (111) main surface are known and the technique of the present invention can be applied to both of them. With respect to the former grain, silver bromide is described in U.S. Pat. No. 4,063,951 and JP-A-5-281640, and silver chloride is described in EP-A-0534395 and U.S. Pat. No. 5,264,337. With respect to the latter tabular grain which is a grain having one or more sheets of the above-described twin planes and having various forms, silver chloride is described in U.S. Pat. Nos. 4,399,215, 4,983,508 and 5,183,732, JP-A-3-137632 and JP-A-3-116113.

The silver halide grain may have a dislocation line within the grain and the technique for introducing a dislocation line into a silver halide grain by controlling the dislocation is described in JP-A-63-220238. According to this patent publication, a specific high iodide phase is provided inside a tabular silver halide grain having an average grain diameter/grain thickness ratio of 2 or more and a phase having an iodide content lower than the high iodide phase covers the outside thereof, thereby introducing a dislocation. By introducing the dislocation, effects such as increase of sensitivity, improvement of storability, improvement of latent image stability and reduction of pressure fog, can be obtained. According to the invention described in the above-described patent publication, the dislocation is introduced mainly into the edge part of a tabular grain. A tabular grain having a dislocation introduced into the center part is described in U.S. Pat. No. 5,238,796. Further, JP-A-4-348337 discloses a regular crystal grain having a dislocation in the inside thereof. In the same patent publication, it is disclosed that an epitaxy of silver chloride or silver chlorobromide is formed in a regular crystal grain and the epitaxy is subjected to conversion by physical ripening and/or halogen to thereby introduce a dislocation. By introducing a dislocation as described above, effects such as increase of sensitivity and reduction of pressure fog can be obtained.

The dislocation line in a silver halide grain can be observed by a direct method using a transmission type electron microscope at a low temperature described, for example, in J. F. Hamilton, *Phot. Sci. Eng.*, 11, 57 (1967) and T. Shiozawa, *J. Soc. Phot. Sci.* Japan, 35, 213 (1972). More specifically, a silver halide grain taken out from an emulsion carefully so as not to apply such a pressure as to cause generation of a dislocation on the grain is placed on a mesh for observation by an electron microscope and observed according to a transmission method while laying the sample in a cool state so as to prevent any damage (e.g., print out) by the electron beams. At this time, as the thickness of the grain is larger, the electron beams become hard to be transmitted and therefore, a high-voltage type (200 kV or more for a grain having a thickness of 0.25 $\mu$m) electron microscope is preferably used to effect the observation more clearly. The site and the number of dislocation lines on each grain can be determined by observing the grain from the direction perpendicular to the main plane on the photograph of the grain obtained as above.

The present invention is particularly effective when 50% or more by number of silver halide grains have 10 or more dislocation lines per one grain.

In the preparation of a silver halide emulsion, there is no particular restriction on additives which can be added from the grain formation to the coating.

In order to accelerate growth during the crystal formation or to effectively perform chemical sensitization at the time of grain formation and/or chemical sensitization, a silver halide solvent may be used. As the silver halide solvent, a water-soluble thiocyanate, an ammonia, a thioether and thioureas may be used. Examples of the silver halide solvent include thiocyanates (e.g., those described in U.S. Pat. Nos. 2,222,264, 2,448,534 and 3,320,069), ammonia, thioether compounds (e.g., those described in U.S. Pat. Nos. 3,271, 157, 3,574,628, 3,704,130, 4,297,439 and 4,276,347), thione compounds (e.g., those described in JP-A-53-144319, JP-A-53-82408 and JP-A-55-77737), amine compounds (e.g., those described in JP-A-54-100717), thiourea derivatives (e.g., those described in JP-A-55-2982), imidazoles (e.g., those described in JP-A-54-100717) and substituted mercaptotetrazoles (e.g., those described in JP-A-57-202531).

The production method of a silver halide emulsion is not particularly restricted. In general, to a reaction vessel containing an aqueous gelatin solution, an aqueous silver salt solution and an aqueous halogen salt solution are added while stirring efficiently. Specific examples of the production method include the methods described in P. Glafkides, *Chemie et Phisique Photographique,* Paul Montel (1967), G. F. Duffin, *Photographic Emulsion Chemistry,* The Focal Press (1966), and V. L. Zelikman et al., *Making and Coating Photographic Emulsion,* The Focal Press (1964). More specifically, any of an acidic process, a neutral process and an ammonia process may be used, and the form in reacting a soluble silver salt and a soluble halogen salt may be any of a single jet method, a double jet method and a combination thereof.

As one of the double jet method, a method of maintaining the pAg in a liquid phase where silver halide is produced constant, a so-called controlled double jet method, may also be used. The growth is preferably accelerated within the range of not exceeding the critical supersaturation degree, using a method of changing the addition rate of silver nitrate or an aqueous alkali halide solution according to the grain growth speed (described, for example, in British Pat. 1,535, 016, JP-B-48-36890 (the term "JP-B" as used herein means an "examined Japanese patent publication") and JP-B-52-16364) or a method of changing the concentration of the aqueous solution (described, for example, in U.S. Pat. No. 4,242,445 and JP-A-55-158124). These methods are preferably used because regeneration of nuclei is not caused and silver halide grains uniformly grow.

Instead of adding a silver salt solution and a halogen salt solution to a reaction vessel, fine grains previously prepared may be added to the reaction vessel to generate nucleation and/or grain growth to thereby obtain silver halide grains and this method is preferred. This technique is described in JP-A-1-183644, JP-A-1-183645, JP-A-2-44335, JP-A-2-43534, JP-A-2-43535 and U.S. Pat. No. 4,879,208. According to this method, the halogen ion distribution within the emulsion grain crystal can be made completely uniform and preferred photographic properties can be achieved.

In the present invention, emulsion grains having various structures may be used. A so-called core-shell double structure grain consisting of an inside (core) and an outside (shell), a triple structure grain (described, for example, in JP-A-60-222844) and a greater multiple structure grain may be used. When an emulsion grain is intended to have a structure in the inside thereof, not only a grain having the above-described wrapping structure but also a grain having a so-called junction structure may be prepared. Examples thereof are described in JP-A-58-108526, JP-A-59-16254, JP-A-59-133540, JP-B-58-24772 and EP-A-199290.

The crystal to be joined has a composition different from the host crystal and may be formed to join to the edge or corner part or on the plane part of the host crystal. The joined crystal can be formed irrespective of that the host crystal has a uniform halogen composition or a core-shell type structure. In the case of the junction structure, silver halides can of course be combined with each other but a silver salt compound not having a rock-salt structure, such as silver rhodanide and silver carbonate, can be combined, if it is possible, with silver halide to provide a junction structure.

In the case of a silver iodobromide grain having the above-described structure, for example, in a core-shell type grain, the silver iodide content of the core part may be high and the silver iodide content of the shell part may be low. On the contrary, the silver iodide content of the core part may be low and the silver iodide content of the shell part may be high. Similarly, in the case of a grain having a junction structure, the host crystal may have a high silver iodide content and the joined crystal may have a relatively low silver iodide content. The reverse thereof may also be used. The boundary between portions different in the halogen composition of a grain having the above-described structure may be clear or may be unclear due to a mixed crystal formed using difference in the composition. Alternatively, a continuous change in the composition may be positively provided.

The silver halide emulsion for use in the present invention may be subjected to treatment for rounding a grain (as described in EP-B-0096727 and EP-B-0064412) or may be subjected to surface modification treatment (as described in German Patent 2,306,447C2 and JP-A-60-221320).

The silver halide emulsion is preferably surface latent image type, however, as disclosed in JP-A-59-133542, by selecting the developer or the development conditions, an internal latent image type emulsion may be used. A shallow internal latent image type emulsion covered with a thin shell may also be used depending upon the purpose.

The desensitizer is described below.

The term "containing a desensitizer" means that the sensitivity of an emulsion containing the desensitizer is lower than that of the same emulsion containing no desensitizer at least by 0.15. In the present invention, a desensitizer, by which the sensitivity of the emulsion is lowered at least by 0.50, is preferably used.

As the desensitizer, various compounds such as metal ion, antifoggant, stabilizer and desensitizing dye, may be used.

In the present invention, any of the above-described desensitizers can be used individually or in combination. The desensitizer is preferably a metal ion. A metal ion doping method is more preferably used.

Examples of the metal ion include metal ions belonging to Periods 4, 5 and 6 of each of Group 3, Groups 6 to 13 and Group 15 (e.g., metal ions described in JP-A-2-219051).

In the present invention, metal ions belonging to Periods 4, 5 and 6 of each of Group 6, Group 7, Group 8 and Group 9 are preferred. Specific examples of these preferred metal ions include Co, Re, Rh, Ru, Os and Ir. These metal ions are used as a simple salt or a complex of a metal complex salt. Preferred examples of the simple salt include a halide (e.g., chloride, bromide), a nitrate, a sulfate and a perchlorate. The metal complex may be a 6-coordination, 5-coordination, 4-coordination or 2-coordination complex, and the complex may be either a single nuclear complex or a polynuclear complex. Examples of the ligand constituting the complex include $Cl^-$, $Br^-$, $NO_2^-$, $CN^-$, $SCN^-$, $SO_3^{2-}$, $SO_4^{2-}$, $C_2O_4^{2-}$, CO, $NH_3$, amines (e.g., EDTA), $C_5H_5$, $C_6H_6$ and $H_2O$. The above-described metal complex is preferably used as a complex salt of potassium salt, sodium salt, ammonium salt or cesium salt.

The above-described complex can be incorporated into a silver halide grain by a conventional method. More specifically, in forming a silver halide grain by mixing and stirring a silver ion solution and an aqueous halogen solution, an aqueous solution having dissolved therein a complex of the present invention (in the case of a silver halide grain formed contains bromine, the complex may be present together in a KBr solution) is added to the above-described mixed reaction solution and thereby the complex can be doped to a silver halide grain. Further, the metal ion can be doped to a grain by adding the above-described aqueous solution of a complex after formation of silver halide grains. In this case, the grain may be further covered with silver halide. Depending upon the metal to be doped, an organic solvent may be partly used in preparing an aqueous solution of a metal. The method for doping a metal to a silver halide grain is described in U.S. Pat. Nos. 3,761,276 and 4,395,478 and JP-A-59-216136.

Other than the above-described method, the metal ion may be added by supplying fine silver halide grains doped with the metal ion as described in U.S. Pat. No. 4,879,208 and European Patent 048,752.

The amount of the metal ion doped varies depending on the kind of the metal ion, the grain size of the silver halide grain, the site doped by the metal ion and the sensitivity intended, however, it is from $10^{-17}$ to $10^{-3}$ mol, preferably from $10^{-12}$ to $10^{-3}$ mol, more preferably from $10^{-9}$ to $10^{-4}$ mol, per mol of silver halide.

By selecting the kind of the metal ion, the doping site and the doping amount, various different sensitivities can be given to a silver halide grain.

The metal ion used can be qualitatively or quantitatively analyzed according to ICP-Mass or an atomic absorption spectrochemical analysis. When the metal ions are localized, it can be verified by SIMS (Secondary Ion Mass Spectroscopy).

Examples of the antifoggant and the stabilizer include azoles (e.g., benzothiazolium salts, indazoles, triazoles, benzotriazoles, benzimidazoles), heterocyclic mercapto compounds (e.g., mercaptotetrazoles, mercaptothiazoles, mercaptothiadiazoles, mercaptobenzothiazoles, mercaptobenzimidazoles, mercaptopyrimidines), azanidenes (e.g., tetraazaindenes, pentaazaindens), nucleic acid decomposed products (e.g., adenine, guanine), benzenethiosulfonic acids and thioketo compounds.

Examples of the desensitizing dye include a cyanine dye, a merocyanine dye, a complex cyanine dye, a complex merocyanine dye, a holopolar cyanine dye, a hemicyanine dye, a styryl dye and a hemioxonol dye.

The light-sensitive material of the present invention comprises at least one silver halide emulsion layer containing an emulsion comprising silver halide grains in which 50% or more of the entire projected area of all silver halide grains are tabular silver halide grains having an aspect ratio of 2.0 or more and at least a part of the tabular grains contain the above-described desensitizer.

In the color light-sensitive material, at least one layer of at least one spectral sensitive layer (e.g., blue-sensitive emulsion layer) contains the above-described desensitizer-containing silver halide grains. In the color light-sensitive material, the above-described desensitizer-containing silver halide grain is contained preferably in a blue-sensitive emulsion layer, more preferably in a blue-sensitive emulsin layer and a green-sensitive emulsion layer, and most preferably in all spectral sensitive layers.

The silver halide emulsion is usually subjected to spectral sensitization. The spectral sensitizing dye may be a normal methine dye. The methine dye includes a cyanine dye, a merocyanine dye, a complex cyanine dye, a complex merocyanine dye, a holopolar cyanine dye, a hemicyanine dye, a styryl dye and a hemioxonol dye. To these dyes, any of rings commonly used in the cyanine dyes as a basic heterocyclic ring may be applied. Examples of the basic heterocyclic ring include a pyrroline ring, an oxazoline ring, a thiazoline ring, a pyrrole ring, an oxazole ring, a thiazole ring, a selenazole ring, an imidazole ring, a tetrazole ring and a pyridine ring. Also, a ring resulting from condensation of an alicyclic hydrocarbon ring or an aromatic hydrocarbon ring to the heterocyclic ring may be used. Examples of the condensed ring include an indolenine ring, a benzindolenine ring, an indole ring, a benzoxazole ring, a naphthoxazole ring, a benzimidazole ring, a benzothiazole ring, a naphthothiazole ring, a benzoselenazole ring and a quinoline ring. To the carbon atom on each of these rings, a substituent may be bonded.

To the merocyanine dye or complex merocyanine dye, a 5- or 6-membered heterocyclic ring having a ketomethylene structure may be applied. Examples of such a heterocyclic ring include a pyrazolin-5-one ring, a thiohydantoin ring, a 2-thioxazolidin-2,4-dione ring, a thiazolidin-2,4-dione ring, a rhodanine ring and a thiobarbituric acid ring.

The addition amount of the sensitizing dye is preferably from 0.001 to 100 mmol, more preferably from 0.01 to 10 mmol, per mol of silver halide.

The sensitizing dye is preferably added during or before chemical sensitization (for example, at the time of grain formation or physical ripening).

In combination with the sensitizing dye, a dye which itself provides no spectral sensitization effect or a material which absorbs substantially no visible light, but which exhibits supersensitization may be added to the silver halide emulsion. Examples of such a dye or material include aminostyl compounds substituted by a nitrogen-containing heterocyclic group (e.g., those described in U.S. Pat. Nos. 2,933,390 and 3,635,721), aromatic organic acid formaldehyde condensates (e.g., those described in U.S. Pat. No. 3,743,510), cadmium salts and azaindene compounds. The combination of the sensitizing dye with the above-described dye or material is described in U.S. Pat. Nos. 3,615,613, 3,615,641, 3,617,295 and 3,635,721.

The silver halide emulsion is usually subjected to chemical sensitization before use. The chemical sensitization is performed using chalcogen sensitization (e.g., sulfur sensitization, selenium sensitization, tellurium sensitization), noble metal sensitization (e.g., gold sensitization) and reduction sensitization individually or in combination.

In the sulfur sensitization, a labile sulfur compound is used as a sensitizer. The labile sulfur compound is described in P. Grafkides, *Chimie et Physique Photo praphique,* 5th ed., Paul Montel (1987), and *Research Disclosure,* Vol. 307, No. 307105. Examples of the sulfur sensitizer include thiosulfates (e.g., hypo), thioureas (e.g., diphenylthiourea, triethylthiourea, N-ethyl-N'-(4-methyl-2-thiazolyl)thiourea, carboxymethyltrimethylthiourea), thioamides (e.g., thioacetamide), rhodanines (e.g., diethylrhodanine, 5-benzilydene-N-ethyl-rhodanine), phosphine sulfides (e.g., trimethylphosphine sulfide), thiohydantoins, 4-oxo-oxazolidine-2-thiones, dipolysulfides (e.g., dimorpholine disulfide, cystine, hexathiocane-thione), mercapto compounds (e.g., cystane), polythionates and elemental sulfur. Activated gelatin can also be used as a sulfur sensitizer.

In the selenium sensitization, a labile selenium compound is used as a sensitizer. The labile sensitizer is described in JP-B-43-13489, JP-B-44-15748, JP-A-4-25832, JP-A-4-109240, JP-A-4-271341 and JP-A-5-40324. Examples of the selenium sensitizer include colloidal metal selenium, selenoureas (e.g., N,N-dimethylselenourea, trifluoromethylcarbonyl-trimethyl-selenourea, acetyl-trimethylselenourea), selenoamides (e.g., selenoacetamide, N,N-diethylphenyl-selenoamide), phosphine selenides (e.g., triphenylphosphine selenide, pentafluorophenyl-triphenylphosphine selenide), selenophosphates (e.g., tri-p-tolylselenophosphate, tri-n-butylselenophosphate), selenoketones (e.g., selenobenzophenone), isoselenocyanates, selenocarboxylic acids, selenoesters and diacyl selenides. Further, a relatively stable selenium compound such as selenious acid, potassium selenocyanate, selenazoles and selenides (e.g., those described in JP-B-46-4553 and JP-B-52-34492) can also be used as a selenium sensitizer.

In the tellurium sensitization, a labile tellurium compound is used as a sensitizer. The labile tellurium compound is described in Canadian Patent 800,958, British Patent 1,295, 462 and 1,396,696, JP-A-4-204640, JP-A-4-271341, JP-A-4-333043 and JP-A-5-303157. Examples of the tellurium sensitizer include tellurioureas (e.g., tetramethyltellurourea, N,N'-dimethylethylenetellurourea, N,N'-diphenylethylenetellurourea), phosphine tellurides (e.g., butyl-diisopropylphosphine telluride, tributylphosphine telluride, tributoxyphosphine telluride, ethoxy-diphenylphosphine telluride), diacyl (di)tellurides (e.g., bis(diphenylcarbamoyl) ditelluride, bis(N-pheny-N-methylcarbamoyl) ditelluride, bis(N-pheny-N-methylcarbamoyl) telluride, bis(ethoxycarbonyl) telluride), isotellurocyanates, telluroamides, tellurohydrazides, telluroesters (e.g., butylhexyltelluroester), telluroketones (e.g., telluroacetophenone), colloidal tellurium, (di)tellurides and other tellurium compounds (e.g., potassium telluride, telluropentathionate sodium salt).

In the noble metal sensitization, a salt of a noble metal such as gold, platinum or palladium is used as a sensitizer. The noble metal salt is described in P. Grafkides, *Chimie et Physique Photographique,* 5th ed., Paul Montel (1987), and *Research Disclosure,* Vol. 307, No. 307105. In particular, gold sensitization is preferred. As described above, the present invention is particularly effective when gold sensitization is performed.

It is described in *Photographic Science and Engineering,* Vol. 19322 (1975) and *Journal of Imaging Science,* Vol. 3228 (1988) that gold can be removed from the sensitization speck on an emulsion grain with a solution containing potassium prussiate (KCN). According to the description in these publications, the cyan ion liberates the gold atom or the gold ion adsorbed onto a silver halide grain as a cyan complex and as a result, gold sensitization is inhibited. If generation of cyan is prevented according to the present invention, the gold sensitization operation can be sufficiently achieved.

Examples of the gold sensitizer include chloroauric acid, potassium chloroaurate, potassium aurithiocyanate, gold sulfide and gold selenide. Further, the gold compounds described in U.S. Pat. Nos. 2,642,361, 5,049,484 and 5,049,485 may also be used.

In the reduction sensitization, a reducing compound is used as a sensitizer. The reducing compound is described in P. Grafkides, *Chimie et Physique Photographique,* 5th ed., Paul Montel (1987), and Research Disclosure, Vol. 307, No. 307105. Examples of the reducing sensitizer include aminoiminomethanesulfinic acids (e.g., thiourea dioxide), borane compounds (e.g., dimethylamineborane), hydrazine compounds (e.g., hydrazine, p-tolylhydrazine), polyamine compounds (e.g., diethylenetriamine, triethylenetetramine), stannous chloride, silane compounds, reductones (e.g., ascorbic acid), sulfite, aldehyde compounds and hydrogen gas. Further, the reduction sensitization may be performed in a high pH atmosphere or in an excessive silver ion atmosphere (so-called silver ripening).

The chemical sensitizations may be performed in combination of two or more thereof. A combination of chalcogen sensitization and gold sensitization is particularly preferred. The reduction sensitization is preferably performed at the time of silver halide grain formation. The use amount of the sensitizer is generally determined according to the kind of silver halide used and the chemical sensitization conditions.

The use amount of the chalcogen sensitizer is generally from $10^{-8}$ to $10^{-2}$ mol, preferably from $10^{-7}$ to $5 \times 10^{-3}$ mol, per mol of silver halide.

The use amount of the noble metal sensitizer is preferably from $10^{-7}$ to $10^{-2}$ mol per mol of silver halide.

The conditions of chemical sensitization are not particularly restricted. The pAg is generally from 6 to 11, preferably from 7 to 10, the pH is preferably from 4 to 10, and the temperature is preferably from 40 to 95° C., more preferably from 45 to 85° C.

Various compounds may be incorporated into the silver halide emulsion so as to prevent fogging or to stabilize the photographic capability, during preparation, storage or photographic processing of the light-sensitive material. Examples of the compound include azoles (e.g., benzothiazolium salt, nitroindazoles, triazoles, benzotriazoles, benzimidazoles (particularly, nitro- or halogen-substitution product); heterocyclic mercapto compounds (e.g., mercaptothiazoles, mercaptobenzothiazoles, mercaptobenzimidazoles, mercaptothiadiazoles, mercaptotetrazoles (particularly, 1-pheny-5-mercaptotetrazole), mercaptopyrimidines); the above-descried heterocyclic mercapto compounds having a water-soluble group such as a carboxyl group or a sulfone group; thioketo compounds (e.g., oxazolinethione); azaindenes (e.g., tetrazaindenes (particularly, 4-hydroxy-substituted (1,3,3a,7) tetrazaindenes)); benzenethiosulfonic acids and benzenesulfinic acids. These compounds are generally known as an antifoggant or a stabilizer.

The antifoggant or the stabilizer is usually added after chemical sensitization. However, the addition time may be selected from the period of during chemical sensitization and the period of before initiation of chemical sensitization. More specifically, the compound may be added, in the process of forming silver halide emulsion grains, during addition of a silver salt solution, between after the addition and until initiation of chemical sensitization, or during chemical sensitization (in the time period of chemical sensitization, preferably within 50% of the time, more preferably 20% of the time, from the initiation).

The compounds represented by formulae (A-I) to (A-III) are described in detail below. The alkyl group as used in the present invention includes linear, branched and cyclic alkyl groups and may have a substituent.

In formula (A-I), $R_{a1}$ represents an alkyl group (preferably an alkyl group having from 1 to 36 carbon atoms, e.g., methyl, ethyl, i-propyl, cyclopropyl, butyl, isobutyl, cyclohexyl, t-octyl, decyl, dodecyl, hexadecyl, benzyl), an alkenyl group (preferably an alkenyl group having from 2 to 36 carbon atoms, e.g., allyl, 2-butenyl, isopropenyl, oleyl, vinyl), an aryl group (preferably an aryl group having from 6 to 40 carbon atoms, e.g., phenyl, naphthyl), an acyl group (preferably an acyl group having from 2 to 36 carbon atoms, e.g., acetyl, benzoyl, pivaloyl, α-(2,4-di-tert-amyl-phenoxy)butyryl, (3-cyclohexen-1-yl) carbonyl, myristoyl, stearoyl, naphthoyl, m-pentadecylbenzoyl, (5-norbornen-2-yl)carbonyl, isonicotinoyl), an alkyl- or arylsulfonyl group (preferably an alkyl- or arylsulfonyl group having from 1 to 36 carbon atoms, e.g., methanesulfonyl, octanesulfonyl, benzenesulfonyl, toluenesulfonyl), an alkyl- or arylsulfinyl (preferably an alkyl- or arylsulfinyl group having from 1 to 40 carbon atoms, e.g., methanesulfinyl, benzenesulfinyl), a carbamoyl group (including N-substituted carbamoyl group and preferably a carbamoyl group having from 1 to 40 carbon atoms, e.g., N-ethylcarbamoyl, N-phenylcarbamoyl, N,N-dimethylcarbamoyl, N-butyl-N-phenylcarbamoyl), a sulfamoyl group (including N-substituted sulfamoyl and preferably a sulfamoyl group having from 1 to 40 carbon atoms, e.g., N-methylsulfamoyl, N,N-diethylsulfamoyl, N-phenylsulfamoyl, N-cyclohexyl-N-phenylsulfamoyl, N-ethyl-N-dodecylsulfamoyl), an alkoxycarbonyl group (preferably an alkoxycarbonyl group having from 2 to 36 carbon atoms, e.g., methoxycarbonyl, cyclohexyloxycarbonyl, benzyloxycarbonyl, isoamyloxycarbonyl, hexadecyloxycarbonyl) or an aryloxycarbonyl (preferably an aryloxycarobnyl group having from 7 to 40 carbon atoms, e.g., phenoxycarbonyl, naphtoxycarbonyl). $R_{a2}$ represents a hydrogen atom or a group represented by $R_{a1}$.

In formula (A-II), X represents a heterocyclic group forming a 5-, 6- or 7-membered heterocyclic ring containing at least one of a nitrogen atom, a sulfur atom, an oxygen atom and a phosphorus atom as a ring constituting atom, excluding an S-triazine ring (e.g., 1,3,5-triazine ring). The bonding site of the heterocyclic ring (the position of the monovalent group) is preferably the carbon atom. Examples thereof include 1,2,4-triazin-3-yl, pyridin-2-yl, pyrazinyl, pyrimidinyl, purinyl, quinolyl, imidazolyl, 1,2,4-triazol-3-yl, benzimidazol-2-yl, thienyl, furyl, imidazolidinyl, pyrrolinyl, tetrahydrofuryl, morpholinyl and phosphinolin-2-yl. $R_{b1}$ represents an alkyl group, an alkenyl group or an aryl group having the same meanings as in $R_{a1}$ of formula (A-I).

In formula (A-III), Y represents a nonmetallic atom group necessary for forming a 5-membered ring together with —N═C— (examples of the ring group to be formed include imidazolyl, benzimidazolyl, 1,3-thiazol-2-yl, 2-imidazolin-2-yl, purinyl, 3H-indol-2-yl). Or, Y represents a nonmetallic atom group necessary for forming a 6-membered ring together with the —N═C— group and the terminal of Y bonded to the carbon atom of the —N═C— group is a group selected from —N($R_{c1}$)—, —C($R_{c2}$)($R_{c3}$)—, —C($R_{c4}$)═, —O— and —S— (the left hand site of each group is bonded to the carbon atom of —N═C—), with the proviso that an S-triazine (e.g., 1,3,5-triazine) ring is not formed. $R_{c1}$ to $R_{c4}$, which may be the same or different, each represents a hydrogen atom or a substituent (for example, an alkyl group, an alkenyl group, an aryl group, an alkoxy group, an aryloxy group, an alkylthio group, an arylthio group, an alkylamino group, an arylamino group or a halogen atom). The alkyl group, the alkenyl group and the aryl group have the same meaning as the alkyl group, the alkenyl group and the aryl group in $R_{a1}$ of formula (A-1), respectively, and the alkyl group in the alkoxy group, the alkylthio group and the alkylamino group, and the aryl group in the aryloxy group, the arylthio group and the arylamino group have the same meanings as described in $R_{a1}$ of formula (A-1). Examples of the halogen atom include chlorine, bromine and fluorine.

Examples of the 6-membered ring group formed by Y include quinolyl, isoquinolyl, phthalazinyl, quinoxalinyl, 6H-1,2,5-thiadiazin-6-yl.

In formula (A-I) or (A-II), $R_{a1}$ and $R_{a2}$ or X and $R_{b1}$ may be combined with each other to form a 5-, 6- or 7-membered ring and examples thereof include a succinimide ring, a phthalimide ring, a triazole ring, a urazole, ring, a hydantoin ring and a 2-oxo-4-oxazolidinone ring, but an S-triazine ring (e.g., 1,3,5-triazine) is excluded.

Each group of the compounds represented by formulae (A-I) to (A-III) may further be substituted by a substituent.

Examples of the substituent include an alkyl group, an alkenyl group, an aryl group, a heterocyclic group, a hydroxy group, an alkoxy group, an aryloxy group, an alkylthio group, an arylthio group, an amino group, an acylamino group, a sulfonamido group, an alkylamino group, an arylamino group, a carbamoyl group, a sulfamoyl group, a sulfo group, a carboxyl group, a halogen atom, a cyano group, a nitro group, a sulfonyl group, an acyl group, an alkoxycarbonyl group, an aryloxycarbonyl group, an acyloxy group and a hydroxyamino group.

The compound represented by formula (A-I) is preferably a compound where $R_{a2}$ is a hydrogen atom, an alkyl group, an alkenyl group or an aryl group and $R_{a1}$ is an acyl group, an alkylsulfonyl group, an arylsulfonyl group, an alkylsulfinyl group, an arylsulfinyl group, a carbamoyl group, a sulfamoyl group, an alkoxycarbonyl group or an aryloxycarbonyl group, more preferably a compound where $R_{a2}$ is an alkyl group or an alkenyl group and $R_{a1}$ is an acyl group, an alkylsulfonyl group, an arylsulfonyl group, a carbamoyl group, a sulfamoyl group, an alkoxycarbonyl group or an aryloxycarbonyl group, and most preferably a compound where $R_{a2}$ is an alkyl group and $R_{a1}$ is an acyl group.

In formula (A-II), $R_{b1}$ is preferably an alkyl group or an alkenyl group, more preferably an alkyl group.

The compound represented by formula (A-II) is more preferably a compound represented by the following formula (A-II-1):

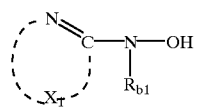

(A-II-1)

wherein $R_{b1}$ is the same as $R_{b1}$ in formula (A-II) and X represents a nonmetallic atom group necessary for forming a 5- or 6-membered ring together with —C=N—.

Among the compounds represented by formula (A-II-1), these where $X_1$ forms a 5- or 6-membered heteroaromatic ring are preferred, however, an S-triazine ring is not formed.

Among the compounds represented by formula (A-III), those where Y is a nonmetallic atom group necessary for forming a 5-membered ring, are preferred, and those where the atom at the end of Y bonded to the carbon atom of the —N=C— group is a nitrogen atom, are more preferred, however, an S-triazine ring is not formed.

Most preferably, Y forms an imidazoline ring, and the imidazoline ring may be condensed with a benzene ring.

Among the compounds represented by formulae (A-I) to (A-III), the compounds having a total carbon atom number of 15 or less are preferred in view of actions of the compound also on the layer other than the layer where the compound is added, whereas the compounds having a total carbon atom number of 16 or more are preferred for the purpose of attaining actions only on the layer where the compound is added.

Among the compounds represented by formulae (A-I) to (A-III), the compounds represented by formulae (A-I) and (A-II) are preferred, and the compound represented by formula (A-I) is more preferred.

Specific examples of the compounds represented by formulae (A-I) to (A-III) are set forth below, however, the present invention is by no means limited thereto.

A-1

A-2

A-3

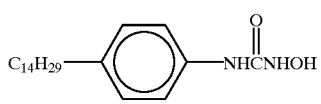

A-4

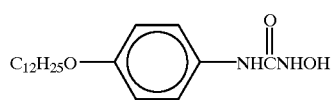

A-5

A-6

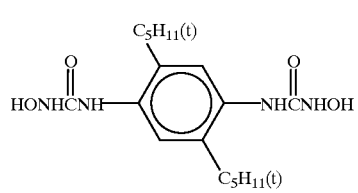

A-7

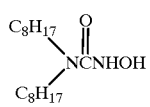

A-8

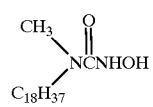

A-9

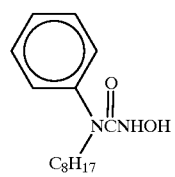

-continued
A-10
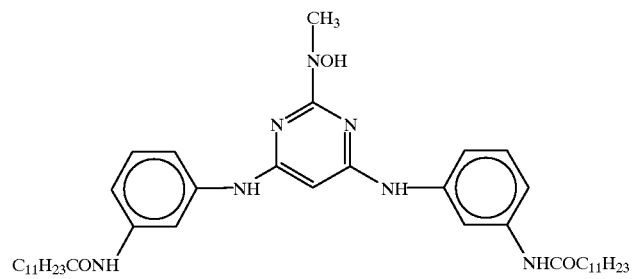
A-11
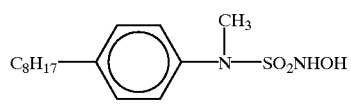
A-12
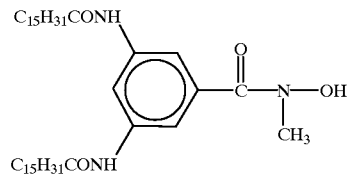
A-13
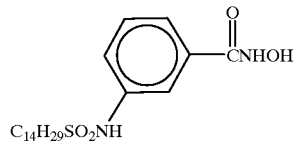
A-14
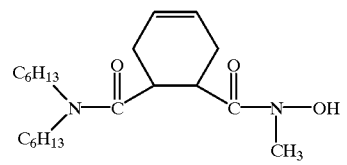
A-15
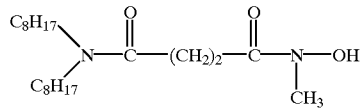
A-16
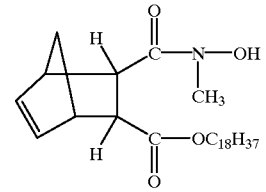
A-17
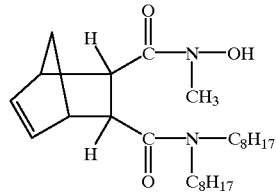
A-18
A-19
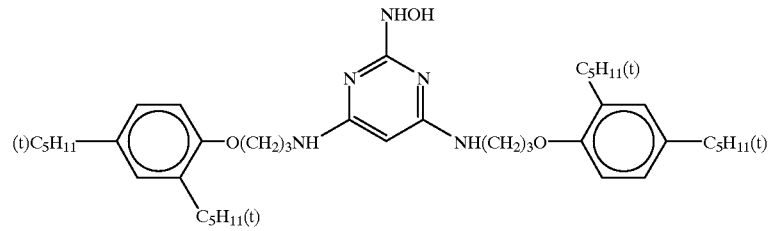
A-20
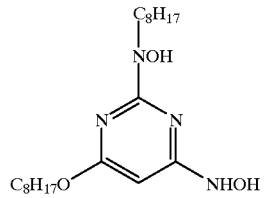
A-21
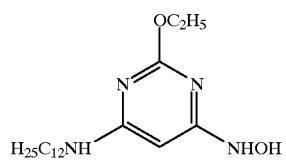

-continued
| | |
|---|---|
| A-22 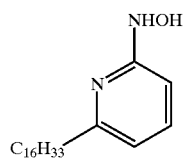 | A-23 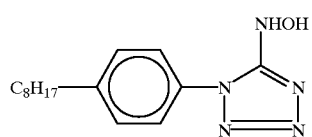 |
| A-24 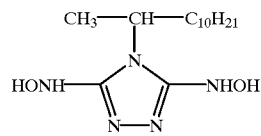 | A-25 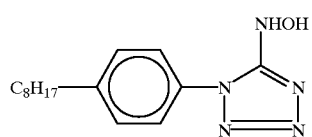 |
| A-26 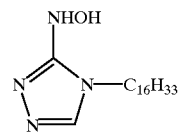 | A-27 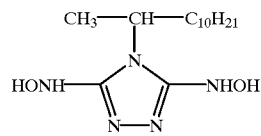 |
| A-28 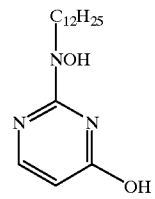 | A-29 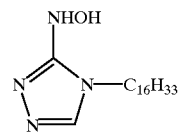 |
| A-30 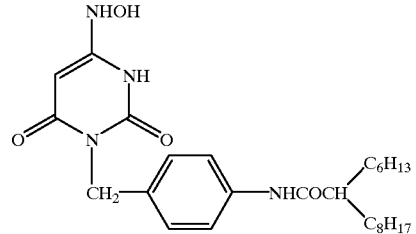 | A-31 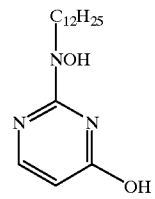 |
| A-32 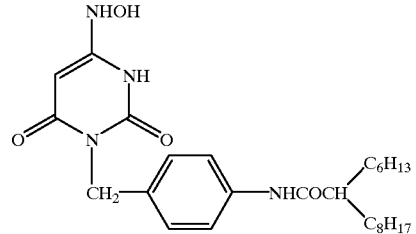 | A-33 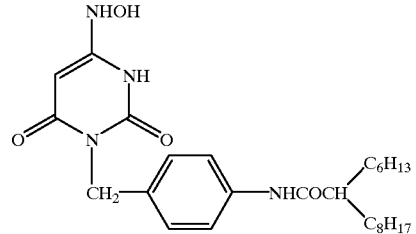 |
| A-34 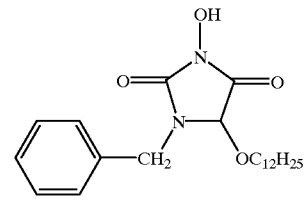 | A-35 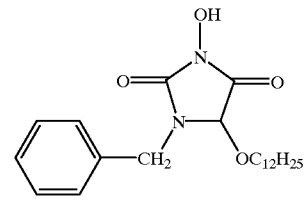 |
| A-36 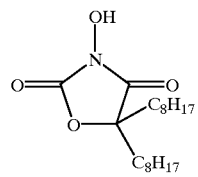 | A-37 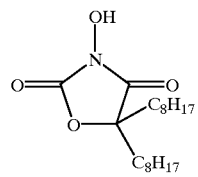 |

-continued

A-38
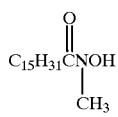

A-39
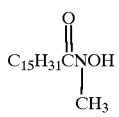

A-40
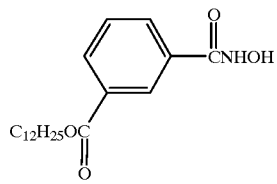

A-41
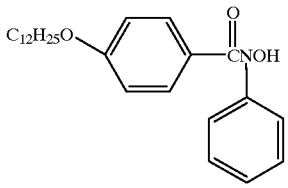

A-42

A-43
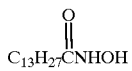

A-44
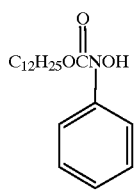

A-45
$(C_8H_{17})_2NSO_2NHOH$

A-46
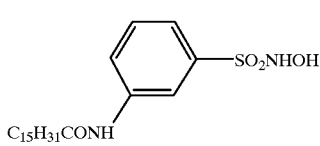

A-47
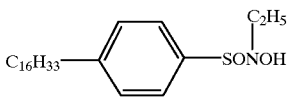

A-48
(t)$C_8H_{17}$—⟨⟩—O$\overset{O}{\underset{}{C}}$NHOH

A-49
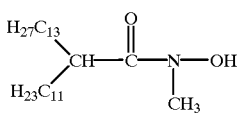

A-50
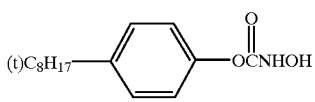

A-51
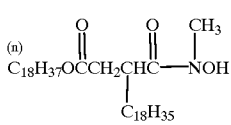

A-52
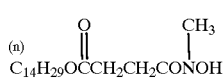

A-53
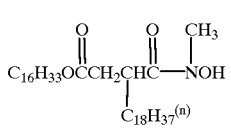

A-54
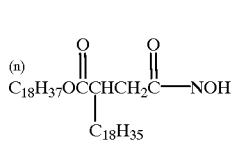

A-55

These compounds have the following corresponding relation to formulae (A-I) to (A-III).

Formula (A-I): A-1 to A-9, A-11 to A-18, A-33 to A-55

Formula (A-II): A-10, A-20, A-30

Formula (A-III): A-19, A-21 to A-29, A-31 and A-32

These compounds of the present invention can be easily synthesized by the methods described in *J. Org. Chem.*, 27, 4054 ('62), *J. Amer. Chem. Soc.*, 73, 2981 ('51) and JP-B-49-10692, or a method in accordance thereto.

In the present invention, the compounds represented by formulae (A-I) to (A-III) each may be dissolved in a water-soluble solvent such as methanol, ethanol, dimethylformamide (DMF) or dimethylsulfoxide (DMSO) or in a mixed solvent thereof and then added, may be added by emulsion dispersion, or may be previously added at the time of preparation of an emulsion.

In the present invention, the compounds represented by formulae (A-I) to (A-III) may be used in combination of two or more thereof.

The compounds represented by formulae (A-I) to (A-III) each is preferably coated in an amount of from 0.01 to 200 mg/m², more preferably from 0.1 to 100 mg/m², still more preferably from 1 to 50 mg/m², per one layer.

In the present invention, these compounds each is used in a layer containing the above-described tabular grains and/or a light-insensitive layer or other light-sensitive silver halide emulsion layer, and the same compound may be used in a plurality of layers or different compounds may be used in respective layers. In the present invention, examples of the light-insensitive layer include an interlayer, a colloid silver-containing yellow filter layer, an AH (anti-halation) layer and a protective layer.

In the present invention, the compounds represented by formulae (A-I) to (A-II) each is preferably an oil-soluble compound.

The term "oil-soluble compound" as used in the present invention means that the compound has a solubility (at 25° C.) in ethyl acetate of 0.1 wt% or more, preferably 0.5 wt% or more.

The oil-soluble compound is particularly preferably used in the layer containing the above-described tabular grains. In the case where it is used in a light-insensitive layer or other silver halide emulsion layer, the oil-soluble compound is preferably used in a layer adjacent to the layer containing the above-described tabular grains. The compounds represented by formulae (A-I) to (A-III) each may also be water-soluble depending on the purpose.

In the present invention, when a light-sensitive material using an emulsion comprising silver halide grains in which 50% or more of the entire projected area of all silver halide grains are tabular silver halide grains each having an aspect ratio of 2.0 or more and at least a part of the tabular grains contain a desensitizer, uses the compound represented by formula (A-I), (A-II) or (A-III), the problem of change in the photographic properties such as increase of sensitivity and increase of fog to be caused during storage in aging, which cannot be solved until today, can be satisfactorily overcome.

Although silver nuclei in a silver halide emulsion are broken down by oxygen radicals which are derived from oxygen in air by a certain action, and as a result, silver gradually gathers to a sensitization speck to cause increase of sensitivity or increase of fog, the compounds represented by formulae (A-I) to (A-III) each is considered to trap the oxygen radicals and prevent breakdown of silver nuclei, thereby solving the above-described problems.

Further, the tabular silver halide grain of the present invention can have a large size, the sensitivity can be varied over a wide range using grains having the same size, and the large size grains can reduce light scattering in light-sensitive layers. Accordingly, sharpness can be improved. In the case of a color light-sensitive material, an interlayer effect is readily provided and therefore, in addition to the improvement of sharpness, the image quality can also be improved.

The magnetic recording layer for use in the present invention is described below.

The magnetic recording layer for use in the present invention is provided by coating an aqueous or organic solvent-base coating solution containing a binder having dispersed therein magnetic particles, on a support.

The magnetic particle for use in the present invention includes ferromagnetic iron oxide (e.g., $\gamma Fe_2O_3$), Co-doped $\gamma Fe_2O_3$, Co-doped magnetite, Co-containing magnetite, ferromagnetic chromium dioxide, ferromagnetic metal, ferromagnetic alloy, hexagonal Ba ferrite, Sr ferrite, Pb ferrite and Ca ferrite. Among these, Co-doped ferromagnetic iron oxide such as Co-doped $\gamma Fe_2O_3$ is preferred. The shape of the magnetic particle may be any of acicular, rice grain-like, spherical, cubic and platy forms. The specific surface area as $S_{BET}$ is preferably 20 m²/g or more, more preferably 30 m²/g or more. The saturation magnetization ($\sigma as$) of the ferromagnetic material is preferably from $3.0 \times 10^4$ to $3.0 \times 10^5$ A/m, more preferably from $4.0 \times 10^4$ to $2.5 \times 10^5$ A/m. The ferromagnetic particle may be subjected to surface treatment with silica and/or alumina or an organic material. Further, the ferromagnetic particle may be subjected to surface treatment with a silane coupling agent or a titanium coupling agent as described in JP-A-6-161032. Also, a magnetic particle having coated on the surface thereof an inorganic or organic material described in JP-A-4-259911 and JP-A-5-81652 may be used.

The binder for use in the magnetic particle includes a thermoplastic resin, a thermosetting resin, a radiation-curable resin, a reactive resin, an acid, alkali or biodegradable polymer, a natural polymer (e.g., cellulose derivative, saccharide derivative) and a mixture of these, described in JP-A-4-219569. The above-described resin has a Tg of from −40° C. to 300° C. and a weight average molecular weight of from 2,000 to 1,000,000. Examples of the resin include a vinyl copolymer, a cellulose derivative such as cellulose diacetate, cellulose triacetate, cellulose acetate propionate, cellulose acetate butyrate and cellulose tripropionate, an acrylic resin and a polyvinyl acetal resin, and gelatin is also preferably used. Among these, cellulose di(tri)acetate is preferred. The binder may be cured by adding thereto an epoxy-base, aziridine-base or isocyanate-base crosslinking agent. Examples of the isocyanate-base crosslinking agent include isocyanates such as tolylene-diisocyanate, 4,4,'-diphenylmethanediisocyanate, hexamethylenediisocyanate and xylylenediisocyanate, a reaction product of these isocyanates with polyalcohol (e.g., a reaction product of 3 mol of tolylenediisocyanate with 1 mol of trimethylolpropane) and a polyisocyanate produced by the condensation of these isocyanates, which are described, for example, in JP-A-6-59357.

The ferromagnetic material is dispersed into the binder by the method preferably using a kneader, a pin-type mill or an annular-type mill as described in JP-A-6-35092 and these may also be preferably used in combination. The dispersant described in JP-A-5-088283 and other known dipersants may be used. The thickness of the magnetic recording layer is from 0.1 to 10 μm, preferably from 0.2 to 5 μm, more preferably from 0.3 to 3 μm. The weight ratio of the magnetic particle to the binder is preferably from 0.5/100 to 60/100, more preferably from 1/100 to 30/100. The coating amount of magnetic particles is from 0.005 to 3 g/m², preferably from 0.01 to 2 g/m², more preferably from 0.02 to 0.5 g/m². The magnetic recording layer has a transmitted yellow density of preferably from 0.01 to 0.50, more preferably from 0.03 to 0.20, still more preferably from 0.04 to 0.15. The magnetic recording layer may be provided throughout the entire surface of or stripedly on the back surface of the photographic support by coating or printing. The magnetic recording layer can be coated using air doctor, blade, air knife, squeeze, soakage, reverse roller, transfer roller, gravure, kiss, cast, spray, dip, bar or extrusion, and the coating solution described in JP-A-5-341436 is preferred.

The magnetic recording layer may be designed to have additional functions such as improvement of lubricity, control of curl, electrostatic charge prevention, prevention of adhesion or head abrasion, or other functional layers may be provided to undertake these functions. At least one or more of particles is preferably an abrasive of an aspheric inorganic particle having a Mhos' hardness of 5 or more. The composition of the aspheric inorganic particle is preferably an oxide such as aluminum oxide, chromium oxide, silicon dioxide or titanium dioxide, a carbide such as silicon carbide or titanium carbide, or a fine particle of diamond. The abrasive may be subjected to surface treatment with a silane coupling agent or a titanium coupling agent. The particle may be added to a magnetic recording layer or may be overcoated on the magnetic recording layer (for example, as a protective layer or a lubricant layer). The binder used here may be one selected from those described above and it is preferably the same as the binder in the magnetic recording layer. The light-sensitive material having a magnetic recording layer is described in U.S. Pat. Nos. 5,336,589, 5,250, 404, 5,229,259 and 5,215,874 and European Patent 466130.

The light-sensitive material having a magnetic recording layer is larger in the degree of aging storability (increase of fog, increase of sensitivity), however, the light-sensitive material using the above-described tabular grain-containing emulsion and the compound represented by formula (A-I), (A-II) or (A-III) of the present invention in the layer containing the emulsion and/or a light-insensitive layer or other light-sensitive silver halide emulsion, is improved in this aging storability and the objects of the present invention can be attained. Further, the image quality can also be improved.

Figure 2:
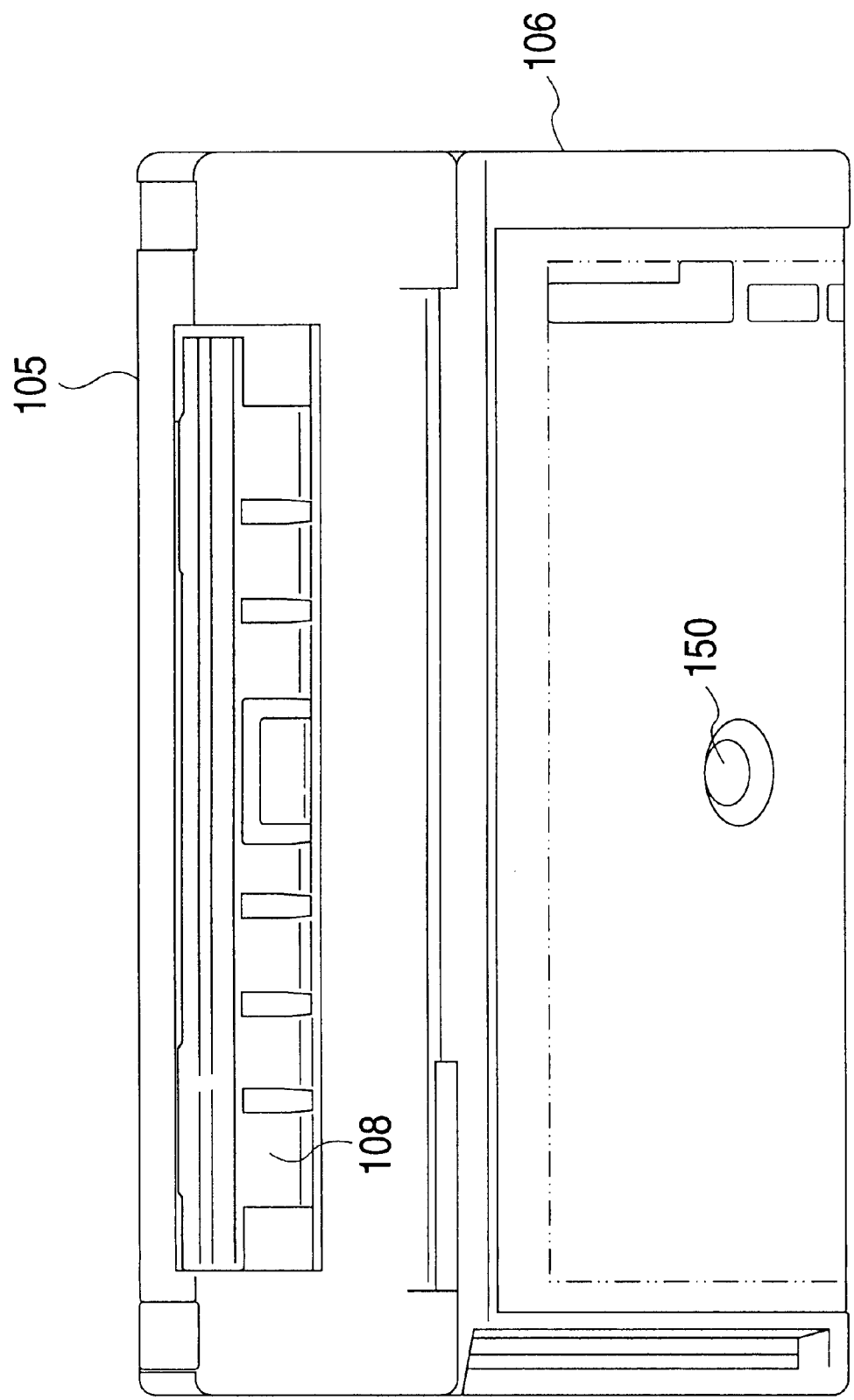
FIG. 2 is a view seen from the radius direction of the above-described package of a photographic light-sensitive material.
Figure 3:
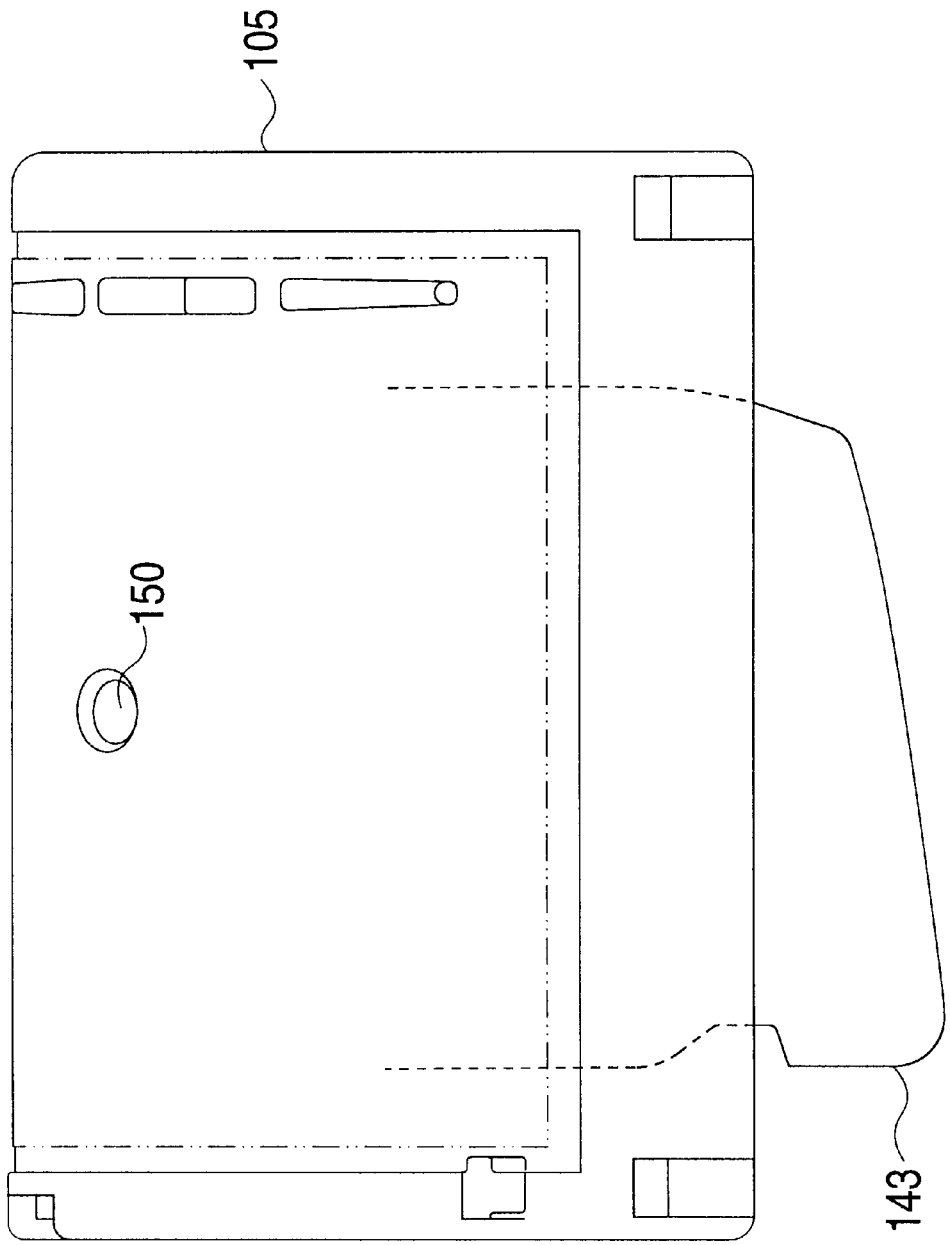
FIG. 3 is a view seen from the radius direction of the above-described package of a photographic light-sensitive material at the position different from that taken in FIG. 2.

A package 100 of the photographic light-sensitive material of the present invention (hereinafter sometimes referred to as a "photographic film patrone") is described below by referring to the attached drawings. FIG. 1 is an exploded perspective view of the photographic film patrone, FIG. 2 is a view seen from the radius direction of the photographic patrone, and FIG. 3 is a view seen from the radius direction at the position different from that taken in FIG. 2.

The photographic film patrone 100 comprises a patrone body 101 having rotatably housed in the inside thereof a spool 103 wound around with the photographic light-sensitive material (photographic film) 102 and a patrone label 104 is bonded to the outer periphery of the patrone body 101. The cartridge body (patrone body) 101 consists of two molded articles, namely, upper and lower cases 105 and 106.

Figure 5:
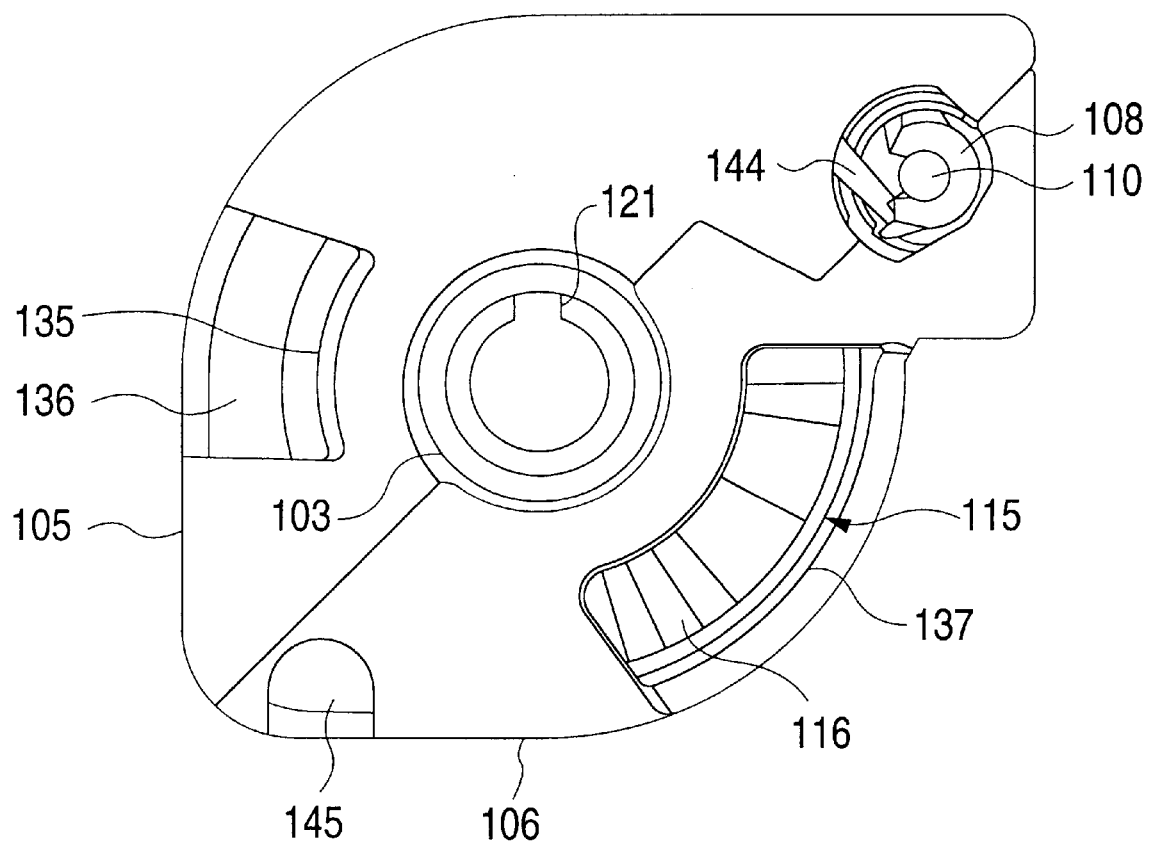
FIG. 5 is a view seen from another axial direction of the above-described package of a photographic light-sensitive material.

At the portion of connecting the upper case 105 having a gate 150 to the lower case 106 on the front surface side, a film delivery port 107 (passage) for delivering the photographic film 102 is formed. In the interior of the film delivery port 107, a lid member 108 for preventing enter of light from the port and a separation claw 109 for separating the leading end of the photographic film 102 disposed at the back of the lid member are provided. At both edges of the lid member 108, key grooves 110 and 111 are formed respectively and when the patrone is loaded in a camera, the lid member swingingly moves between the close position for shutting the film delivery port 107 and the open position for allowing the getting out of the photographic film in linking with rotational movement of the switch driving shaft on the camera side to be engaged with the key grooves 110 and 111. FIG. 5 shows a state where a lock pole 144 is engaged with the lid member 108 and the lid member is locked at the close position.

In the spool 103, a pair of flanges 113 and 114 with a lip are provided in the inside at both edge parts of the spool shaft 112 and a data disk is provided on the outer side of one flange 113. On the outer side of another flange 114, a use display member 123 is provided. A data label is attached to a data disk 115. The spool shaft 112, the data disk 115, a pair of flange fitting portions 117 and 118 for fitting in flanges 113 and 114, respectively, a slit 119 for anchoring the heel end of the photographic film and a supporting member 120 for supporting the use display member are integrally formed and when loaded in a camera, they rotatively move in linking with rotation of the driving shaft on the camera side engaged to the keyhole-shaped key grooves 121 and 122 provided at the both edge parts of the spool 103.

In the use display member 123, a bearing 124, two ratchet claws 125, a gear 126 and a use display board 127 are integrally formed and these rotate integrally with the spool shaft 112.

In the inside of the photographic film patrone 100, a spool lock 128 is housed so as to mesh with the gear 126. When the lid member 108 stays at the close position, the spool lock 128 is engaged with the gear 126 to lock rotation of the spool shaft 112 and thereby prevent careless delivery of the photographic film 102. When the lid member 108 stays at the open position, the spool lock is released from engagement to the gear 126.

Figure 6:
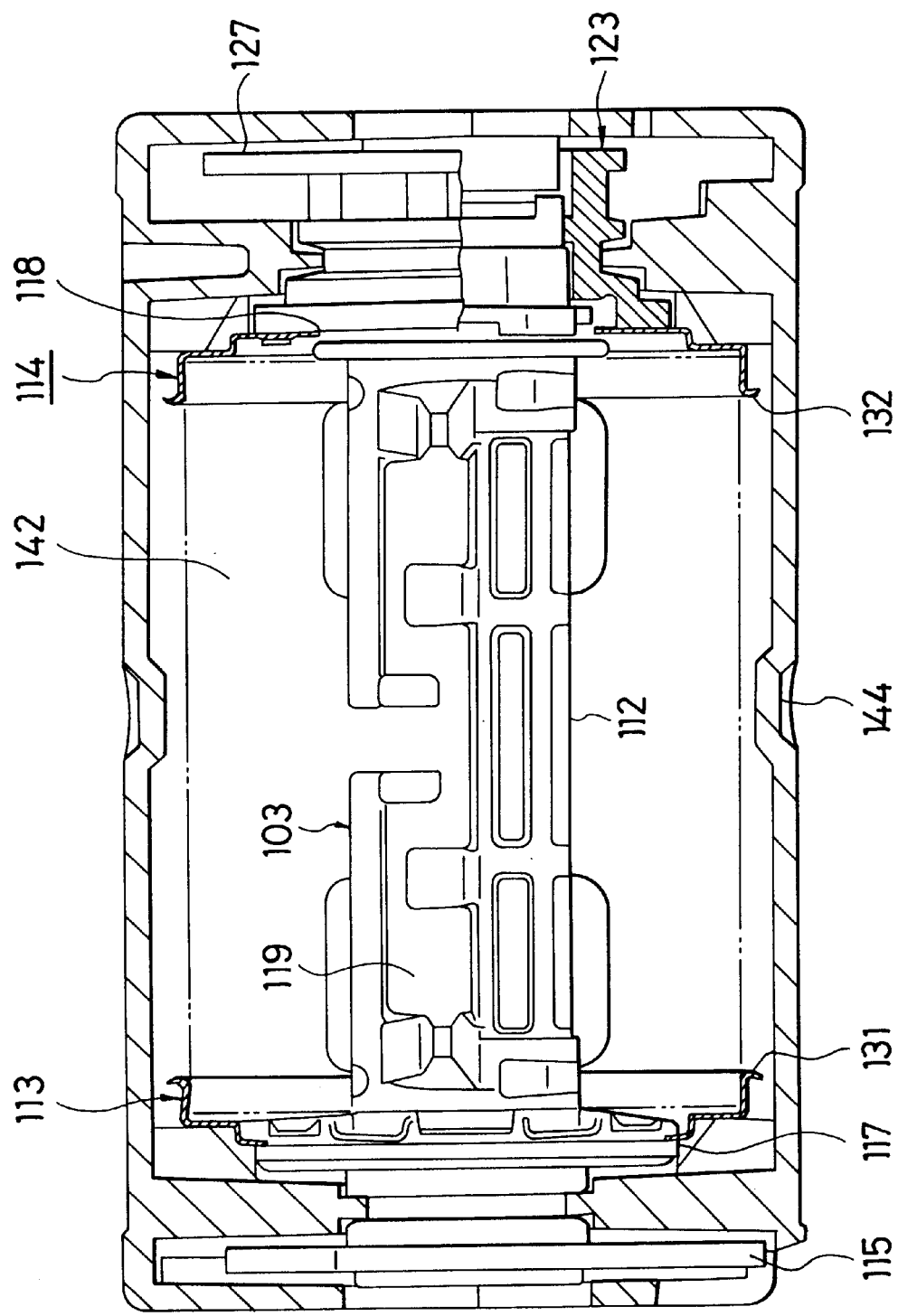
FIG. 6 is a cross section cut along the axial direction of the above-described package of a photographic light-sensitive material.

A pair of flanges 113 and 114 are formed of a plastic material and has a cross section in the thin-walled cup form. At the bottom portion of the cup, round holes 129 and 130 to be rotatably engaged with the flange fitting portions 117 and 118, respectively, are provided. The opening edge parts 131 and 132 of the cup are fixed to the spool shaft 112 to come to face with each other and both outermost peripheral edges of the photographic film 102 to be wound up are embraced therein (see, FIG. 6). Owing to these opening edge parts 131 and 132, rotation of the spool 103 can be transmitted to the outermost periphery of the photographic film 102 and also, loose winding of the film roll 142 is prevented.

In flange 114, four holes 133 are formed at a predetermined pitch to enclose the round hole 130. To these holes 133, ratchet claws 125 of the use display member 123 are engaged when the spool shaft 112 rotates toward the photographic film delivery direction. The ratchet claws 125 transmit rotation of the spool shaft 112 to the flange 114 when they are engaged to holes 133. When the spool shaft 112 rotates toward the photographic film take-up direction, the ratchet claws 125 of the use display member 123 get over the holes 133 and rotation of the spool shaft 112 is not transmitted to the flange 114.

In delivering the photographic film 102, the spool 103 is rotated toward the film delivery direction. When the spool 103 is rotated toward the film delivery direction, the leading end of the photographic film 102 is put into contact with the separation claw 109 and separated from the rolled part inside the photographic film leading end. Along subsequent rotation of the spool 103, a pair of flanges 113 and 114 small in the thickness each is shifted outward by the film leading end separated because they have elasticity. As a result, the leading end (143 in FIG. 3) of the photographic film is released from the embracement by a pair of flanges 113 and 114 and delivered outside the photographic film patrone 100 through the film delivery port. When the spool shaft 112 rotates toward the photographic film take-up direction (reverse direction to the photographic film delivery direction), flanges 113 and 114 do not rotate integrally with the spool shaft 112. Accordingly, when the photographic film 102 is wound up, the flanges 113 and 114 do not rotate and slide is generated between the opening edge parts 131, 132 and the photographic film 102. As a result, the photographic film 102 slides beneath the opening edge parts 131, 132 and the photographic film is wound up.

The data disk 115 comprises a large-diameter fan portion 134 and a notch portion 135. A bar code label 116 has a shape analogous to the data disk 115 and is attached to the data disk.

On the bar code label 116, a bar code is printed to give various information, for example, the kind of the photographic film 102 to be housed. Along rotation of the spool 103 toward the film delivery direction, the above-described information is read by a reading sensor provided on the camera side through the opening 136 formed on one side surface of the upper case 105 as shown in FIG. 5 and used for calculating the exposure value or counting the exposed frame number of the photographic film housed in the patrone.

The photographic film 102 including the leading end is wholly housed in the photographic film patrone 100 and therefore, it cannot be distinguished from the appearance whether the photographic film housed therein is unexposed or exposed. In order to prevent an accident such that the photographic film patrone 100 housing an exposed photographic film is again loaded in a camera and used for photographing, an opening 137 for preventing re-loading is formed on one side surface of the lower case 106. The patrone is inserted into the patrone chamber of a camera from this side surface and a lever to enter the opening 137 is provided in the patrone chamber.

In the photographic film patrone 100, the stop position of the spool 103 is controlled by the driving shaft in the camera side such that when an exposed photographic film is housed, the large-diameter fan portion 134 appears through the opening 137 and when an unexposed photographic film is housed, the large-diameter fan portion 134 does not appear through the opening 137. Accordingly, in the camera side, whether the photographic film housed is exposed or unexposed can be distinguished by detecting the movement amount of the lever.

Figure 4:
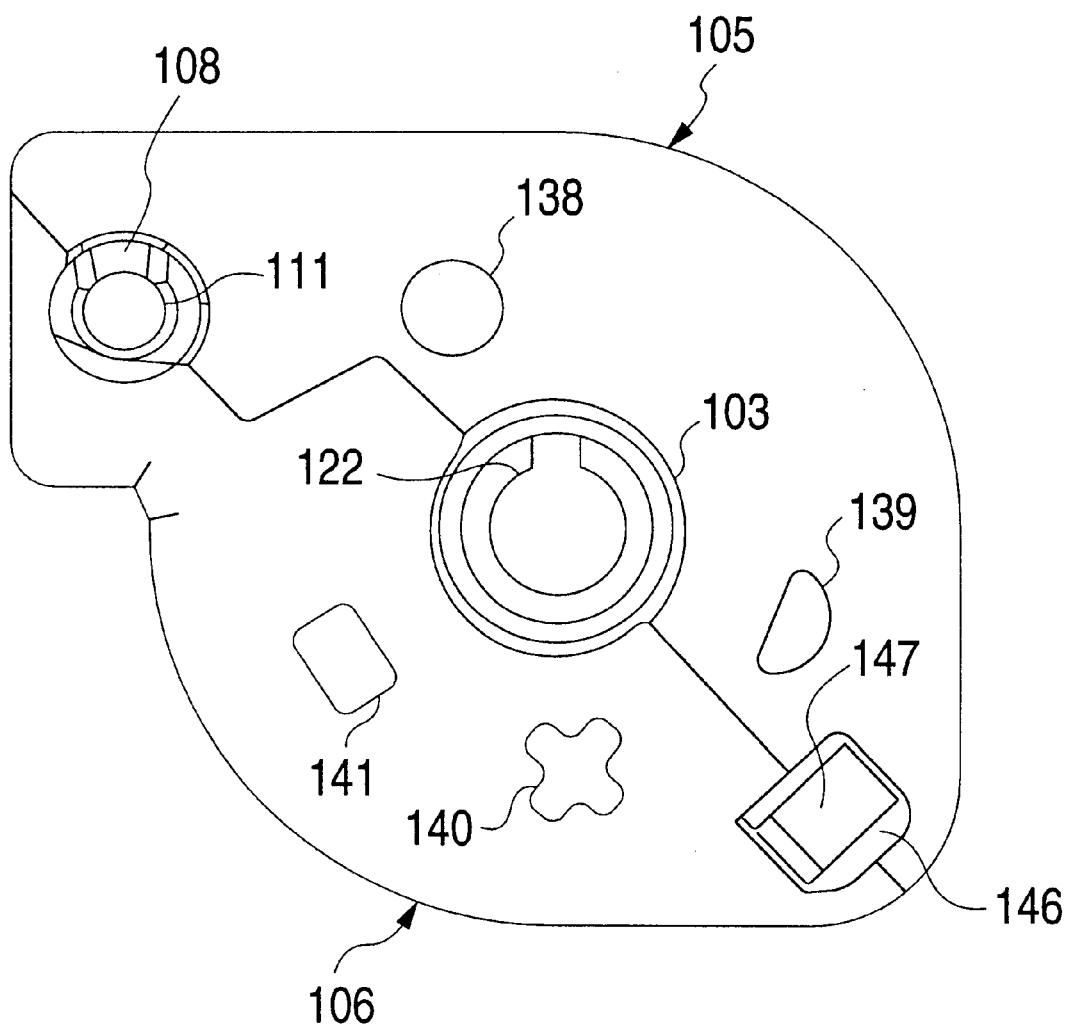
FIG. 4 is a view seen from one axial direction of the above-described package of a photographic light-sensitive material.

Further, in order to facilitate distinction by users even from the appearance, in the photographic film patrone 100, as shown in FIG. 4, a use state display opening 138 for use in the case of housing an unexposed photographic film, a use state display opening 139 for use in the case of housing a partly photographed film, a use state display opening 140 for use in the case of housing an entirely photographed and exposed photographic film, and a use state display opening 141 for use in the case of housing a developed photographic film, are formed on another side surface (the side surface opposite to the side surface where the openings 136 and 137 are provided). The use display board 127 positioned in the interior is forced to come appear in any one of the above-described four use state display openings 138 to 141 by controlling the stop position of the spool 103, thereby displaying the use state of the photographic film.

In the patrone 100 of the present invention, a sensitivity detecting notch 145 for detecting sensitivity of the photographic film 102 housed therein is provided. The notch detects sensitivity in a cheap camera having no bar code reader for reading the bar code written on the bar code label. When the sensitivity detecting notch 145 is provided as shown in FIG. 5, the photographic film housed has an ISO sensitivity of 400 or more, and when the notch is not provided, it reveals that the ISO sensitivity is 400 or less.

Further, in the patrone 100 of the present invention, a development ending display tab for indicating whether the photographic film 102 housed is developed or not, is provided. As shown in FIG. 4, the tab 147 is provided within the opening 146 provided on one side surface of the patrone 100 and when the tab 147 is turned and removed, it reveals that the photographic film 102 housed is developed.

A representative example of the production method of the patrone 100 of the present invention is described specifically below. The upper and lower cases 105 and 106, the spool 103 and the lid member 108 are formed by an injection molding method using a resin obtained by kneading into a high impact polystyrene resin (Decanstyrol HI—R—Q, produced by Denki Kagaku Kogyo K K) 1.0 wt% of carbon black (Mitsubishi Carbon Black #950, produced by Mitsubishi Chemical K K) for imparting a light-shielding property and 1.5 wt% of a silicone oil (Shin-Etsu Silicone KF96H, produced by Shin-Etsu Chemical KK; viscosity: 30,000 cs) for imparting lubricity.

The use display member 123 is formed by an injection molding method using a resin obtained by kneading into the above-described high impact polystyrene resin 0.01 wt% of the above-described carbon black and 3.5 wt% of titanium dioxide (CR60-2, produced by Ishihara Sangyo Kaisha, Ltd.).

The flanges 113 and 114 are molded by a vacuum/pressure formation method using a 150 μm-thick film formed from a polymer alloy (Zylon X9101, produced by Asahi Chemical Industry Co., Ltd.) of a polystyrene resin and a polyphenylene ether resin.

Figure 7:
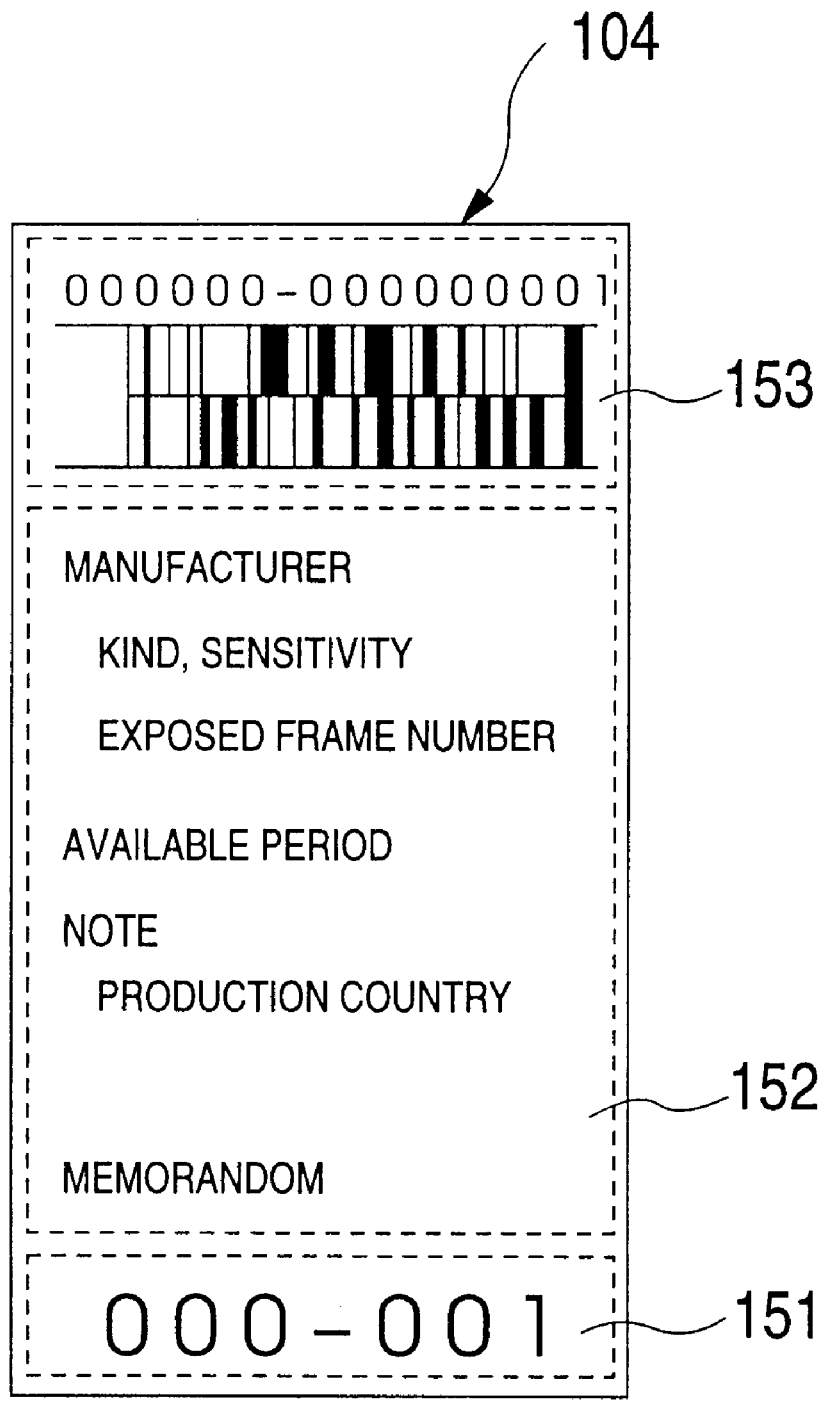
FIG. 7 is a view showing an adhesive label sheet with release paper.

The patrone label 104 is produced as follows. One surface of a 50 μm-thick white pigment-containing polystyrene film is subjected to coating for imparting printing adaptability. A pressure-sensitive adhesive is provided on the back surface of the film and a release paper was bonded thereto to prepare an adhesive label sheet with a release paper. The front surface of the sheet has, as shown in FIG. 7, a printing space 151 for printing the patrone ID number written in numerals, a product type printing space 152 for printing the name of makers, the trade name, the kind, sensitivity and exposed frame number of the film, the instructions and the blank for notes to be taken by users, and a bar code printing space 153. The product type printing space is first printed, a half-cut processing follows, and then the bar code and the patrone ID number are printed. The bar code includes the name of manufacturer, the production lot, the production date, the kind, sensitivity and exposed frame number of the photographic film housed, and the patrone ID number, which all are coded and printed. The cartridge ID number is a particular number each cartridge has.

The bar code label 116 is produced as follows. On one surface of a 50 μm-thick transparent polystyrene film, an aluminum-deposited layer having a thickness of about 400 Å is provided, a pressure-sensitive adhesive agent is applied thereon and a release paper is attached thereto to prepare an adhesive label with a release paper. A bar code is printed on the surface opposite to the aluminum-deposited layer, the outer peripheral portion is subjected to half-cut processing and the center part is punched.

In the present invention, the above-described photographic light-sensitive material is housed in a package of which structure and production method according to an example are described above. The objects of the present invention can also be attained even in the case of a photographic light-sensitive material housed in such a package.

The light-sensitive material of the present invention may suffice if it has at least one light-sensitive silver layer on the support. A typical example thereof is a silver halide photographic light-sensitive material comprising a support having thereon at least one light-sensitive layer consisting of a plurality of silver halide emulsion layers having substantially the same spectral sensitivity but different in the light sensitivity. The light-sensitive layer includes a unit light-sensitive layer having spectral sensitivity to any of blue light, green light and red light. In the case of a multi-layer silver halide color photographic light-sensitive material, the arrangement of unit light-sensitive layers are generally such that a red-sensitive layer, a green-sensitive layer and a blue-sensitive layer are provided in this order from the support side. However, depending upon the purpose, the above arrangement order may be reversed or a layer different in the light sensitivity may be superposed between layers having the same spectral sensitivity. A light-insensitive layer may be provided between the above-described silver halide light-sensitive layers or as an uppermost layer or the lowermost layer. These layers may contain a coupler, a DIR compound or a color mixing inhibitor which will be described later. The silver halide emulsion layers in plurality constituting each unit light-sensitive layer are preferably arranged such that two layers of a high-sensitivity emulsion layer and a low-sensitivity emulsion layer are provided so that the light sensitivity can be lowered in sequence towards the support as described in German Patent 1,121,470 and British Patent 923,045. Further, it is also possible to provide a low-sensitivity emulsion layer farther from the support and a high-sensitivity emulsion layer nearer to the support as described in JP-A-57-112751, JP-A-62-200350, JP-A-62-206541 and JP-A-62-206543.

Specific examples of the layer arrangement include an order, from the farthest side to the support, of a low-sensitivity blue-sensitive layer (BL)/a high-sensitivity blue-sensitive layer (BH)/a high-sensitivity green-sensitive layer (GH)/a low-sensitivity green-sensitive layer (GL)/a high-sensitivity red-sensitive layer (RH)/a low-sensitivity red-sensitive layer (RL), an order of BH/BL/GL/GH/RH/RL and an order of BH/BL/GH/GL/RL/RH.

Also, as described in JP-B-55-34932, a blue-sensitive layer/GH/RH/GL/RL may be arranged in this order from the farthest side to the support. Further, as described in JP-A56-25738 and JP-A-62-63936, a blue-sensitive layer/GL/RL/GH/RH may be arranged in this order from the farthest side to the support.

An arrangement consisting of three layers different in the light sensitivity may be used as described in JP-B-49-15495 where a silver halide emulsion layer having the highest light sensitivity is provided as an upper layer, a silver halide emulsion layer having a light sensitivity lower than that of the upper layer is provided as a medium layer and a silver halide emulsion layer having a light sensitivity lower than that of the medium layer is provided as a lower layer so that the light sensitivity can be lowered in sequence towards the support. Even in the case of arrangement constituted by these three layers different in the light sensitivity, as described in JP-A-59-202464, a medium-sensitivity emulsion layer/a high-sensitivity emulsion layer/a low-sensitivity emulsion layer may be provided in this order from the farthest side to the support in the layer having the same spectral sensitivity.

In addition, an order of a high-sensitivity emulsion layer/a low-sensitivity emulsion layer/a medium-sensitivity emulsion layer or an order of a low-sensitivity emulsion layer/a medium-sensitivity emulsion layer/a high-sensitivity emulsion layer may also be used. In the case of a four or more layer structure, the layer arrangement may also be changed as described above.

In order to improve color reproducibility, a donor layer (CL) having a spectral sensitivity distribution different from that of main light-sensitive layers such as BL, GL and RL and capable of providing an interlayer effect, is preferably provided adjacent to or in the vicinity of a main light-sensitive layer as described in U.S. Pat. Nos. 4,663,271, 4,705,744 and 4,707,436, JP-A-62-160448 and JP-A63-89850.

In the present invention, a light-insensitive fine grain silver halide is preferably used. The term "light-insensitive fine grain silver halide" as used herein means a silver halide fine grain which is not sensitive to light at the imagewise exposure for obtaining a dye image and substantially not developed in the development processing. The light-insensitive fine grain silver halide is preferably not fogged previously. The fine grain silver halide has a silver bromide content of from 0 to 100 mol% and may contain, if desired, silver chloride and/or silver iodide. It preferably contains from 0.5 to 10 mol% of silver iodide. The fine grain silver halide has an average grain size (an average of circle-corresponding diameters of the projected area) of preferably from 0.01 to 0.5 µm, more preferably from 0.02 to 0.2 µm.

The fine grain silver halide can be prepared by the same method as that for the normal light-sensitive silver halide. The surface of the silver halide grain needs not be optically sensitized or spectrally sensitized. However, it is preferred to add a known stabilizer such as a triazole-base compound, an azaindene-base compound, a benzothiazolium-base compound, a mercapto-base compound or a zinc compound, to the fine grain silver halide in advance of the addition to a coating solution. A layer containing the fine grain silver halide grain may contain colloidal silver.

The light-sensitive material of the present invention has a coated silver amount of preferably 10.0 g/m$^2$ or less, more preferably 6.0 g/m$^2$ or less, most preferably 4.5 g/m$^2$ or less.

The photographic additives which can be used in the present invention are also described in RDs and the portions having pertinent description are shown in the table below.

| Kinds of Additives | RD17643 | RD18716 | RD307105 |
|---|---|---|---|
| 1. Chemical sensitizer | p. 23 | p. 648, right col. | p. 866 |
| 2. Sensitivity increasing agent | | p. 648, right col. | |
| 3. Spectral sensitizer, supersensitizer | pp. 23–24 | p. 648, right col.-p. 649, right col. | pp. 866–868 |
| 4. Whitening agent | p. 24 | p. 647, right col. | p. 868 |
| 5. Light absorbent, filter dye, Uv absorbent | pp. 25–26 | p. 649, right col.-p. 650, left col. | p. 873 |
| 6. Binder | p. 26 | p. 651, left col. | pp. 873–874 |
| 7. Plasticizer, lubricant | p. 27 | p. 650, right col. | p. 876 |
| 8. Coating aid, surface active agent | pp. 26–27 | p. 650, right col. | pp. 875–876 |
| 9. Antistatic agent | p. 27 | p. 650, right col. | pp. 876–877 |
| 10. Matting agent | | | pp. 878–879 |

Various dye-forming couplers can be used in the light-sensitive material of the present invention and the following couplers are particularly preferred.

Yellow Coupler

Couplers represented by formulae (I) and (II) of EP-A-502424; couplers represented by formulae (1) and (2) (particularly, Y-28 at page 18) of EP-A-513496; couplers represented by formula (I) in claim 1 of EP-A-568037; couplers represented by formula (I) in column 1, lines 45 to 55 of U.S. Pat. No. 5,066,576; couplers represented by formula (I) in paragraph 0008 of JP-A-4-274425; couplers (particularly, D-35 at page 18) described in claim 1 at page 40 of EP-A-498381; couplers represented by formula (Y) at page 4 (particularly, Y-1 (page 17) and Y-54 (page 41)) of EP-A-447969; couplers represented by formulae (II) to (IV) in column 7, lines 36 to 58 (particularly, II-17, II-19 (column 17) and II-24 (column 19)) of U.S. Pat. No. 4,476,219.

Magenta Coupler

L-57 (page 11, right lower column), L-68 (page 12, right lower column) and L-77 (page 13, right lower column) of JP-A-3-39737; [A-4]-63 (page 134), [A-4]-73 and [A-4]-75 (page 139) of European Patent 456257; M-4, M-6 (page 26) and M-7 (page 27) of European Patent 486965; M-45 (page 19) of EP-A-571959; M-1 (page 6) of JP-A-5-204106; M-22 in paragraph 0237 of JP-A-4-362631.

Cyan Coupler

CX-1, CX-3, CX-4, CX-5, CX-11, CX-12, CX-14 and CX-15 (pages 14 to 16) of JP-A-4-204843; C-7, C-10 (page 35), C-34, C-35 (page 37), (I-1) and (I-17) (pages 42 and 43) of JP-A-4-43345; couplers represented by formulae (Ia) and (Ib) in claim 1 of JP-A-6-67385.

Polymer Coupler

P-1 and P-5 (page 11) of JP-A-2-44345.

As the coupler which provides a colored dye having an appropriate diffusibility, those described in U.S. Pat. No. 4,366,237, British Patent 2,125,570, EP-B-96873 and German Patent 3,234,533 are preferred.

As the coupler for correcting unnecessary absorption of a colored dye, yellow colored cyan couplers represented by formulae (CI), (CII), (CIII) and (CIV) described at page 5 of EP-A-456257 (particularly, YC-86 at page 84); Yellow Colored Magenta Couplers ExM-7 (page 202), EX-1 (page 249) and EX-7 (page 251) described in EP-A-456257; Magenta Colored Cyan Couplers CC-9 (column 8) and CC-13 (column 10) described in U.S. Pat. No. 4,833,069; and colorless masking couplers represented by formula (2) (column 8) of U.S. Pat. No. 4,837,136 and formula (A) in claim 1 of WO92/11575 (particularly, compounds described in pages 36 to 45) are preferred.

Compounds (including couplers) which release a photographically useful compound residue upon reaction with an oxidation product of a developing agent are described below.

Development Inhibitor-Releasing Compound

Compounds represented by formulae (I), (II), (III) and (IV) described at page 11 of EP-A-378236 (particularly, T-101 (page 30), T-104 (page 31), T-113 (page 36), T-131 (page 45), T-144 (page 51) and T-158 (page 58)); compounds represented by formula (I) described at page 7 of EP-A-436938 (particularly, D-49 (page 51)); compounds represented by formula (1) of EP-A-568037 (particularly, (23) (page 11)); and compounds represented by formulae (I), (II) and (III) described at pages 5 and 6 of EP-A-440195 (particularly, I-(1) at page 29);

Bleaching Accelerator-Releasing Compound

Compounds represented by formulae (I) and (I') at page 5 of EP-A-310125 (particularly, (60) and (61) at page 61); and compounds represented by formula (I) in claim 1 of JP-A-6-59411 (particularly, (7) (page 7));

Ligand-Releasing Compound

Compounds represented by LIG-X described in claim 1 of U.S. Pat. No. 4,555,478 (particularly, compounds in column 12, lines 21 to 41);

Leuco Dye-Releasing Compound

Compounds 1 to 6 in columns 3 to 8 of U.S. Pat. No. 4,749,641;

Fluorescent Dye-Releasing Compound

Compounds represented by COUP-DYE in claim 1 of U.S. Pat. No. 4,774,181 (particularly, compounds 1 to 11 in columns 7 to 10);

Development Accelerator- or Fogging Agent-Releasing Compound

Compounds represented by formulae (1), (2) and (3) in column 3 of U.S. Pat. No. 4,656,123 (particularly (I-22) in column 25) and ExZK-2 at page 75, lines 36 to 38 of EP-A450637;

Compound Which Releases Group Capable of Becoming Dye First When Released

Compounds represented by formula (I) in claim 1 of U.S. Pat. No. 4,857,447 (particularly, Y-1 to Y-19 in columns 25 to 36).

Preferred additives other than couplers are described below.

Dispersion Medium of Oil-Soluble Organic Compound

P-3, P-5, P-16, P-19, P-25, P-30, P-42, P-49, P-54, P-55, P-66, P-81, P-85, P-86 and P-93 of JP-A-62-215272 (pages 140 to 144);

Latex for Impregnation of Oil-Soluble Organic Compound

Latexes described in U.S. Pat. No. 4,199,363;

Developing Agent Oxidation Product Scavenger

Compounds represented by formula (I) in column 2, lines 54 to 62 of U.S. Pat. No. 4,978,606 (particularly, I-(1), I-(2), I-(6) and I-(12) (columns 4 to 5)) and compounds represented by the formulae in column 2, lines 5 to 10 of U.S. Pat. No. 4,923,787 (particularly, Compound 1 (column 3));

Stain Inhibitor

Compounds represented by formulae (I) to (III) at page 4, lines 30 to 33 of EP-A-298321 (particularly, I-47, I-72, III-1 and III-27 (pages 24 to 48));

Discoloration Inhibitor

A-6, A-7, A-20, A-21, A-23, A-24, A-25, A-26, A-30, A-37, A-40, A-42, A-48, A-63, A-90, A-92, A-94 and A-164 (pages 69 to 118) of EP-A-29832, II-1 to III-23 in columns 25 to 38 of U.S. Pat. No. 5,122,444 (particularly, III-10), I-1 to III-4 at pages 8 to 12 of EP-A-471347 (particularly, II-2) and A-1 to A-48 in columns 32 to 40 of U.S. Pat. No. 5,139,931 (particularly, A-39 and A-42);

Material Which Reduces Use Amount of Coloration Reinforcing Agent or Color Mixing Inhibitor I-1 to II-15 at pages 5 to 24 of EP-A-411324 (particularly, I-46);

Formalin Scavenger

SCV-1 to SCV-28 at pages 24 to 29 of EP-A-477932 (particularly SCV-8);

Hardening Agent

H-1, H-4, H-6, H-8 and H-14 at page 17 of JP-A-1214845, compounds (H-1 to H-54) represented by formulae (VII) to (XII) in columns 13 to 23 of U.S. Pat. No. 4,618,573, Compounds (H-1 to H-76) represented by formula (6) at page 8, right lower column of JP-A-2-214852 (particularly, H-14) and compounds described in claim 1 of U.S. Pat. No. 3,325,287;

Development Inhibitor Precursor

P-24, P-37 and P-39 of JP-A-62-168139 (pages 6 to 7) and compounds described in claim 1 of U.S. Pat. No. 5,019,492 (particularly, 28 and 29 in column 7);

Antiseptic, Antimold

I-1 to III-43 in columns 3 to 15 of U.S. Pat. No. 4,923,790 (particularly, II-1, II-9, II-10, II-18 and III-25);

Stabilizer, Antifoggant

I-1 to (14) in columns 6 to 16 of U.S. Pat. No. 4,923,793 (particularly, I-1, I-60, (2) and (13)) and Compounds 1 to 65 in columns 25 to 32 of U.S. Pat. No. 4,952,483 (particularly, 36);

Chemical Sensitizer triphenylphosphine, selenide and Compound 50 of JP-A-5-40324;

Dye a-1 to b-20 at pages 15 to 18 (particularly, a-1, a-12, a-18, a-27, a-35, a-36 and b-5) and V-1 to V-23 at pages 27 to 29 (particularly, V-1) of JP-A-3-156450, F-I-1 to F-II-43 at pages 33 to 55 of EP-A-445627 (particularly, F-I-11 and F-II-8), III-1 to III-36 at pages 17 to 28 (particularly, III-1 and III-3) of EP-A-457153, fine crystal dispersion products of Dye-1 to Dye-124 at pages 8 to 26 of WO88/04794, Compounds 1 to 22 at pages 6 to 11 of EP-A-319999 (particularly, Compound 1), Compounds D-1 to D-87 (pages 3 to 28) represented by formulae (1) to (3) of EP-A-519306, Compounds 1 to 22 (columns 3 to 10) represented by formula (I) of U.S. Pat. No. 4,268,622 and compounds (1) to (31) (columns 2 to 9) represented by formula (I) of U.S. Pat. No. 4,923,788;

UV Absorbent

Compounds (18b) to (18r) represented by formula (1) and 101 to 427 (pages 6 to 9) of JP-A-46-3335, compounds (3) to (66) (pages 10 to 44) represented by formula (I) and compounds HBT-1 to HBT-10 (page 14) represented by formula (III) of EP-A-520938, and compounds (1) to (31) (columns 2 to 9) represented by formula (1) of EP-A-521823.

The present invention can be applied to a B/W (black-and-white) light-sensitive materail and to various color light-sensitive materials such as color negative film for general use or for movie, color reversal film for slide or for television, color paper, color positive film and color reversal paper. Further, the present invention is suitably used for a film unit with a lens described in JP-B-2-32615 and JP-U-B-3-39784 (the term "JP-U-B" as used herein means an "examined Japanese utility model publication").

The support which can be suitably used in the present invention is described, for example, in RD No. 17643, page 28, ibid., No. 18716, from page 647, right column to page 648, left column and ibid., No. 307105, page 879.

In the light-sensitive material of the present invention, the total thickness of all hydrophilic colloid layers on the side having emulsion layers is preferably 28 $\mu$m or less, more preferably 23 $\mu$m or less, still more preferably 18 $\mu$m or less and most preferably 16 $\mu$m or less. The film swelling speed $T_{1/2}$ is preferably 30 seconds or less, more preferably 20 seconds or less. $T_{1/2}$ is defined as the time required for the film thickness to reach a half (½) of a saturation film thickness which corresponds to 90% of the maximum swollen thickness achieved at the processing with a color developer at 30° C. for 3 minutes and 15 seconds. The film thickness means a film thickness determined at 25° C. and 55% RH (relative humidity) under humidity conditioning for 2 days. $T_{1/2}$ can be measured by means of a swellometer described in A. Green et al, *Photogr. Sci. Eng.,* Vol. 19, 2, pp. 124–129. The $T_{1/2}$ can be adjusted by adding a hardening agent to gelatin as a binder or changing the aging conditions after coating. The swelling rate is preferably from 150 to 400%. The swelling rate can be obtained from the maximum swollen film thickness under the above-described conditions according to the formula: (maximum swollen film thickness film thickness)/film thickness.

In the light-sensitive material of the present invention, on the side opposite to the side having emulsion layers, hydrophilic colloid layers (called back layer) having a total dry thickness of from 2 to 20 $\mu$m are preferably provided. This back layer preferably contains a light absorbent, a filter dye, an ultraviolet absorbent, an antistatic agent, a hardening agent, a binder, a plasticizer, a lubricant, a coating agent or a surface active agent, which are described above. The back layer has a swelling rate of preferably from 150 to 500%.

The light-sensitive material of the present invention can be developed according to usual methods described in RD No. 17643, pp. 28–29, ibid., No. 18716, p. 651, from left to right columns and ibid., No. 307105, pp. 880–881.

The processing solution for a color negative film for use in the present invention is described below.

The color developer for use in the present invention may use the compounds described in JP-A-4-121739, from page 9, right upper column, line 1 to page 11, left lower column, line 4. In conducting rapid processing, the color developing agent is preferably 2-methyl-4-[N-ethyl-N-(2-hydroxyethyl)-amino]aniline, 2-methyl-4-[N-ethyl-N-(3-hydroxypropyl)-amino]aniline or 2-methyl-4-[N-ethyl-N-(4-hydroxybutyl)-amino]aniline.

The color developing agent is used at a concentration of preferably from 0.01 to 0.08 mol, more preferably from 0.015 to 0.06, still more preferably from 0.02 to 0.05 mol, per l of the color developer. The replenisher for the color developer preferably contains the color developing agent in an amount of from 1.1 to 3 times, preferably from 1.3 to 2.5 times, the above-described concentration.

As the preservative for the color developer, hydroxylamine can be widely used, but in the case where higher preservability is required, a hydroxylamine derivative having a substituent such as an alkyl group, a hydroxylalkyl group, a sulfoalkyl group or a carboxylalkyl group is preferred and preferred specific examples thereof include N,N-di(sulfoethyl)hydroxylamine, monomethylhydroxylamine, dimethylhydroxylamine, monoethylhydroxylamine, diethylhydroxylamine and N,N-di(carboxyethyl)hydroxylamine. Among these, N,N-di(sulfoethyl)hydroxylamine is more preferred. These compounds each may be used in combination with hydroxylamine but it is preferred to use one or more of these compounds in place of hydroxylamine.

The preservative is preferably used in a concentration of from 0.02 to 0.2 mol/l, more preferably from 0.03 to 0.15 mol/l, still more preferably from 0.04 to 0.1 mol/l. In the replenisher, the same as in the case of a color developing agent, the preservative is preferably contained at a concentration of from 1.1 to 3 times the concentration of the mother solution (processing tank solution).

As the agent for preventing formation of an oxidation product of the color developing agent into tar, the color developer contains a sulfite. The sulfite is preferably used in a concentration of from 0.01 to 0.05 mol/l, more preferably from 0.02 to 0.04 mol/l. In the replenisher, it is used at a concentration of from 1.1 to 3 times the above-described concentration.

The color developer has a pH of preferably from 9.8 to 11.0, more preferably from 10.0 to 10.5. In the replenisher, the pH is preferably set from 0.1 to 1.0 higher than the above-described range. In order to stably maintain the pH in the above-described range, a known buffer such as carbonate, phosphate, sulfosalicylate or borate may be used.

The replenishing amount of the color developer is preferably from 80 to 1,300 ml per $m^2$ of the light-sensitive material, but in view of reduction in the environmental pollution load, it is preferably lower, specifically, from 80 to 600 ml, more preferably from 80 to 400 ml, per $m^2$ of the light-sensitive material.

The bromide ion concentration in the color developer is usually from 0.01 to 0.06 mol/l, but for the purpose of improving discrimination by suppressing fogging while keeping sensitivity and at the same time for improving the granularity, it is preferably set to from 0.015 to 0.03 mol/l. The bromide ion concentration may be adjusted to the above-described range by incorporating bromide ions into the replenisher in such an amount as calculated according to the following formula, however, when C becomes a negative value, it is preferred to incorporate no bromide ion into the replenisher.

$$C = A \cdot W/V$$

C: bromide ion concentration (mol/l) in the replenisher for the color developer

A: bromide ion concentration (mol/l) in the objective color developer

W: amount (mol) of bromide ions eluted from the light-sensitive material into the color developer when 1 m² of the light-sensitive material is color developed V: replenishing amount (l) of the replenisher for the color developer per 1 m² of the light-sensitive material Also, when the replenishing amount is reduced or when the bromide ion concentration is set high, a development accelerator may be preferably used in order to increase the sensitivity and examples of the development accelerator include pyrazolidones such as 1-phenyl-3-pyrazolidone and 1-phenyl-2-methyl-2-hydroxymethyl-3-pyrazolidone, and thioether compounds such as 3,6-dithia-1,8-octanediol.

To the processing solution having bleaching ability in the present invention, the compounds and the processing conditions described in JP-A-4-125558, from page 4, left lower column, line 16 to page 7, left lower column, line 6 may be applied.

The bleaching agent preferably has an oxidation-reduction potential of 150 mV or more and preferred specific examples thereof include those described in JP-A-5-72694 and JP-A-5-173312. In particular, 1,3-diaminopropanetetraacetic acid and a ferric complex salt of Compound 1 as a specific example described at page 7 of JP-A-5-173312 are preferred.

Further, in order to improve biodegradability of the bleaching agent, a ferric complex salt of the compounds described in JP-A-4-251845, JP-A-4-268552, European Patents 588289 and 591934, and JP-A-6-208213 is preferably used as the bleaching agent. The concentration of the bleaching agent is preferably from 0.05 to 0.3 mol per l of the solution having bleaching ability and in particular, for the purpose of reducing the discharge to the environment, the concentration is preferably set to from 0.1 to 0.15 mol per l of the solution having bleaching ability. Further, when the solution having bleaching ability is a bleaching solution, bromide is preferably incorporated thereinto in an amount of from 0.2 to 1 mol/l, more preferably from 0.3 to 0.8 mol/l.

The replenisher for the solution having bleaching ability basically contains respective components each at a concentration calculated according to the following formula, whereby the concentrations in the mother solution can be maintained constant:

$$C_R = C_T \times (V_1 + V_2)/V_1 + C_P$$

$C_R$: concentration of the component in the replenisher $C_T$: concentration of the component in the mother solution (processing tank solution)

$C_P$: concentration of the component consumed during the processing $V_1$: replenishing amount (ml) of the replenisher having bleaching ability per 1 m² of the light-sensitive material $V_2$ amount (ml) carried over from the previous bath by 1 m² of the light-sensitive material In addition, the bleaching solution preferably contains a pH buffer, particularly preferably a dicarboxylic acid having a low odor such as succinic acid, a maleic acid, a malonic acid, a glutaric acid or an adipic acid. Also, a known bleaching accelerator described in JP-A-53-95630, RD No. 17129 and U.S. Pat. No. 3,893,858 is preferably used.

The bleaching solution is preferably replenished by the bleaching replenisher in an amount of from 50 to 1,000 ml, preferably from 80 to 500 ml, more preferably from 100 to 300 ml, per m² of the light-sensitive material. Further, the bleaching solution is preferably subjected to aeration.

To the processing solution having fixing ability, the compounds and the processing conditions described in JP-A-4-125558, from page 7, left lower column, line 10 to page 8, right lower column, line 19 may be applied.

In particular, in order to improve the fixing rate and the preservability, the compounds represented by formulae (I) and (II) of JP-A-6-301169 are preferably incorporated individually or in combination into the processing solution having fixing ability. Further, it is also preferred, in view of improvement in the preservability, to use a sulfinic acid described in JP-A-1-224762 including p-toluene sulfinate.

The solution having bleaching ability or the solution having fixing ability preferably uses an ammonium as a cation for the purpose of improving desilvering property, however, in view of reduction in the environmental pollution, it is preferred to reduce the use amount of ammonium or to use no ammonium.

In the bleaching, bleach-fixing and fixing steps, jet stirring described in JP-A-1-309059 is particularly preferably conducted.

The replenishing amount of the replenisher in the bleach-fixing or fixing step is from 100 to 1,000 ml, preferably from 150 to 700 ml, more preferably from 200 to 600 ml, per m² of the light-sensitive material.

In the bleach-fixing or fixing step, a silver recovery device of various types is preferably provided as an in-line or off-line system to recover silver. By providing the device as an in-line system, the silver concentration in the solution can be reduced during the processing and the replenishing amount can be reduced. It is also preferred to recover the silver in an off-line system and re-use the residual solution as the replenisher.

The bleach-fixing step or the fixing step may be constituted by a plurality of processing tanks and respective tanks are preferably piped in a cascade manner to provide a multi-stage countercurrent system. In view of balance with the size of the developing machine, two-tank cascade constitution is generally efficient and the ratio of the processing time in the pre-stage tank to the processing time in the post-stage tank is preferably from 0.5/1 to 1/0.5, more preferably from 0.8/1 to 1/0.8.

The bleach-fixing solution or the fixing solution preferably contains a free chelating agent not converted into a metal complex for the purpose of improving the preservability, and the chelating agent used to this effect is preferably a biodegradable chelating agent described with respect to the bleaching solution.

To the water washing and stabilization steps, the contents described in JP-A-4-125558, from page 12, right lower column, line 6 to page 13, right lower column, line 16 can be preferably applied. In particular, in view of conservation of the work environment, the stabilizing solution preferably uses an azolylmethylamine described in European Patents 504609 and 519190 or an N-methylolazole described in JP-A-4-362943 in place of formaldehyde or it is preferably a surface active agent solution using a magenta coupler formed into a two-equivalent coupler and containing no image stabilizer such as formaldehyde.

Further, in order to reduce the dusts attached to the magnetic recording layer coated on a light-sensitive material, a stabilizing solution described in JP-A-6-289559 is preferably used.

The replenishing amount for the washing water or stabilizing solution is, for the purpose of ensuring the water washing or stabilizing function and at the same time, reducing the waste water in view of environmental coacervation, preferably from 80 to 1,000 ml, more preferably from 100 to 500 ml, still more preferably from 150 to 300 ml. In the processing using the above-described replenishing amount, in order to prevent proliferation of bacteria or mold, a known antimold such as thiabendazole, 1,2-benzoisothiazolin-3-one and 5-chloro-2-methylisothiazolin-3-one, an antibiotic such as gentamicin, or water deionized by an ion exchange resin is preferably used. It is more effective to use deionized water in combination with a microbicide or an antibiotic.

The replenishing amount for the solution in the washing water or stabilizing solution tank is also preferably reduced by subjecting the solution to reverse osmosis membrane treatment described in JP-A-3-46652, JP-A-3-53246, JP-A-3-55542, JP-A-3-121448 and JP-A-3-126030 and the reverse osmosis membrane used here is preferably a low pressure reverse osmosis membrane.

In the processing of the present invention, compensation for evaporation of the processing solutions disclosed in *JIII Journal of Technical Disclosure*, No. 94-4992 is preferably conducted. In particular, according to (formula-1) at page 2 of the publication, the compensation is preferably conducted using the temperature and humidity information of the environment where the automatic developing machine is installed. The water for use in the compensation for evaporation is preferably sampled from the replenishing tank of water washing and in this case, deionized water is preferably used as the water washing replenishing water.

As the processing agent for use in the present invention, those described in *JIII Journal of Technical Disclosure* (cited above), from page 3, right column, line 15 to page 4, left column, line 32 are preferred. Further, as the developing machine used therefor, a film processor described in ibid., page 3, right column, lines 22 to 28 is preferred.

Specific examples of the processing agent, the automatic developing machine and the evaporation compensation method which are preferably used in the present invention are described in *JIII Journal of Technical Disclosure* (cited above), from page 5, right column, line 11 to page 7, right column, the last line.

The processing agent for use in the present invention may be supplied in any form such as a liquid agent having a concentration in the state of using the solution or in the condensed form, a granulated powder, a powder, a tablet, a paste or an emulsion. Examples of the processing agent include a liquid agent housed in a container having a low oxygen permeability described in JP-A-63-17453, vacuum-packaged powder or granulated powder described in JP-A-4-19655 and JP-A-4-230748, granulated powder having incorporated therein a water-soluble polymer described in JP-A-4-221951, a tablet described in JP-A-51-61837 and JP-A-6-102628, and a paste processing agent described in JP-A-57-500485, which all are preferably used, however, in view of convenience on use, a liquid previously prepared to have a concentration in the use state is preferred.

For the container for housing the processing agent, polyethylene, polypropylene, polyvinyl chloride, polyethylene terephthalate and nylon are used individually or as a composite material. These materials are selected according to the level of the oxygen permeability required. For the solution susceptible to oxidation such as color developer, materials having a low oxygen permeability are preferred and more specifically, a composite material of polyethylene terephthalate or polyethylene and nylon is preferred. The material is used for the container to have a thickness of from 500 to 1,500 μm and an oxygen permeability of preferably 20 ml/m$^2$.24 hrs.atm or less.

There is no particular restriction about various additives and development processing methods used when the present invention is applied to a black-and-white lightsensitive material and those described, for example, in the following portions of JP-A-2-68539, JP-A-5-11389 and JP-A-2-58041 can be preferably used.

1. Silver halide emulsion and production method thereof: JP-A-2-68539, from page 8, right lower column, line 6 from the bottom to page 10, right upper column, line 12
2. Chemical sensitization method: selenium sensitization methods described JP-A-2-68539, page 10, from right upper column, line 13 to left lower column, line 16, and JP-A-5-11389
3. Antifoggant, stabilizer: JP-A-2-68539, from page 10, left lower column, line 17 to page 11, left lower column, line 7 and from page 3, left lower column, line 2 to page 4, left lower column
4. Spectral sensitizing dye: JP-A-2-68539, from page 4, right lower column, line 4 to page 8, right lower column, and JP-A-2-58041, page 12, from left lower column, line 8 to right lower column, line 19
5. Surface active agent, antistatic agent: JP-A-2-68539, from page 11, left upper column, line 14 to page 12, left upper column, line 9 and JP-A-2-58041, from page 2, left lower column, line 14 to page 5, line 12
6. Matting agent, plasticizer, slipping agent: JP-A-2-68539, from page 12, left upper column, line 10 to right upper, line 10 and JP-A-2-58041, from page 5, left lower column, line 13 to page 10, left lower column, line 3
7. Hydrophilic colloid: JP-A-2-68539, page 12, from right upper column, line 11 to left column, line 16
8. Hardening agent: JP-A-2-68539, from line 12, left lower column, line 17 to page 13, right upper column, line 6
9. Development processing method: JP-A-2-68539, page 15, from left upper column, line 14 to left lower column, line 13

The processing solution for a color reversal film for use in the present invention is described below. The processing of a color reversal film is described in detail in *Kochi Gijutu* (Known Technique), No. 6, from page 1, line 5 to page 10, line 5, and from page 15, line 8 to page 24, line 2, issued by Aztec Limited (Apr. 1, 1991), and the contents in the publication all may be preferably used.

In the processing of a color reversal film, an image stabilizer is incorporated into a controlling bath or a final bath. The image stabilizer includes formalin, sodium formaldehyde bisulfite and N-methylolazoles, however, in view of the work environment, sodium formaldehyde bisulfite and N-methylolazoles are preferred and as the N-methylolazoles, N-methyloltriazole is particularly preferred. The description of the color developer, the bleaching solution, the fixing solution and the washing water given with respect to the processing of a color negative film may also be preferably applied to the processing of a color reversal film.

Preferred examples of the processing agent for a color reversal film covering the above-described description include Processing Agent E-6 produced by Eastman Kodak Company and Processing Agent CR-56 produced by Fuji Photo Film Co., Ltd.

The polyester support for use in the present invention is described below. Other than those described above, the details including the light-sensitive material, the processing, the cartridge and the experimental examples are described in *JIII Journal of Technical Disclosure* No. 94-6023, Japan Institute of Invention and Innovation (Mar. 15, 1994). The polyester for use in the present invention is formed using diol and an aromatic dicarboxylic acid as essential components. Examples of the aromatic dicarboxylic acid include 2,6-naphthalene dicarboxylic acid, 1,5-naphthalene dicarboxylic acid, 1,4-naphthalene dicarboxylic acid, 2,7-naphthalene dicarboxylic acid, a terephthalic acid, an isophthalic acid and a phthalic acid, and examples of the diol include diethylene glycol, triethylene glycol, cyclohexanedimethanol, bisphenol A and bisphenol. The polymer includes a homopolymer such as polyethylene terephthalate, polyethylene naphthalate and polycyclohexane-dimethanol terephthalate. Among these, preferred is a polyester containing from 50 to 100 mol% of 2,6-naphthalenedicarboxylic acid. Particularly preferred is polyethylene 2,6-naphthalate. The average molecular weight is approximately from 5,000 to 200,000. The polyester of the present invention preferably has a Tg of 50° C. or higher, more preferably 90° C. or higher.

The polyester support is subjected to heat treatment to have an aversion to curling habit at a heat treatment temperature of from 40° C. to less than the Tg, more preferably from (Tg −20° C.) to less than the Tg. The heat treatment may be conducted either at a constant temperature within the above-described range or while cooling. The heat treatment time is from 0.1 to 1,500 hours, more preferably from 0.5 to 200 hours. The support may be subjected to heat treatment either in the state of a roll or as a web on the way of conveyance. The surface may be made uneven (for example, by coating electrically conductive inorganic fine particles such as $SnO_2$ or $Sb_2O_5$) to improve the surface state. Also, it is preferred to make some designs such that the edge is knurled to slightly increase the height only of the edge, thereby preventing the cut copy at the core portion. The heat treatment may be conducted at any stage, such as after formation of support film, after surface treatment, after coating of a back layer (e.g., antistatic agent, slipping agent), or after coating of an undercoat layer. The preferred stage is after coating of an antistatic agent.

Into the polyester, an ultraviolet absorbent may be kneaded in. Alternatively, for preventing light piping, a commercially available dye or pigment for polyester, such as Diaresin produced by Mitsubishi Chemicals Industries, Ltd. or Kayaset produced by Nippon Kayaku K. K., may be mixed so as to attain the object.

In the present invention, the surface treatment is preferably performed so that the support can be bonded to the light-sensitive constituent layer. Examples of the surface activation treatment include chemical treatment, mechanical treatment, corona discharge treatment, flame treatment, ultraviolet light treatment, high frequency treatment, glow discharge treatment, active plasma treatment, laser treatment, mixed acid treatment and ozone oxidation treatment. Among these surface treatments, preferred are ultraviolet irradiation treatment, flame treatment, corona treatment and glow treatment.

The undercoating method is described below. The undercoating may be mono layer coating or two or more layer coating. The binder for the undercoat layer includes a copolymer starting from a monomer selected from vinyl chloride, vinylidene chloride, butadiene, methacrylic acid, acrylic acid, itaconic acid and maleic anhydride, and in addition, polyethyleneimine, epoxy resin, grafted gelatin, nitrocellulose and gelatin. The compound which expands the support include resorcinol and p-chlorophenol. The undercoat layer may contain a gelatin hardening agent and examples thereof include chromic salts (e.g., chrome alum), aldehydes (e.g., formaldehyde, glutaraldehyde), isocyanates, active halogen compounds (e.g., 2,4-dichloro-6-hydroxy-S-triazine), epichlorohydrin resins and active vinyl sulfone compounds. Further, the undercoat layer may contain $SiO_2$, $TiO_2$, an inorganic fine particle or a polymethyl methacrylate copolymer fine particle (0.01 to 10 μm) as a matting agent.

In the present invention, an antistatic agent is preferably used. Examples of the antistatic agent include a high polymer containing a carboxylic acid, a carboxylate or a sulfonate, a cationic high polymer and an ionic surface active agent compound.

Most preferred antistatic agents are a fine particle of at least one crystalline metal oxide having a volume resistivity of $10^7$ Ω.cm or less, more preferably $10^5$ Ω·cm or less and a particle size of from 0.001 to 1.0 μm, selected from ZnO, $TiO_2$, $SnO_2$, $Al_2O_3$, $In_2O_3$, $SiO_2$, MgO, BaO, $MoO_3$ and $V_2O_5$ or of a composite oxide of these (e.g., Sb, P, B, In, S, Si, C) and a fine particle of a sol-like metal oxide or of a composite oxide thereof. The content of the antistatic agent in the light-sensitive material is preferably from 5 to 500 mg/m², more preferably from 10 to 350 mg/m². The ratio of the electrically conductive crystalline oxide or a composite oxide thereof to the binder is preferably from 1/300 to 100/1, more preferably from 1/100 to 100/5.

The light-sensitive material of the present invention preferably has a lubricating property. The lubricating agent-containing layer is preferably present on both the light-sensitive layer surface and the back surface. The preferred lubricating property is in terms of a coefficient of dynamic friction, from 0.01 to 0.25. The value is determined using a stainless steel ball having a diameter of 5 mm by transporting the light-sensitive material at a speed of 60 cm/min (25° C., 60% RH). In this evaluation, even when the other party is changed to the light-sensitive layer surface, the value almost on the same level is obtained.

The lubricating agent which can be used in the present invention includes polyorganosiloxane, a higher fatty acid amide, a higher fatty acid metal salt and an ester of a higher fatty acid with a higher alcohol. Examples of the polyoxysiloxane include polydimethylsiloxane, polydiethylsiloxane, polystyrylmethylsiloxane and polymethylphenylsiloxane. The slipping agent is preferably added to an outermost layer of the emulsion layers or a back layer. In particular, polydimethylsiloxane and an ester having a long chain alkyl group are preferred.

The light-sensitive material of the present invention preferably contains a matting agent. The matting agent may be used either on the emulsion surface or back surface, but it is particularly preferably added to the outermost layer on the emulsion layer side. The matting agent may be either soluble in the processing solution or insoluble in the processing solution, and both are preferably used in combination. For example, polymethyl methacrylate, poly(methyl methacrylate/methacrylic acid =9/1 or 5/5 (by mol)) and polystyrene particles are preferred. The particle size is preferably from 0.8 to 10 μm, the particle size distribution is preferably narrower, and 90% by number or more of all particles have a size between 0.9 and 1.1 times the average particle size. In order to increase the matting property, fine particles of 0.8 μm or less are preferably added at the same time and examples thereof include polymethyl methacrylate (0.2 μm), poly(methyl methacrylate/methacrylic acid =9/1 (by mol), 0.3 μm), polystyrene particles (0.25 μm) and colloidal silica (0.03 μm).

The film patrone for use in the present invention is described below. The patrone for use in the present invention may be mainly made of a metal or a synthetic plastic.

Preferred plastic materials are polystyrene, polyethylene, polypropylene and polyphenyl ether. The patrone of the present invention may further contain various antistatic agents and preferred examples thereof include carbon black, a metal oxide particle, a nonionic, anionic, cationic or betaine surface active agent and a polymer. The patrone imparted with the antistatic property using these is described in JP-A-1-312537 and JP-A-1-312538. In particular, the resistance at 25° C. and 25% RH is preferably $10^{12}$ Ω or less. Usually, the plastic patrone is produced using a plastic having kneaded therein carbon black or a pigment so as to give light-shielding property. The patrone may have a currently used 135 size but it is also effective for achieving miniaturization of a camera to reduce the cartridge size from 25 mm in the current 135 size to 22 mm or less. The volume of the patrone case is preferably 30 cm$^3$ or less, more preferably 25 cm$^3$ or less. The weight of plastics used in the patrone and the patrone case is preferably from 5 to 15 g.

The patrone for use in the present invention may be a patrone which delivers the film by rotation of a spool. Also, the patrone may have such a structure that a film leading end is housed in the patrone body and the film leading end is delivered from the port part of the patrone towards the outside by rotating the spool shaft in the film delivery direction. These are disclosed in U.S. Pat. Nos. 4,834,306 and 5,226,613. The photographic film for use in the present invention may be a so-called green film before development or a developed photographic film. Also, a green film and a developed photographic film may be housed in the same new patrone or in different patrones.

The present invention will be described in greater detail below with reference to Examples but the present invention should not be construed as being limited to these Examples.

EXAMPLE 1

1) Support

The support used in this Example was prepared according to the following method.

A polyethylene-2,6-naphthalate polymer (100 parts by weight) and 2 parts by weight of Tinuvin P.326 (produced by Ciba-Geigy AG) as an ultraviolet absorbent were dried, melted at 300° C., extruded from a T-die, longitudinally stretched at 140° C. to 3.3 times, then transversely stretched at 130° C. to 3.3 times and further heat set at 250° C. for 6 seconds to obtain a PEN film having a thickness of 90 μm. To the resulting PEN film, a blue dye, a magenta dye and a yellow dye (Compounds I-1, I-4, I-6, I-24, I-26, I-27 and II-5 described in *JIII Journal of Technical Disclosure*, No. 94-6023) were added in an appropriate amount. Further, the film was wound around a stainless steel core having a diameter of 20 cm and imparted with heat history at 110° C. for 48 hours, thereby obtaining a support difficult to have curling habit.

2) Coating of Undercoat Layer

Both surfaces of the support obtained above were subjected to corona discharge treatment, UV discharge treatment and further glow discharge treatment, and on each surface, an undercoating solution containing 0.1 g/m$^2$ of gelatin, 0.01 g/m$^2$ of sodium α-sulfodi-2-ethylhexylsuccinate, 0.04 g/m$^2$ of salicylic acid, 0.2 g/m$^2$ of p-chlorophenol, 0.012 g/m$^2$ of $(CH_2=CHSO_2CH_2CH_2NHCO)_2CH_2$ and 0.02 g/m$^2$ of a polyamide-epichlorohydrin polycondensate was coated (10 ml/m$^2$, by a bar coater) to provide an undercoat layer on the higher temperature side at the stretching. The drying was conducted at 115° C. for 6 minutes (the rollers and the conveyance device in the drying zone all were heated to 115° C.).

3) Coating of Back Layer

On one surface of the undercoated support, an antistatic layer, a magnetic recording layer and a slipping layer each having the following composition were coated as a back layer.

3-1) Coating of Antistatic Layer

A dispersion (0.2 g/m$^2$) (secondary coagulated particle size: about 0.08 μm) of fine particle powder having a resistivity of 5 Ω.cm of a tin oxide-antimony oxide composite having an average particle diameter of 0.005 μm was coated together with 0.05 g/m$^2$ of gelatin, 0.02 g/m$^2$ of $(CH_2=CHSO_2CH_2CH_2NHCO)_2CH_2$, 0.005 g/m$^2$ of poly (polymerization degree: 10)oxyethylene-p-nonylphenol and resorcinol.

3-2) Coating of Magnetic Recording Layer

Co-γ-iron oxide (0.06 g/m$^2$) (specific surface area: 43 m$^2$/g; major axis: 0.14 μm; minor axis: 0.03 μm; saturated magnetization: 89 emu/g; $Fe^{+2}/Fe^{+3}$=6/94; the surface being treated with aluminum oxide and silicon oxide each in an amount of 2 wt% based on iron oxide) subjected to covering treatment with 3-poly(polymerization degree: 15)oxyethylene-propyloxytrimethoxysilane (15 wt%) was coated using 1.2 g/m$^2$ of diacetyl cellulose (the iron oxide being dispersed by an open kneader and sand mill), 0.3 g/m$^2$ of $C_2H_5C(CH_2OCONH— C_6H_3(CH_3)NCO)_3$ as a hardening agent, and acetone, methyl ethyl ketone, cyclohexanone and dibutyl phthalate as solvents by means of a bar coater to obtain a magnetic recording layer having a thickness of 1.2 μm. Thereto, 50 mg/m$^2$ of $C_6Hl_{13}CH(OH)C_{10}H_{20}COOC_{40}H_{81}$, as a slipping agent was added and further silica particles (1.0 μm) as a matting agent and an aluminum oxide (0.20 μm and 1.0 μm) covered with 3-poly-(polymerization degree: 15) oxyethylene-propyloxytrimethoxy-silane (15 wt%) as an abrasive were added to give a coverage of 50 mg/m$^2$ and 10 mg/m$^2$, respectively. The drying was conducted at 115° C. for 6 minutes (the rollers and the conveyance device in the drying zone all were heated to 115° C). Increase in the color density of the magnetic recording layer $D^B$ with X-light (blue filter) was about 0.1, the saturated magnetization moment of the magnetic recording layer was 4.2 emu/m$^2$, the coercive force was 7.3×10$^4$ A/m and the angular ratio was 65%.

3-3) Preparation of Lubricating Layer

Dihydroxyethyl cellulose (25 mg/m$^2$), $C_6H_{13}CH(OH)C_{10}H_{20} COOC_{4O}H_{81}$ (6 mg/m$^2$) and silicone oil BYK-310 (produced by Bigchemic Japan, 1.5 mg/m$^2$) were coated. The mixture was prepared by melting these compounds in xylene/propylene glycol monomethyl ether (1/1) at 105° C. and pouring and dispersing the melt in propylene glycol monomethyl ether (10-folded amount) at room temperature, and added after formulating it into a dispersion (average particle size: 0.01 μm) in acetone. The drying was conducted at 115° C. for 6 minutes (the rollers and the conveyance device in the drying zone all were heated to 115° C.). The thus-provided slipping layer had excellent properties such that the coefficient of dynamic friction was 0.10 (stainless steel ball (diameter: 5 mm); load: 100 g; speed: 6 cm/min), the coefficient of static friction was 0.08 (by clip method) and the coefficient of dynamic friction between the lubricating layer and the emulsion surface which will be described later was 0.15.

4) Preparation of Emulsion

Preparation of Emulsion I

An aqueous silver nitrate solution and an aqueous potassium bromide solution were added while vigorously stirring according to an ammonia process by a double jet method to a vessel containing 25 g of potassium bromide, 9 g of potassium iodide, 3.5 g of potassium thiocyanate and 10 g of gelatin in 1 l of water and kept at 40° C., to prepare a silver iodobromide emulsion having an iodide content of 6 mol% and comprising grains having an average grain size of 0.6 μm, in which less than 50% of the entire projected area had an aspect ratio of 2.0 or more. Thereafter, the temperature was lowered to 35° C. and soluble salts were removed by sedimentation. Then, the temperature was raised to 40° C., 117 g of gelatin was added and the pH and the pAg were adjusted to 6.60 and 8.90, respectively, with caustic soda and sodium bromide. The temperature was raised to 56° C., and 0.8 mg of chloroauric acid, 9 mg of potassium thiocyanate and 4 mg of sodium thiosulfate were added. After 55 minutes, 260 mg of Sensitizing Dye-A shown below was added and 10 minutes after then, the mixture was rapidly cooled and solidified.

Sensitizing Dye-A

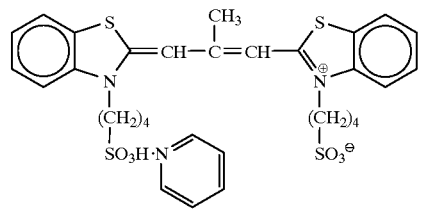

Desensitizing Dye

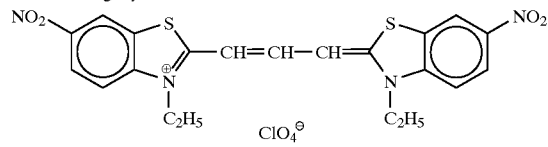

Preparation of Emulsion I-1

According to the preparation of Emulsion I, a silver iodobromide emulsion was prepared by adding an aqueous $RhCl_3$ solution to give a coverage of $3.0 \times 10^{-7}$ mol/mol-Ag simultaneously with the double jet addition of an aqueous silver nitrate solution and an aqueous potassium bromide solution. The resulting emulsion had an average grain size of 0.6 μm and contained grains having an aspect ratio of 2.0 or more at a proportion of less than 50% of the entire projected area, the same as Emulsion I. After the removal of soluble salts by sedimentation, the preparation proceeded in the same manner as in Emulsion I and at this time, the sensitivity was low. The term "sensitivity" as used herein means a logarithm of a reciprocal of the exposure amount necessary for giving a density of fog+0.1 on the characteristic curve obtained by subjecting light-sensitive materials having the same coated silver amount to exposure and development which will be described later. The gradation was contrasted. Accordingly, in order to give the same sensitivity as that of Emulsion I, in the preparation of Emulsion I-1, the amount of sulfur-gold sensitizers, namely, sodium thiosulfate pentahydrate, potassium thiocyanate and chloroauric acid, added after the removal of soluble salts by sedimentation, and the addition amount of Sensitizing Dye-A were controlled.

Preparation of Emulsion II

Emulsion II was prepared by controlling the temperature and the ammonia amount in the preparation of Emulsion I so that Emulsion II could have an aspect ratio of 2.2. The average grain size was 0.6 μm and 50% or more of the entire projected area of all silver halide grains had an aspect ratio of 2.0 or more. Further, the amount of sensitizers added in the sulfur-gold chemical sensitization and the addition amount of Sensitizing Dye-A were finely adjusted so that Emulsion II could have the same sensitivity as that of Emulsion I.

Preparation of Emulsion II-1

Using the same addition method and amount of $RhCl_3$ as in Emulsion I-1, Emulsion II-1 having the same shape and distribution of silver iodobromide as those of Emulsion II was prepared. The difference in sensitivity resulting from reduced sensitivity was corrected by controlling the addition amounts of chemical sensitizers and the sensitizing dye.

Preparation of Emulsion III-1

Emulsion III-1 was prepared by controlling the temperature and the ammonia amount in the preparation of Emulsion I-1 so that Emulsin III-1 could have an aspect ratio of 3.0. The average grain size was 0.7 μm and 65% or more of the entire projected area of all silver halide grains had an aspect ratio of 2.0 or more. The addition method and amount of $RhCl_3$ were the same as in Emulsion I-1. The difference in sensitivity resulting from reduced sensitivity was corrected in the same manner as in Emulsion I-1 so that Emulsion III-1 could have same sensitivity as Emulsion I.

Preparation of Emulsion IV

Emulsion IV was prepared in the same manner as in Emulsion I with controlling the temperature and the ammonia amount so that Emulsion IV could have an aspect ratio of 5.0. The average grain size was 1.0 μm. Further, in order to give the same sensitivity as Emulsion I, the addition amounts of chemical sensitizers and the sensitizing dye were finely controlled.

Preparation of Emulsion IV-1

Emulsion IV-1 was prepared using the same addition amount of $RhCl_3$ as in Emulsion I-1 to have the same aspect ratio and the same average grain size by controlling in the same manner as in Emulsion IV. The difference in sensitivity resulting from reduced sensitivity was corrected to give the same sensitivity as that of Emulsion I by controlling the amounts of chemical sensitizers and the sensitizing dye in the same manner as above. Emulsions IV and IV-1 both had an aspect ratio of 5.0 and an average grain size of 1.0 μm. Of all silver halide grains, 80% or more of the entire projected area had an aspect ratio of 2.0 or more.

Preparation of Emulsion V

Emulsion V was prepared in the same manner as Emulsion IV-1 except for using $K_2[RuCl_5(NO)]$ in place of $RhCl_3$ and changing the addition amount to $7.0 \times 10^{-7}$ mol/mol-Ag.

Preparation of Emulsion VI-1

Emulsion VI-1 was prepared according to the preparation of Emulsion IV-1 except for changing the desensitizer $RhCl_3$ to the desensitizing dye show below. The desensitizing dye was added after removing soluble salts, raising the temperature to 40° C., adding gelatin and adjusting the pH and pAg, to have a coverage of $2.0 \times 10^{-4}$ mol/mol-Ag. The difference in sensitivity resulting from reduced sensitivity was corrected in accordance with the method described above.

These Emulsions V and VI-1 had the same shape and distribution of silver iodobromide grains as in Emulsions IV and IV-1.

5) Preparation of Coated Samples

Using each of the emulsions prepared above, samples were prepared by providing the following layers on the surface opposite to the back layer with interposition of a support.

| First Layer (antihalation layer) | |
|---|---|
| Gelatin | 1.0 g/m² |
| Compound-II | 140 mg/m² |
| Compound-III | 15 mg/m² |
| Dye-I | 26 mg/m² |
| Dye-II | 16 mg/m² |

| Fourth Layer (surface protective layer) | |
|---|---|
| Gelatin | 0.8 g/m² |
| Compound-V | 13 mg/m² |
| Compound-VI | 50 mg/m² |
| Compound-VII | 1.8 mg/m² |
| Polypotassium p-vinylbenzene sulfonate | 6 mg/m² |
| Polymethyl methacrylate fine particle (average particle size: 3 μm) | 24 mg/m² |
| Compound-VIII | 50 mg/m² |

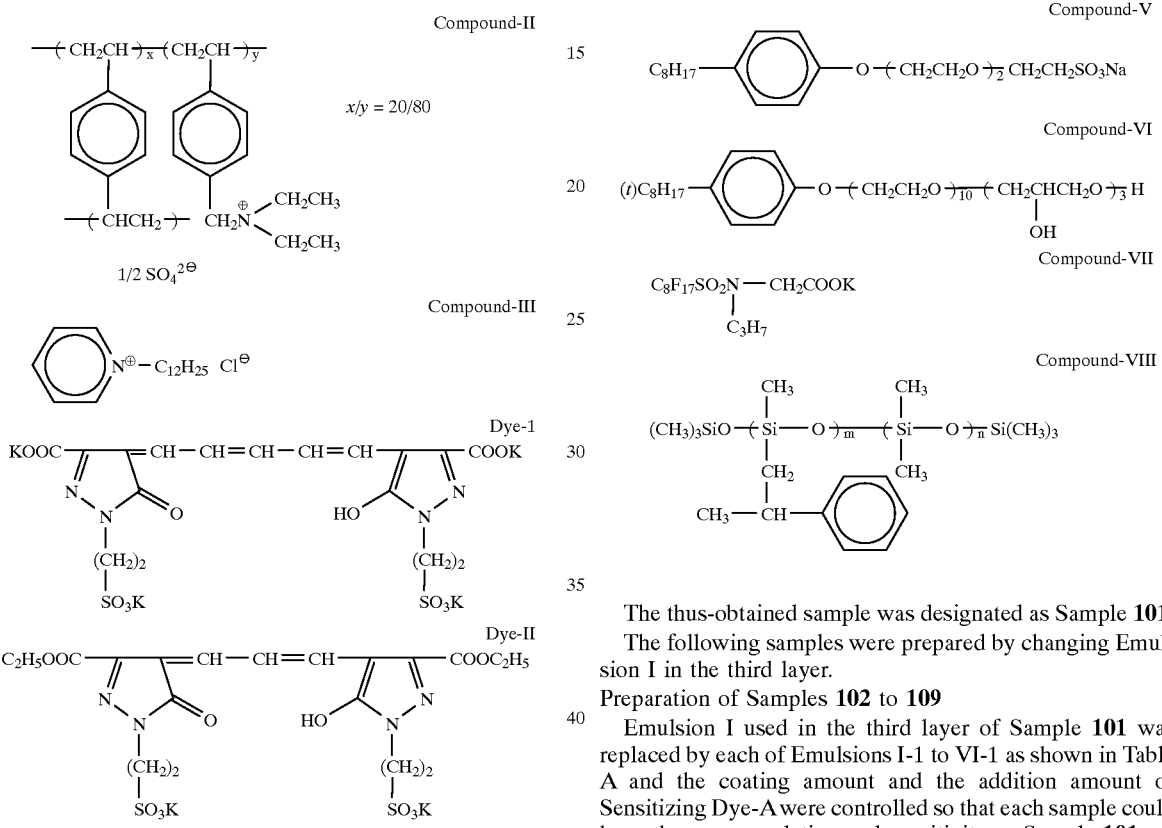

| Second Layer (interlayer) | |
|---|---|
| Gelatin | 0.4 g/m² |
| Potassium p-vinylbenzene sulfonate | 5 mg/m² |
| Third Layer (emulsion layer) | |
| Emulsion I | as silver 1.36 g/m² |
| Gelatin | 2.0 g/m² |
| 4-Hydroxy-6-methyl-1,3,3a,7-tetrazaindene | 15 mg/m² |
| $C_{18}H_{35}O(CH_2CH_2O)_{25}H$ | 7 mg/m² |
| Compound-IV | 1.5 mg/m² |
| Polypotassium p-vinylbenzene sulfonate | 50 mg/m² |
| Bis(vinylsulfonylacetamido)ethane | 57 mg/m² |

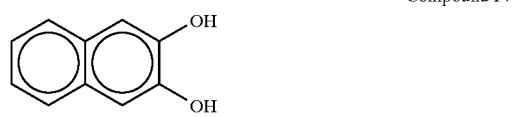

Compound IV

The thus-obtained sample was designated as Sample 101.

The following samples were prepared by changing Emulsion I in the third layer.

Preparation of Samples 102 to 109

Emulsion I used in the third layer of Sample 101 was replaced by each of Emulsions I-1 to VI-1 as shown in Table A and the coating amount and the addition amount of Sensitizing Dye-A were controlled so that each sample could have the same gradation and sensitivity as Sample 101.

In Samples 106 to 109, when the sensitivity and the gradation were concorded with those of Sample 101, the coated silver amount could be reduced by about 20%.

Preparation of Samples 110 to 118

Samples 110 to 118 were prepared by adding compound A-50 represented by formula (A-I) of the present invention to the third layer of Samples 101 to 109 to give a coated amount of 34 mg/m². Compound A-50 used dibutyl phthalate which was added to give a weight ratio to Compound A-50 of 1.0 and dissolved (using ethyl acetate as an auxiliary solvent), and a dispersion obtained by finely emulsion-dispersing the resulting solution in an aqueous gelatin solution was used.

Preparation of Samples 119 to 125

Samples 119 to 125 were prepared by replacing Compound A-50 used in the third layer of Sample 116 by an equimolar amount of other coupler represented by formula (A-I), (A-II) or (A-III) of the present invention as shown in Table A. The compound was added according to the addition of Compound A-50. In Samples 119 to 125, the coated silver amount could be similarly reduced by about 20% from that in Sample 101.

Preparation of Sample 126

Sample 126 was prepared by forming Compound A-18 represented by formula (A-I) of the present invention into a dispersion in the same manner as above and adding it to the second layer of Sample 116 to give a coated amount of 10 mg/m$^2$. These are shown in Table A below.

reciprocal of the exposure amount necessary for giving a density of fog+0.1 was obtained on each sample. In the samples under the same sample number, the difference (ΔS) between the sample stored at 60° C. and 70% RH and the sample stored at 25° C. and 65% RH was calculated. Also, the difference of the fog density (Δfog) was obtained.

TABLE A

| | | Emulsion in Third Layer | | | | Aging Storability | | Coated Silver Amount when Sensitivity and Gradation were concorded |
|---|---|---|---|---|---|---|---|---|
| Sample | Emulsion | Average Grain Size (μm) | Aspect Ratio | Desensitizer (× 10$^{-7}$ mol/AgI-mol) | | Compound of Formula (A-I), (A-II) or (A-III) | (ΔS) (Δfog) | (g/m$^2$) |
| 101 (Comparison) | I | 0.6 | 1.8 | — | | — | 0.19 0.07 | 1.36 |
| 102 (Comparison) | I-1 | 0.6 | 1.8 | RhCl$_3$ | 3.0 | — | 0.30 0.08 | 1.22 |
| 103 (Comparison) | II | 0.6 | 2.2 | — | | — | 0.20 0.07 | 1.34 |
| 104 (Comparison) | II-1 | 0.6 | 2.2 | RhCl$_3$ | 3.0 | — | 0.32 0.08 | 1.20 |
| 105 (Comparison) | III-1 | 0.7 | 3.0 | RhCl$_3$ | 3.0 | — | 0.32 0.08 | 1.16 |
| 106 (Comparison) | IV | 1.0 | 5.0 | — | | — | 0.20 0.08 | 1.17 |
| 107 (Comparison) | IV-1 | 1.0 | 5.0 | RhCl$_3$ | 3.0 | — | 0.32 0.09 | 1.08 |
| 108 (Comparison) | V | 1.0 | 5.0 | K$_2$[RuCl$_5$(NO)] | 7.0 | — | 0.34 0.09 | 1.10 |
| 109 (Comparison) | VI-1 | 1.0 | 5.0 | Desensitizing Dye*1 | | — | 0.32 0.09 | 1.14 |
| 110 (Comparison) | I | 0.6 | 1.8 | — | | A-50 | 0.18 0.06 | 1.36 |
| 111 (Comparison) | I-1 | 0.6 | 1.8 | RhCl$_3$ | 3.0 | A-50 | 0.25 0.06 | 1.22 |
| 112 (Comparison) | II | 0.6 | 2.2 | — | | A-50 | 0.18 0.06 | 1.34 |
| 113 (Invention) | II-1 | 0.6 | 2.2 | RhCl$_3$ | 3.0 | A-50 | 0.19 0.04 | 1.20 |
| 114 (Invention) | III-1 | 0.7 | 3.0 | RhCl$_3$ | 3.0 | A-50 | 0.11 0.03 | 1.16 |
| 115 (Comparison) | IV | 1.0 | 5.0 | — | | A-50 | 0.15 0.06 | 1.17 |
| 116 (Invention) | IV-1 | 1.0 | 5.0 | RhCl$_3$ | 3.0 | A-50 | 0.17 0.02 | 1.08 |
| 117 (Invention) | V | 1.0 | 5.0 | K$_2$[RuCl$_5$(NO)] | 7.0 | A-50 | 0.14 0.02 | 1.10 |
| 118 (Invention) | VI-1 | 1.0 | 5.0 | Desensitizing Dye*1 | | A-50 | 0.18 0.03 | 1.14 |
| 119 (Invention) | IV-1 | 1.0 | 5.0 | RhCl$_3$ | 3.0 | A-2 | 0.14 0.03 | 1.08 |
| 120 (Invention) | IV-1 | 1.0 | 5.0 | RhCl$_3$ | 3.0 | A-4 | 0.14 0.03 | 1.08 |
| 121 (Invention) | IV-1 | 1.0 | 5.0 | RhCl$_3$ | 3.0 | A-9 | 0.14 0.03 | 1.08 |
| 122 (Invention) | IV-1 | 1.0 | 5.0 | RhCl$_3$ | 3.0 | A-15 | 0.13 0.02 | 1.08 |
| 123 (Invention) | IV-1 | 1.0 | 5.0 | RhCl$_3$ | 3.0 | A-17 | 0.13 0.02 | 1.08 |
| 124 (Invention) | IV-1 | 1.0 | 5.0 | RhCl$_3$ | 3.0 | A-20 | 0.15 0.04 | 1.08 |
| 125 (Invention) | IV-1 | 1.0 | 5.0 | RhCl$_3$ | 3.0 | A-29 | 0.16 0.04 | 1.08 |
| 126*2 (Invention) | IV-1 | 1.0 | 5.0 | RhCl$_3$ | 3.0 | A-50 | 0.13 0.02 | 1.08 |

*1 Addition amount was 2.0 × 10$^{-4}$ mol/mol-Ag.
*2 The second layer contained 10 mg/m$^2$ of A-18 (vs. Sample 116).

Samples 101 to 126 each was stored after the coating at 25° C. and 65% RH for 7 days and then cut into a size of 24 mm (width) ×160 cm, and two perforations each in a size of 2 mm ×2 mm were provided on the portion of 0.7 mm inside from one vertical side in the length direction of the sample at an interval of 5.8 mm. A sample having this pair of perforations at an interval of 32 mm was prepared. The sample was housed in a plastic-made film cartridge shown in FIGS. 1 to 7.

FM signals were recorded on the sample from the surface having coated thereon a magnetic recording layer between the above-described perforations at a feeding speed of 1,000/s using a head capable of input/output having a head gap of 5 μm and a turn number of 2,000.

These samples were examined on the following capabilities.

Aging storability

One group of these samples was stored at 60° C. and 70% RH (relative humidity) for 5 days and another group was stored at 25° C. and 65% RH for 5 days. Thereafter, these film samples each was taken out from a cartridge and exposed through a wedge for sensitometry for 1/100 seconds. At this time, a tungsten light source having a color temperature of 2854° K. was used through a color temperature variation filter to have a color temperature of 5400° K.

The exposed film samples each was then developed as described below in an automatic developing machine.

The developed samples each was measured on the density and from the characteristic curve thereof, a logarithm of a The development was performed in the following conditions.

| | Developer | Temperature | Time |
|---|---|---|---|
| Development | HPD | 26.5° C. | 55 sec. |
| Fixing | Super Fujix DP2 | 26.5° C. | 76 sec. |
| Water washing | running water | 20° C. | 95 sec. |
| Drying | | 50° C. | 69 sec. |

HPD and Super Fujix DP2 both are a trade name and manufactured by Fuji Photo Film Co., Ltd.

The results obtained are shown in Table A above.

It is seen from Table A that Samples 113, 114 and 116 to 126 using an emulsion of the present invention comprising tabular silver halide grains having an aspect ratio of 2.0 or more, which was desensitized by a desensitizer and again optimized to give the same sensitivity and the same gradation to all samples, and using the compound represented by formula (A-I), (A-II) or (A-III) of the present invention in the layer containing the above-described emulsion, exhibited excellent aging storability of the light-sensitive material such that increase in the fog was little and increase in the sensitivity was suppressed, even when they were stored under high temperature and high humidity conditions.

Further, it is seen that the samples of the present invention were also advantageous in that when an emulsion comprising tabular grains having a high sensitivity was used, not only the aging storability of the light-sensitive material could be improved but also the coated silver amount could be reduced.

The reduction in the coated silver amount was achieved as a result of adjusting the coated amount so as to concord the gradation contrasted in turn when the sensitivity was reduced by the use of a desensitizer, with the gradation provided when a desensitizer was not used. The reduction in the coated silver amount is advantageous because the production costs of the light-sensitive material can be lowered.

EXAMPLE 2

Samples 201 to 226 were prepared by coating each layer, using emulsions prepared in Example 1, on a triacetyl cellulose support prepared by the production method described in JP-A-62-115035, which was previously subjected to subbing of the emulsion coated surface and coating of the following compounds on the back surface, to have the same structure as Samples 101 to 126

| | |
|---|---|
| Compound I described below | 60 mg/m² |
| Diacetyl cellulose | 143 mg/m² |
| Silicon oxide | 5 mg/m² |

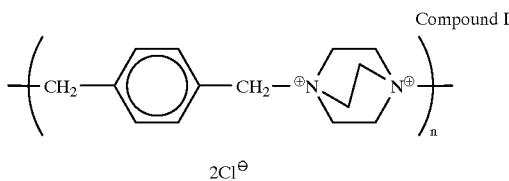

Compound I

Sample 101 and Sample 201 were different in the support and the back layer and the same in the structure of light-sensitive layers. Samples having the same number in the last-two figures have the same correspondence as that between Sample 101 and Sample 201.

Samples 201 to 226 each was cut into a size of 36 mm (width) ×160 cm (length), provided by the same perforations as in the current 135-type film, wound around a currently used 135-type spool and housed in a patrone.

These light-sensitive materials were stored at 25° C. and 65% RH for 7 days. Thereafter, one group of the light-sensitive materials was stored at 60° C. and 70% RH for 5 days and another group was stored at 25° C. and 65% RH for the same period of time, in the same manner as in Example 1. Film samples were taken out from these two groups of light-sensitive materials, subjected to the same exposure and the same development as in Example 1, and examined in the same manner on change in the fog and the sensitivity due to storage with age.

The results obtained are shown in Table B below.

TABLE B

| | Emulsion in Third Layer | | | | | Aging Storability | | Coated Silver Amount |
|---|---|---|---|---|---|---|---|---|
| Sample | Emulsion | Average Grain Size (μm) | Aspect Ratio | Desensitizer (× 10⁻⁷ mol/AgI-mol) | Compound of Formula (A-I), (A-II) or (A-III) | (ΔS) | (Δfog) | when Sensitivity and Gradation were concorded (g/m²) |
| 201 (Comparison) | I | 0.6 | 1.8 | — | — | 0.18 | 0.05 | 1.36 |
| 202 (Comparison) | I-1 | 0.6 | 1.8 | RhCl₃  3.0 | — | 0.29 | 0.06 | 1.22 |
| 203 (Comparison) | II | 0.6 | 2.2 | — | — | 0.18 | 0.05 | 1.34 |
| 204 (Comparison) | II-1 | 0.6 | 2.2 | RhCl₃  3.0 | — | 0.29 | 0.06 | 1.20 |
| 205 (Comparison) | III-1 | 0.7 | 3.0 | RhCl₃  3.0 | — | 0.29 | 0.06 | 1.16 |
| 206 (Comparison) | IV | 1.0 | 5.0 | — | — | 0.18 | 0.06 | 1.17 |
| 207 (Comparison) | IV-1 | 1.0 | 5.0 | RhCl₃  3.0 | — | 0.29 | 0.07 | 1.08 |
| 208 (Comparison) | V | 1.0 | 5.0 | K₂[RuCl₅(NO)]  7.0 | — | 0.30 | 0.07 | 1.10 |
| 209 (Comparison) | VI-1 | 1.0 | 5.0 | Desensitizing Dye*¹ | — | 0.29 | 0.08 | 1.14 |
| 210 (Comparison) | I | 0.6 | 1.8 | — | A-50 | 0.15 | 0.04 | 1.36 |
| 211 (Comparison) | I-1 | 0.6 | 1.8 | RhCl₃  3.0 | A-50 | 0.20 | 0.04 | 1.22 |
| 212 (Comparison) | II | 0.6 | 2.2 | — | A-50 | 0.16 | 0.04 | 1.34 |
| 213 (Invention) | II-1 | 0.6 | 2.2 | RhCl₃  3.0 | A-50 | 0.19 | 0.02 | 1.20 |
| 214 (Invention) | III-1 | 0.7 | 3.0 | RhCl₃  3.0 | A-50 | 0.10 | 0.02 | 1.16 |
| 215 (Comparison) | IV | 1.0 | 5.0 | — | A-50 | 0.13 | 0.04 | 1.17 |
| 216 (Invention) | IV-1 | 1.0 | 5.0 | RhCl₃  3.0 | A-50 | 0.14 | 0.00 | 1.08 |
| 217 (Invention) | V | 1.0 | 5.0 | K₂[RuCl₅(NO)]  7.0 | A-50 | 0.12 | 0.00 | 1.10 |
| 218 (Invention) | VI-1 | 1.0 | 5.0 | Desensitizing Dye*¹ | A-50 | 0.14 | 0.02 | 1.14 |
| 219 (Invention) | IV-1 | 1.0 | 5.0 | RhCl₃  3.0 | A-2 | 0.08 | 0.01 | 1.08 |
| 220 (Invention) | IV-1 | 1.0 | 5.0 | RhCl₃  3.0 | A-4 | 0.08 | 0.01 | 1.08 |
| 221 (Invention) | IV-1 | 1.0 | 5.0 | RhCl₃  3.0 | A-9 | 0.07 | 0.01 | 1.08 |
| 222 (Invention) | IV-1 | 1.0 | 5.0 | RhCl₃  3.0 | A-15 | 0.06 | 0.00 | 1.08 |
| 223 (Invention) | IV-1 | 1.0 | 5.0 | RhCl₃  3.0 | A-17 | 0.09 | 0.00 | 1.08 |
| 224 (Invention) | IV-1 | 1.0 | 5.0 | RhCl₃  3.0 | A-20 | 0.08 | 0.02 | 1.08 |
| 225 (Invention) | IV-1 | 1.0 | 5.0 | RhCl₃  3.0 | A-29 | 0.07 | 0.02 | 1.08 |
| 226*² (Invention) | IV-1 | 1.0 | 5.0 | RhCl₃  3.0 | A-50 | 0.10 | 0.00 | 1.08 |

*¹Addition amount was 2.0 × 10⁻⁴ mol/mol-Ag.
*²The second layer contained 10 mg/m² of A-18 (vs. Sample 216).

It is seen from Table B that, similarly to Example 1, Samples 213, 214 and 216 to 226 of the present invention exhibited excellent aging storability of the light-sensitive material such that increase in the fog was little and increase in the sensitivity was suppressed.

When compared with the results in Table A of Example 1, samples having a magnetic recording layer as a back layer of the support of Example 1 and housed in a specific cartridge of the present invention underwent large change in the photographic properties (fog and sensitivity) after* storage with age and from this, it is seen that the change in the photographic properties was also outstandingly improved.

EXAMPLE 3

Sample 301 was prepared based on Sample 101 to have the following layer structure on the side opposite to the back layer of the support used in Example 1.

First Layer (antihalation layer): same as the first layer of Sample 101
Second Layer (interlayer): same as the second layer of Sample 101
Third layer (emulsion layer): same as the third layer of Sample 101
Fourth layer (emulsion layer):

| | |
|---|---|
| Emulsion VII | as silver 4.2 g/m$^2$ |
| Gelatin | 5.5 g/m$^2$ |
| Dextran (average molecular weight: 150,000) | 1.8 g/m$^2$ |
| 4-Hydroxy-6-methyl-1,3,3a,7-tetrazaindene | 41 mg/m$^2$ |
| $C_{18}H_{35}O(CH_2CH_2O)_{25}H$ | 23 mg/m$^2$ |
| Trimethylolpropane | 390 mg/m$^2$ |
| Polypotassium-p-vinylbenzene sulfonate | 88 mg/m$^2$ |
| Polyacrylic acid | 54 mg/m$^2$ |

Fifth Layer (surface protective layer): same as the fourth layer of Sample 101

Emulsion VII used in the fourth layer was prepared as follows.
Preparation of Emulsion VII:

An aqueous silver nitrate solution and an aqueous potassium bromide solution were added while vigorously stirring according to a usual ammonia process by a double jet method to a vessel containing 25 g of potassium bromide, 9 g of potassium iodide, 1.9 g of potassium thiocyanate and 24 g of gelatin in 1 l of water and kept at 60° C., to prepare a relatively nearly amorphous type thick plate-like silver iodobromide emulsion having an iodide content of 10 mol% and an average grain size of 10 μm. Thereafter, the temperature was lowered to 35° C. and soluble salts were removed by coagulating sedimentation. Then, the temperature was raised to 40° C., 82 g of gelatin was added and the pH and the pAg were adjusted to 6.40 and 8.80, respectively, with caustic soda and sodium bromide.

The temperature was raised to 61° C., 0.95 g of 2-phenoxyethanol was added and further 213 mg of Sensitizing Dye-A was added. After 10 minutes, 1.2 mg of sodium thiosulfate pentahydrate, 28 mg of potassium thiocyanate and 0.4 mg of chloroauric acid were added, and after 65 minutes, the mixture was rapidly cooled and solidified.

The thus prepared sample was designated as Sample 301.

Subsequently, Samples 302 to 320 were prepared based on Samples 102 to 104, 106, 107, 110 to 113, 115, 116 and 119 to 126, respectively, by varying the emulsion layer as the third layer and using the same emulsion layer as the fourth layer commonly in the samples. The gradation was adjusted according to the method described in Example 1. Sample 321 was prepared by adding a dispersion of Compound (A-18) the same as in Sample 126, to the fourth layer to give a coated amount of 23 mg/m$^2$. However, the amount of the desensitizer added was changed as shown in Table C.

These examples each was processed in the same manner as in Example 1, stored in the same conditions and examined on the change in density. In this example, the development processing was the same as in Example 1. The image (silver image) obtained was determined on the logarithm of a reciprocal of the exposure amount necessary for giving a density of fog+2.0 and the difference ($\Delta S_H$) between the sample stored at 60° C. and 70% RH and the sample stored at 25° C. and 65% RH in the same numbered samples was calculated.

The results obtained are shown in Table C.

TABLE C

| | | Emulsion in Third Layer | | | | | | Coated Silver Amount when Sensitivity and |
|---|---|---|---|---|---|---|---|---|
| Sample | Corresponding Sample in Example 1 | Emulsion | Average Grain Size (μm) | Aspect Ratio | Desensitizer (× 10$^{-7}$ mol/AgI-mol) | | Compound of Formula (A-I), (A-II) or (A-III) | Aging Storability ($\Delta S$) | Gradation were concorded (g/m$^2$) |
| 301 (Comparison) | 101 | I | 0.6 | 1.8 | — | | — | 0.23 | 5.56 |
| 302 (Comparison) | 102 | I-1 | 0.6 | 1.8 | RhCl$_3$ | 7.0 | — | 0.35 | 5.42 |
| 303 (Comparison) | 103 | II | 0.6 | 2.2 | — | | — | 0.23 | 5.54 |
| 304 (Comparison) | 104 | II-1 | 0.6 | 2.2 | RhCl$_3$ | 7.0 | — | 0.35 | 5.40 |
| 305 (Comparison) | 106 | IV | 1.0 | 5.0 | — | | — | 0.25 | 5.37 |
| 306 (Comparison) | 107 | IV-1 | 1.0 | 5.0 | RhCl$_3$ | 7.0 | — | 0.38 | 5.28 |
| 307 (Comparison) | 110 | I | 0.6 | 1.8 | — | | A-50 | 0.20 | 5.56 |
| 308 (Comparison) | 111 | I-1 | 0.6 | 1.8 | RhCl$_3$ | 7.0 | A-50 | 0.25 | 5.42 |
| 309 (Comparison) | 112 | II | 0.6 | 2.2 | — | | A-50 | 0.20 | 5.54 |
| 310 (Invention) | 113 | II-1 | 0.6 | 2.2 | RhCl$_3$ | 7.0 | A-50 | 0.22 | 5.40 |
| 311 (Comparison) | 115 | IV | 1.0 | 5.0 | — | | A-50 | 0.17 | 5.37 |
| 312 (Invention) | 116 | IV-1 | 1.0 | 5.0 | RhCl$_3$ | 7.0 | A-50 | 0.20 | 5.28 |
| 313 (Invention) | 119 | IV-1 | 1.0 | 5.0 | RhCl$_3$ | 7.0 | A-2 | 0.15 | 5.28 |
| 314 (Invention) | 120 | IV-1 | 1.0 | 5.0 | RhCl$_3$ | 7.0 | A-4 | 0.15 | 5.28 |
| 315 (Invention) | 121 | IV-1 | 1.0 | 5.0 | RhCl$_3$ | 7.0 | A-9 | 0.15 | 5.28 |
| 316 (Invention) | 122 | IV-1 | 1.0 | 5.0 | RhCl$_3$ | 7.0 | A-15 | 0.14 | 5.28 |
| 317 (Invention) | 123 | IV-1 | 1.0 | 5.0 | RhCl$_3$ | 7.0 | A-17 | 0.14 | 5.28 |
| 318 (Invention) | 124 | IV-1 | 1.0 | 5.0 | RhCl$_3$ | 7.0 | A-20 | 0.16 | 5.28 |
| 319 (Invention) | 125 | IV-1 | 1.0 | 5.0 | RhCl$_3$ | 7.0 | A-29 | 0.17 | 5.28 |

TABLE C-continued

| | | Emulsion in Third Layer | | | | | Coated Silver Amount when Sensitivity and |
| --- | --- | --- | --- | --- | --- | --- | --- |
| Sample | Corresponding Sample in Example 1 | Emulsion | Average Grain Size ($\mu$m) | Aspect Ratio | Desensitizer ($\times 10^{-7}$ mol/AgI-mol) | Compound of Formula (A-I), (A-II) or (A-III) | Aging Storability ($\Delta S$) | Gradation were concorded (g/m$^2$) |
| 320[*1] (Invention) | 126 | IV-1 | 1.0 | 5.0 | RhCl$_3$ 7.0 | A-50 | 0.14 | 5.28 |
| 321[*2] (Invention) | 127 | IV-1 | 1.0 | 5.0 | RhCl$_3$ 7.0 | A-50 | 0.13 | 5.28 |

[*1]The second layer (interlayer) contained 10 mg/m$^2$ of A-18 (vs. Sample 312).
[*2]The fourth layer (emulsion layer) contained 23 mg/m$^2$ of A-18 (vs. Sample 312).

It is clearly seen from Table C, Samples 310 and 312 to 321 satisfying the constitution features of the present invention exhibited excellent aging storability such that change in the density was suppressed even when the light-sensitive material was stored at a high temperature and a high humidity, as compared with comparative samples.

Comparative samples showed change in the density such that the linearity of gradation on the characteristic curve, required for the negative light-sensitive material, was impaired and a folded line revealing two stage gradation was obtained.

EXAMPLE 4

The layers each having the following composition were coated to overlay one on another on the side opposite to the back layer of the support used in Example 1 to prepare a color negative film. This film was designated as Sample 401. (Composition of light-sensitive layer)

The main materials used in each layer are classified as follows.

ExC: cyan coupler

ExM: magenta coupler

ExY: yellow coupler

ExS: sensitizing dye

UV: ultraviolet absorbent

HBS: high-boiling point organic solvent

H: gelatin hardening agent

Numerals corresponding to respective components show coating amounts expressed by the unit of g/m$^2$ and in case of silver halide, they show coating amounts in terms of silver. With respect to sensitizing dyes, the coating amount is shown by the unit mol per mol of silver halide in the same layer. (Sample 401)

First Layer (antihalation layer)

| | | |
| --- | --- | --- |
| Black colloidal silver | as silver | 0.09 |
| Gelatin | | 1.60 |
| ExM-1 | | 0.12 |
| ExF-1 | | 2.0 × 10$^{-3}$ |
| Solid Disperse Dye ExF-2 | | 0.030 |
| Solid Disperse Dye ExF-3 | | 0.040 |
| HBS-1 | | 0.15 |
| HBS-2 | | 0.02 |

Second Layer (interlayer)

| | | |
| --- | --- | --- |
| Silver Iodobromide Emulsion M | as silver | 0.065 |
| ExC-2 | | 0.04 |
| Polyethylacrylate latex | | 0.20 |
| Gelatin | | 1.04 |

Third Layer
(low-sensitivity red-sensitive emulsion layer)

| | | |
| --- | --- | --- |
| Silver Iodobromide Emulsion A | as silver | 0.25 |
| Silver Iodobromide Emulsion B | as silver | 0.25 |
| ExS-1 | | 6.9 × 10$^{-5}$ |
| ExS-2 | | 1.8 × 10$^{-5}$ |
| ExS-3 | | 3.1 × 10$^{-4}$ |
| ExC-1 | | 0.17 |
| ExC-3 | | 0.030 |
| ExC-4 | | 0.10 |
| ExC-5 | | 0.020 |
| ExC-6 | | 0.010 |
| Cpd-2 | | 0.025 |
| HBS-1 | | 0.10 |
| Gelatin | | 0.87 |

Fourth Layer
(medium-sensitivity red-sensitive emulsion layer)

| | | |
| --- | --- | --- |
| Silver Iodobromide Emulsion C | as silver | 0.70 |
| ExS-1 | | 3.5 × 10$^{-4}$ |
| ExS-2 | | 1.6 × 10$^{-5}$ |
| ExS-3 | | 5.1 × 10$^{-4}$ |
| ExC-1 | | 0.13 |
| ExC-2 | | 0.060 |
| ExC-3 | | 0.0070 |
| ExC-4 | | 0.090 |
| ExC-5 | | 0.015 |
| ExC-6 | | 0.0070 |
| Cpd-2 | | 0.023 |
| HBS-1 | | 0.10 |
| Gelatin | | 0.75 |

Fifth Layer
(high-sensitivity red-sensitive emulsion layer)

| | | |
| --- | --- | --- |
| Silver Iodobromide Emulsion D | as silver | 1.40 |
| ExS-1 | | 2.4 × 10$^{-4}$ |
| ExS-2 | | 1.0 × 10$^{-4}$ |
| ExS-3 | | 3.4 × 10$^{-4}$ |
| ExC-1 | | 0.10 |
| ExC-3 | | 0.045 |
| ExC-6 | | 0.020 |
| ExC-7 | | 0.010 |
| Cpd-2 | | 0.050 |
| HBS-1 | | 0.22 |
| HBS-2 | | 0.050 |
| Gelatin | | 1.10 |

Sixth Layer (interlayer)

| | |
| --- | --- |
| Cpd-1 | 0.090 |
| Solid Disperse Dye ExF-4 | 0.030 |
| HBS-1 | 0.050 |
| Polyethylacrylate latex | 0.15 |
| Gelatin | 1.10 |

Seventh Layer
(low-sensitivity green-sensitive emulsion layer)

| | | |
| --- | --- | --- |
| Silver Iodobromide Emulsion E | as silver | 0.15 |
| Silver Iodobromide Emulsion F | as silver | 0.10 |
| Silver Iodobromide Emulsion G | as silver | 0.10 |
| ExS-4 | | 3.0 × 10$^{-5}$ |
| ExS-5 | | 2.1 × 10$^{-4}$ |

| | |
|---|---|
| ExS-6 | $8.0 \times 10^{-4}$ |
| ExM-2 | 0.33 |
| ExM-3 | 0.086 |
| ExY-1 | 0.015 |
| HBS-1 | 0.30 |
| HBS-3 | 0.010 |
| Gelatin | 0.73 |

Eighth Layer
(medium-sensitivity green-sensitive emulsion layer)

| | | |
|---|---|---|
| Silver Iodobromide Emulsion H | as silver | 0.80 |
| ExS-4 | | $3.2 \times 10^{-5}$ |
| ExS-5 | | $2.2 \times 10^{-4}$ |
| ExS-6 | | $8.4 \times 10^{-4}$ |
| ExC-8 | | 0.010 |
| ExM-2 | | 0.10 |
| ExM-3 | | 0.025 |
| ExY-1 | | 0.018 |
| ExY-4 | | 0.010 |
| ExY-5 | | 0.040 |
| HBS-1 | | 0.13 |
| HBS-3 | | $4.0 \times 10^{-3}$ |
| Gelatin | | 0.80 |

Ninth Layer
(high-sensitivity green-sensitive emulsion layer)

| | | |
|---|---|---|
| Silver Iodobromide Emulsion I | as silver | 1.25 |
| ExS-4 | | $3.7 \times 10^{-5}$ |
| ExS-5 | | $8.1 \times 10^{-5}$ |
| ExS-6 | | $3.2 \times 10^{-4}$ |
| ExC-1 | | 0.010 |
| ExM-1 | | 0.020 |
| ExM-4 | | 0.025 |
| ExM-5 | | 0.040 |
| Cpd-3 | | 0.040 |
| HBS-1 | | 0.25 |
| Polyethylacrylate latex | | 0.15 |
| Gelatin | | 1.33 |

Tenth Layer (yellow filter layer)

| | | |
|---|---|---|
| Yellow colloidal silver | as silver | 0.015 |
| Cpd-1 | | 0.16 |
| Solid Disperse Dye ExF-5 | | 0.060 |
| Solid Disperse Dye ExF-6 | | 0.060 |
| Oil-Soluble Dye EXF-7 | | 0.010 |
| HBS-1 | | 0.60 |
| Gelatin | | 0.60 |

Eleventh Layer
(low-sensitivity blue-sensitive emulsion layer)

| | | |
|---|---|---|
| Silver Iodobromide Emulsion J | as silver | 0.09 |
| Silver Iodobromide Emulsion K | as silver | 0.09 |
| ExS-7 | | $8.6 \times 10^{-4}$ |
| ExC-8 | | $7.0 \times 10^{-3}$ |
| ExY-1 | | 0.050 |
| ExY-2 | | 0.22 |
| ExY-3 | | 0.50 |
| ExY-4 | | 0.020 |
| Cpd-2 | | 0.10 |
| Cpd-3 | | $4.0 \times 10^{-3}$ |
| HBS-1 | | 0.28 |
| Gelatin | | 1.20 |

Twelfth Layer
(high-sensitivity blue-sensitive emulsion layer)

| | | |
|---|---|---|
| Silver Iodobromide Emulsion L | as silver | 1.00 |
| ExS-7 | | $4.0 \times 10^{-4}$ |
| ExY-2 | | 0.10 |
| ExY-3 | | 0.10 |
| ExY-4 | | 0.010 |
| Cpd-2 | | 0.10 |
| Cpd-3 | | $1.0 \times 10^{-3}$ |
| HBS-1 | | 0.070 |
| Gelatin | | 0.70 |

Thirteenth Layer (first protective layer)

| | |
|---|---|
| UV-1 | 0.19 |
| UV-2 | 0.075 |
| UV-3 | 0.065 |
| ExF-8 | 0.020 |
| ExF-9 | 0.010 |
| ExF-10 | 0.003 |
| ExF-11 | 0.003 |
| HBS-1 | $5.0 \times 10^{-2}$ |
| HBS-4 | $5.0 \times 10^{-2}$ |
| Gelatin | 1.8 |

Fourteenth Layer (second protective layer)

| | | |
|---|---|---|
| Silver Iodobromide Emulsion M | as silver | 0.10 |
| H-1 | | 0.40 |
| B-1 (diameter: 1.7 μm) | | $5.0 \times 10^{-2}$ |
| B-2 (diameter: 1.7 μm) | | 0.15 |
| B-3 | | 0.13 |
| S-1 | | 0.20 |
| Gelatin | | 0.70 |

Further, in order to provide good preservability, processability, pressure durability, antimold/bactericidal property, antistatic property and coatability, W-1, W-2, W-3, B-4, B-5, B-6, F-1, F-2, F-3, F-4, F-5, F-6, F-7, F-8, F-9, F-10, F-11, F-12, F-13, F-14, F-15, F-16, F-17, iron salt, lead salt, gold salt, platinum salt, palladium salt, iridium salt or rhodium salt was appropriately added to each layer.

TABLE D

| | Average AgI Content (%) | Coefficient of Variation in AgI Content among Grains (%) | Average Grain Size, Sphere-Corresponding Diameter (μm) | Coefficient of Variation in Grain Size (%) | Projected Area Size, Circle-Corresponding Diameter (μm) | Diameter/ Thickness Ratio |
|---|---|---|---|---|---|---|
| Emulsion A | 1.7 | 10 | 0.46 | 15 | 0.56 | 5.5 |
| Emulsion B | 3.5 | 15 | 0.57 | 20 | 0.78 | 4.0 |
| Emulsion C | 8.9 | 25 | 0.66 | 25 | 0.87 | 5.8 |
| Emulsion D | 8.9 | 18 | 0.84 | 26 | 1.03 | 3.7 |
| Emulsion E | 1.7 | 10 | 0.46 | 15 | 0.56 | 5.5 |
| Emulsion F | 3.5 | 15 | 0.57 | 20 | 0.78 | 4.0 |
| Emulsion G | 8.8 | 25 | 0.61 | 23 | 0.77 | 4.4 |
| Emulsion H | 8.8 | 25 | 0.61 | 23 | 0.77 | 4.4 |
| Emulsion I | 8.9 | 18 | 0.84 | 26 | 1.03 | 3.7 |
| Emulsion J* | | | | | | |
| Emulsion K | 8.8 | 18 | 0.64 | 23 | 0.85 | 5.2 |
| Emulsion L | 5.7 | 17 | 1.06 | 15 | 1.32 | 6.5 |
| Emulsion M | 1.0 | — | 0.07 | 15 | — | 1 |

*Emulsion J: An emulsion produced by the method described in the present specification (Example 4).

In Table D (1) Emulsions G to I and K were subjected to reduction sensitization at the preparation of grains using thiourea dioxide and thiosulfonic acid according to the Example of JP-A-2-191938;

(2) Emulsions I and K were subjected to gold sensitization, sulfur sensitization and selenium sensitization in the presence of the spectral sensitizing dyes described in each light-sensitive layer and sodium thiocyanate according to the Example of JP-A-3-237450;

(3) in the preparation of tabular grains, low molecular weight gelatin was used according to the Example of JP-A-1-158426; and (4) in tabular grains, dislocation lines were observed through a high-pressure electron microscope as described in JP-A-3-237450.

(5) Preparation of Emulsion L

Emulsion L was prepared using the following Solutions (A-1) to (A-4).

Solution (A-1): an aqueous solution of 1.9M KBr (containing 5.0 mol% of KI)

Solution (A-2): ditto

Solution (A-3): an aqueous solution of 0.17M KI

Solution (A-4): an aqueous solution of 1.9M KBr

Emulsion L was prepared by referring to the Example of JP-A-2-838.

To 1,200 ml of an aqueous solution containing 7.0 g of gelatin having an average molecular weight of 15,000 and 4.5 g of KBr under stirring at 30° C., an aqueous solution of 1.9M $AgNO_3$ and Solution (A-1) were added by a double jet method at a rate of 25 ml/min over 70 seconds.

To 350 ml of the resulting emulsion used as a seed crystal, 65 ml of an aqueous inactive gelatin solution (containing 20 g of gelatin and 1.2 g of KBr) was added, the temperature was raised to 75° C. to ripen the emulsion for 40 minutes, then an aqueous solution of $AgNO_3$ (1.7 g) was added over 1 minute and 30 seconds, and subsequently 6.2 ml of an aqueous solution of $NH_4NO_3$ (50 wt%) and 6.2 ml of an aqueous solution of $NH_3$ (25 wt%) were added to further ripen the emulsion for 40 minutes. The pH was adjusted with $HNO_3$ (3N) to 7.0, 1.0 g of KBr was added, and then 405 ml of an aqueous solution of 1.9M $AgNO_3$ and Solution (A-2) were added while keeping the pAg of 8.5. The initial addition rate was 2.6 ml/min and the flow velocity was increased so that the final flow rate became 10 times the initial flow rate. After completion of the addition, the temperature was lowered to 55° C.

Subsequently, 40 ml of an aqueous solution of 0.6M $AgNO_3$ and Solution (A-3) were added over 10 minutes. The pAg and the pH were adjusted to 9.3 and 9.0, respectively, and then 157 ml of an aqueous solution of 1.9M $AgNO_3$ and 157 ml of Solution (A-4) were added over 26 minutes to obtain Emulsion A. Here, at the time when the addition of solutions continued for 25 minutes, the pH was adjusted to 6.0. In the resulting Emulsion L, 65% or more of the entire projected area of all silver halide grains had an average aspect ratio of 6.5.

The coefficient of variation of all grain sizes was 15% and the average grain size in terms of a sphere-corresponding diameter was 1.06 $\mu$m. The emulsion was subjected to measurement by an energy diffusion type X-ray spectroscope of an electron microscope for analysis. Then, it was verified that the silver iodide content in the fringe region was 0.9 times the silver iodide content in the center region of a grain and that tabular grains having hexagonal main planes occupied 96% of the entire projected area.

After forming the shell, the emulsion was cooled to 35° C. and washed with water by a normal flocculation method, an alkali-treated osseingelatin deionized at 40° C. was added and dissolved therein, the pH and the pAg were adjusted to 5.8 and 8.6, respectively, and the emulsion was stored in a cool and dark room.

After 5.0×10$^{-4}$ mol/mol-Ag of Spectral Sensitizing Dye ExS-7 was added and allowed to adsorb to silver halide grains at 58° C. for 20 minutes, optimal chemical sensitization was performed at 58° C. using $(CH_3)_2N-C(Se)-NH_2$ as a selenium sensitizer, sodium thiosulfate, potassium chloroaurate and potassium thiocyanate to prepare an emulsion.

(6) Preparation of Emulsion J

To 1.5 l of an alkali-treated gelatin solution containing 0.05 mol of potassium bromide and 1.0×10$^{-3}$ mol of potassium iodide, a 1.0M silver nitrate solution and 70 ml of a 0.5M potassium bromide solution the same as above were added while stirring by a double jet method over 45 seconds. During this addition, the gelatin solution was kept at 40° C. Thus, nucleation was performed. The gelatin solution at the nucleation had a pH of 5.0.

After the nucleation, the temperature was raised to 65° C., 220 ml of a 10% deionized, alkali-treated ossein gelatin solution was added, and the emulsion was ripened for 20 minutes.

Thereafter, 1×10$^{-4}$ mol of thiourea dioxide was added and after 2 minutes, 140 g of silver nitrate and a potassium bromide solution for keeping the pBr at 1.75 were added over 60 minutes at an accelerated flow rate by a controlled double jet method where the final flow rate was controlled to be 3 times the initial flow rate, thereby growing the grains. After completion of the addition and growth, 1×10$^{-4}$ mol of thiosulfonic acid was added and further, 720 ml of a 2% potassium iodide solution was added. Thereafter, a 1N sodium hydroxide aqueous solution was added to adjust the pH of the emulsion to 7.2, and then 240 ml of a 2M silver nitrate solution and a solution containing 2M potassium bromide and $K_3[RhBr_6]$ were added by a controlled double jet method at an electric potential of −30 mV over 30 minutes to form the shell. $K_3[RhBr_6]$ was added to give a coverage of 5.0×10$^{-7}$ mol/mol-Ag.

After formation of the shell, the emulsion was cooled to 35° C. and washed with water by a normal flocculation method, 80 g of alkali-treated ossein gelatin deionized at 40° C. was added and dissolved, the pH and the pAg were adjusted to 6.0 and 8.6. and the emulsion was stored in a cool and dark room.

The tabular grain obtained had a coefficient of variation of the projected area circle-corresponding diameter (hereinafter referred to as "circle-corresponding diameter") of 15% and an aspect ratio of 4.2, tabular grains having an aspect ratio of 2 or more occupied 80% or more of the entire projected area of all silver halide grains, and the emulsion was a silver iodobromide emulsion (sphere-corresponding diameter: 0.47 $\mu$m) having a silver iodide content of 5.7 mol%. The grain was observed by a direct method through an electron microscope of 200 kv while cooling the grain with liquid nitrogen and then, the tabular grain had 10 or more dislocation lines in the vicinity of the edges.

After 1.0×10$^{-3}$ mol/mol-Ag of Spectral Sensitizing Dye ExS-7 was added and allowed to adsorb to silver halide grains at 60° C. for 20 minutes, optimal chemical sensitization was performed at 60° C. using sodium thiosulfate, potassium chloroaurate and potassium thiocyanate to prepare Emulsion J.

Preparation of Dispersion of Organic Solid Disperse Dye

ExF-3 shown below was dispersed in the following manner. Namely, to 1,430 g of a dye wet cake containing 30% of methanol, water and 200 g of Pluronic F88 (an ethylene oxide-propylene oxide block copolymer, produced by BASF AG) were added and stirred to provide a slurry having a dye concentration of 6%. Then, 1,700 ml of zirconia beads having an average particle size of 0.5 mm were filled in an ultravisco mill (UVM-2) manufactured by Imex K K and the slurry obtained above was crushed by passing it through the mill at a peripheral speed of about 10 m/sec and a discharge of 0.5 l/min for 8 hours. The beads were removed by filtration, water was added to dilute the filtrate to have a dye concentration of 3% and the dilution was heated for stabilization at 90° C. for 10 hours. The resulting fine dye particles had an average particle size of 0.60 μm and the particle size distribution had a broadening (standard deviation of particle size ×100/average particle size) of 18%.

In the same manner, solid dispersions of ExF-4, ExF-5 and ExF-6 were obtained. The fine dye particles had an average particle diameter of 0.45 μm, 0.54 μm and 0.52 μm, respectively. ExF-2 was dispersed by the microprecipitation dispersion method using a pH shift described in the Example of JP-A-3-182743 and the average particle diameter of the dye fine particles was 0.05 μm.

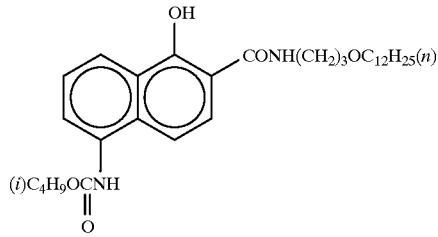

ExC-1

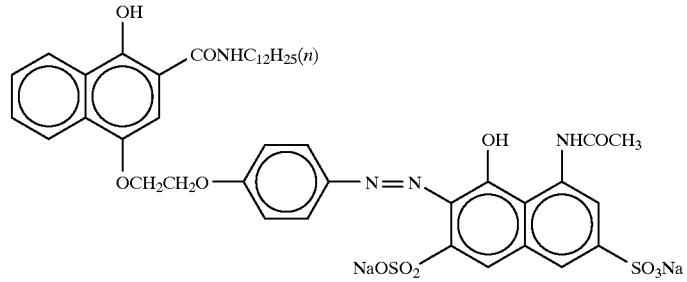

ExC-2

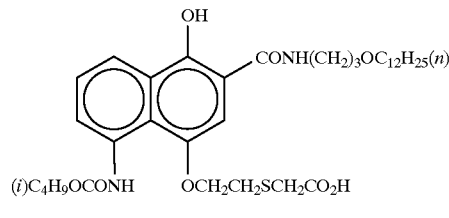

ExC-3

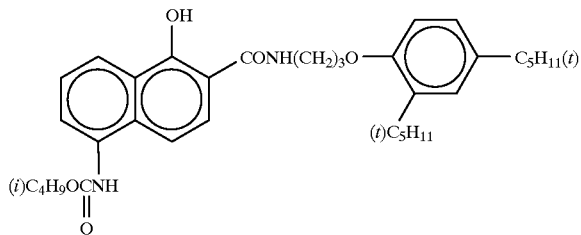

ExC-4

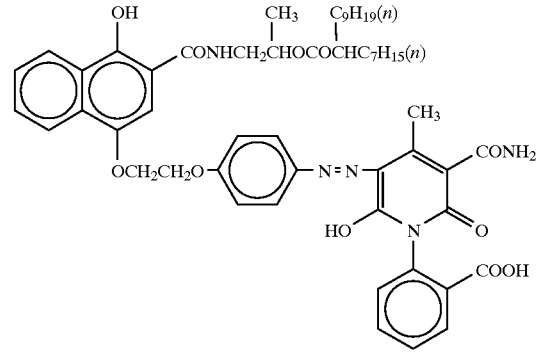

ExC-5

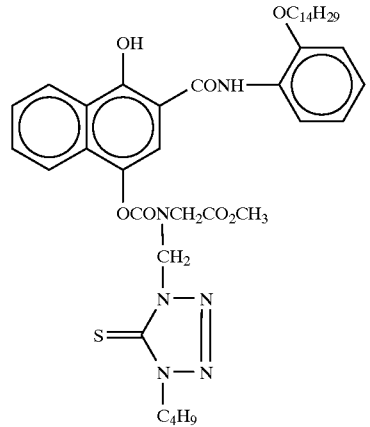

ExC-6

ExC-7
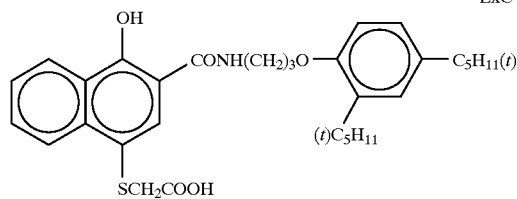
ExC-8
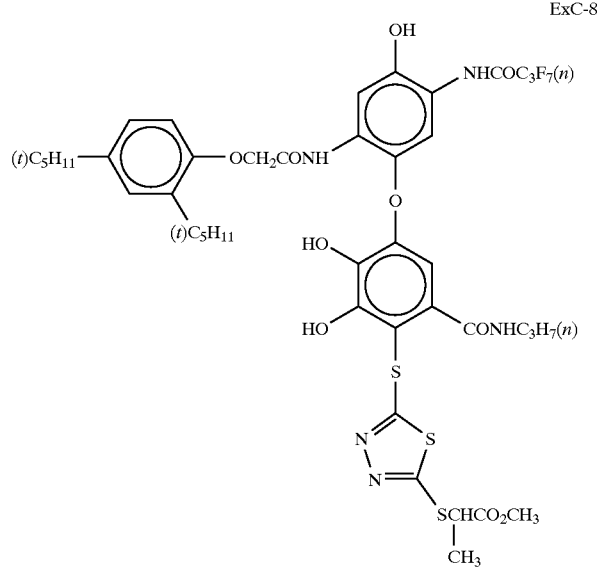
ExM-1
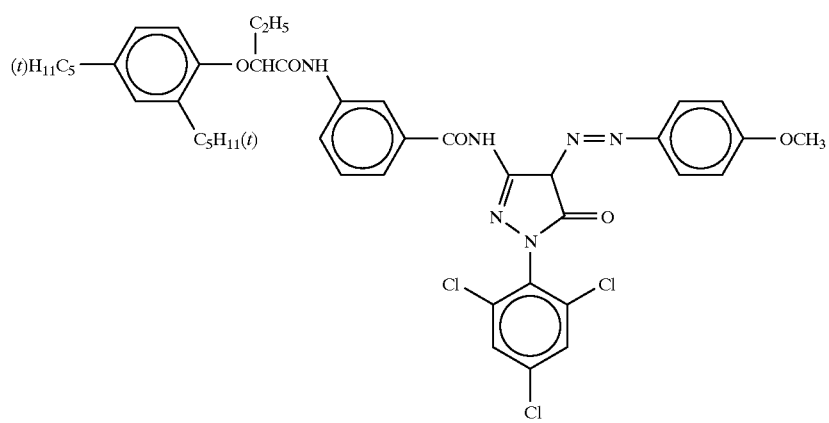
ExM-2
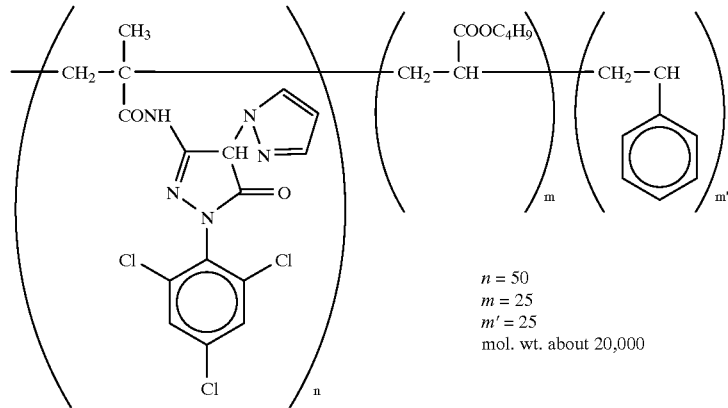
n = 50
m = 25
m' = 25
mol. wt. about 20,000

ExM-3
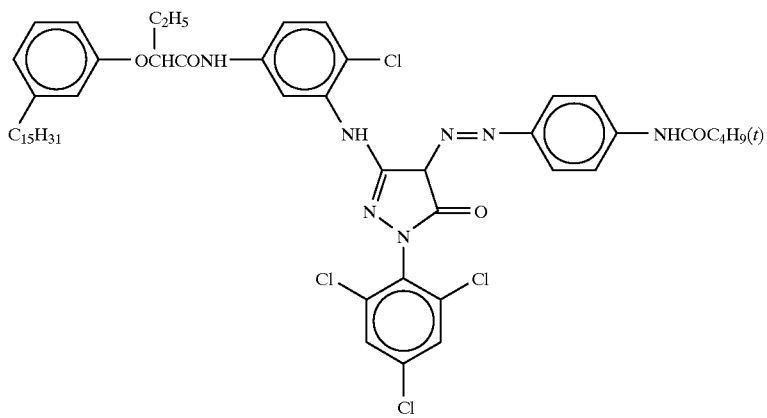
ExM-4
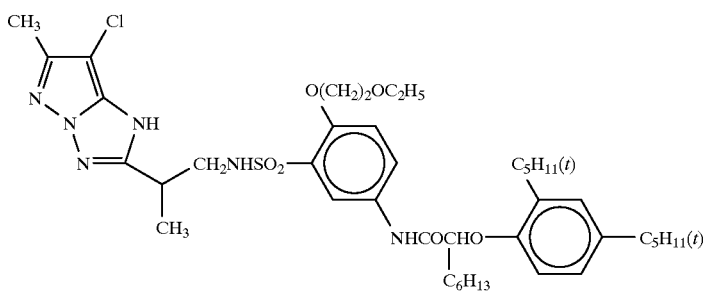
ExM-5
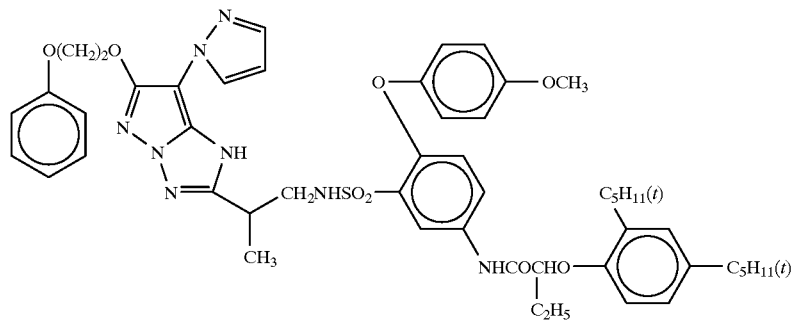
ExY-1
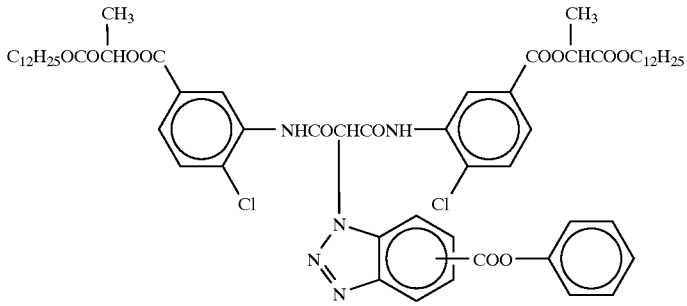

ExY-2
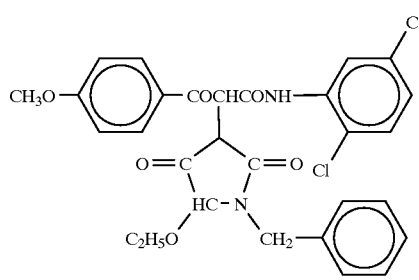
ExY-3
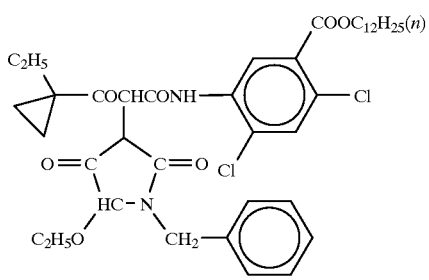
ExY-4
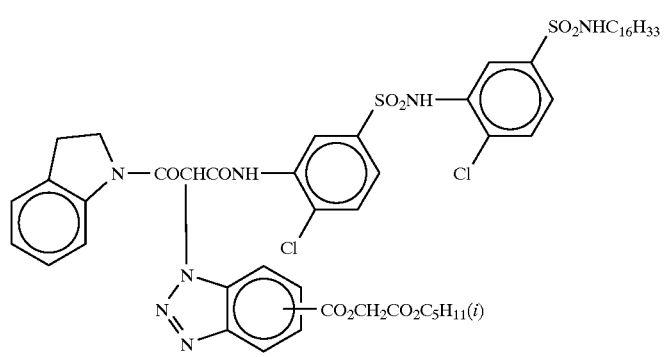
ExY-5
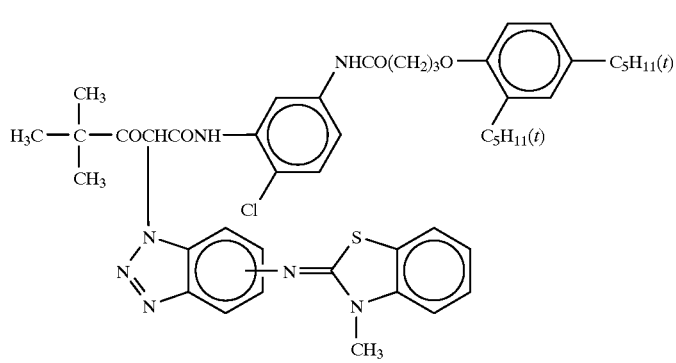
ExF-1
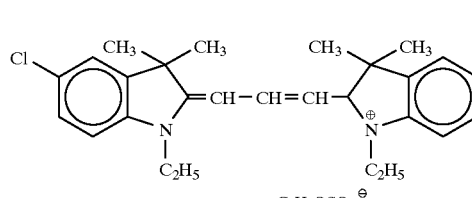
ExF-2
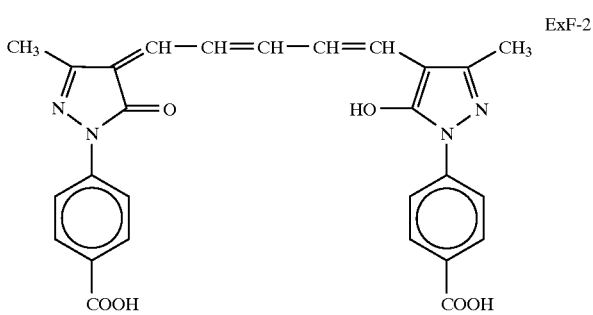
ExF-3
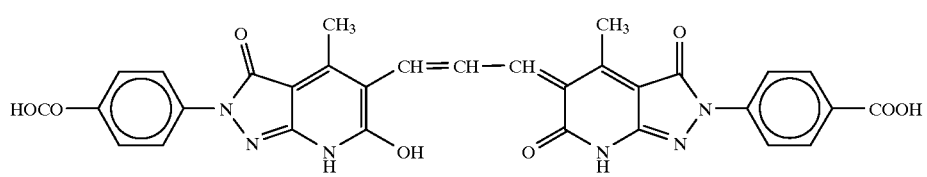

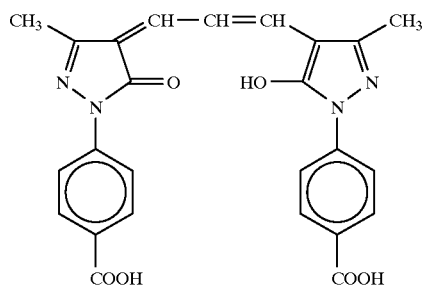
ExF-4
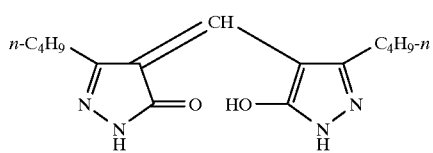
ExF-6
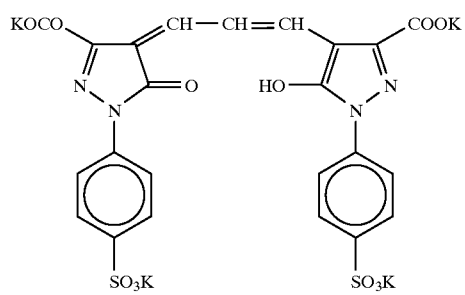
ExF-8
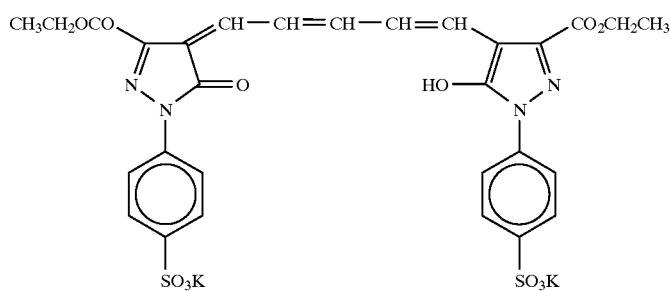
ExF-10
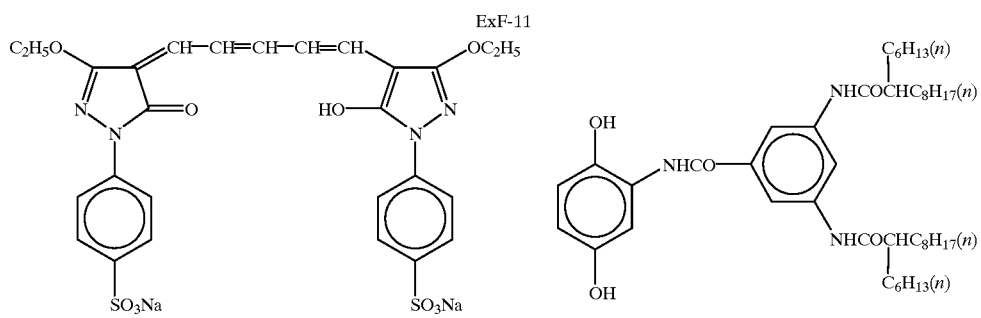
ExF-11

-continued
Cpd-2
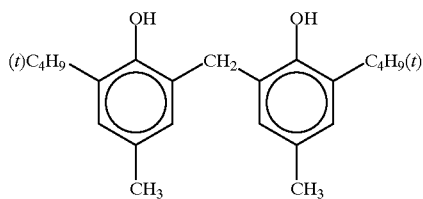
Cpd-3
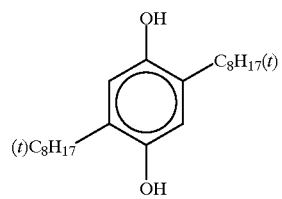
UV-1
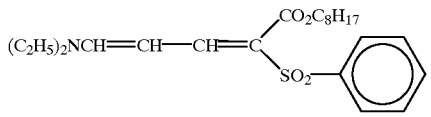
UV-2
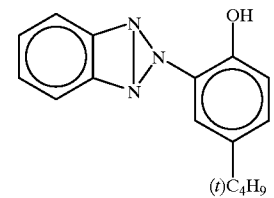
UV-3
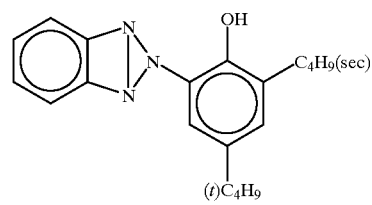
Tricresyl phosphate
HBS-1
Di-n-butyl phthalate
HBS-2
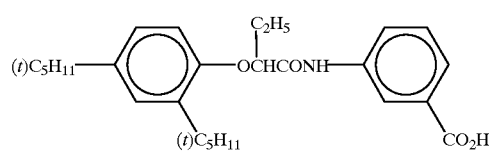
HBS-3
Tri(2-ethylhexyl) phosphate
HBS-4
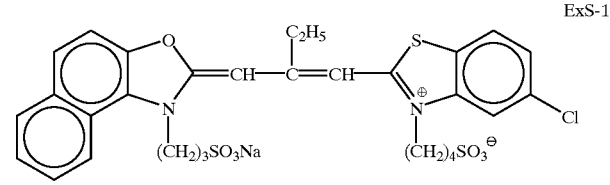
ExS-1
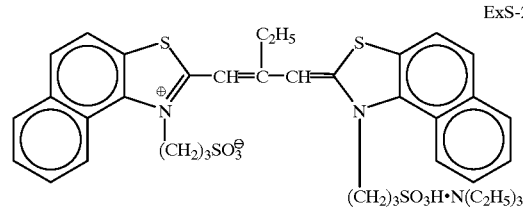
ExS-2
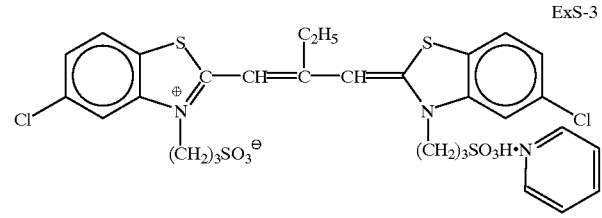
ExS-3
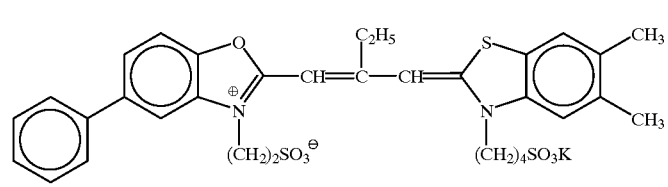
ExS-4
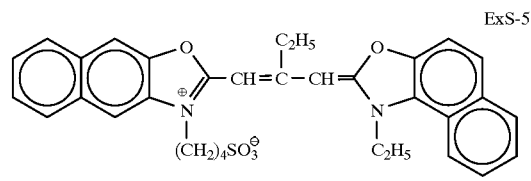
ExS-5
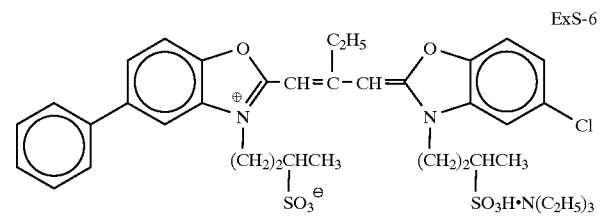
ExS-6

-continued
ExS-7
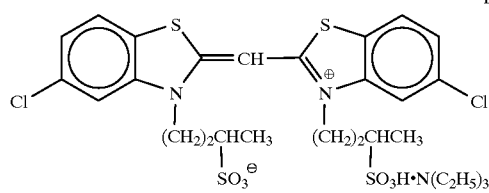
S-1
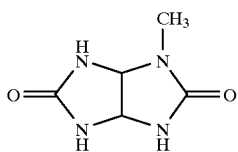
H-1
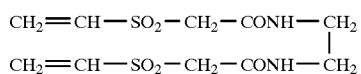
B-1
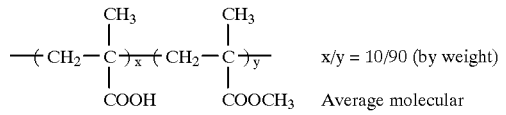  x/y = 10/90 (by weight)
Average molecular weight: about 35,000
B-2
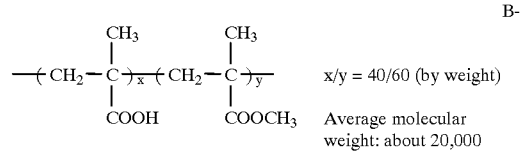  x/y = 40/60 (by weight)
Average molecular weight: about 20,000
B-3
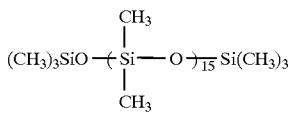
B-4
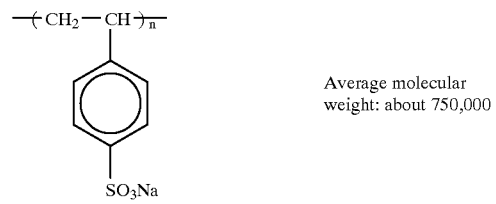
Average molecular weight: about 750,000
B-5
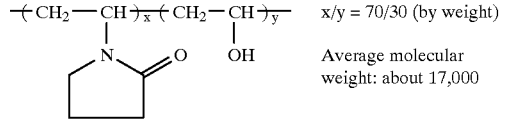  x/y = 70/30 (by weight)
Average molecular weight: about 17,000
B-6
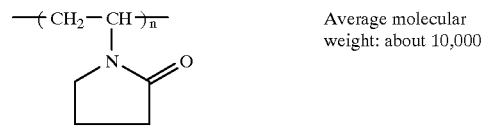
Average molecular weight: about 10,000
W-1
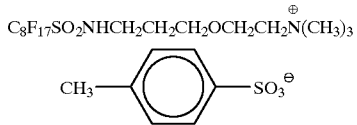
W-2
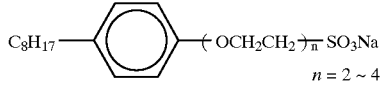 $n = 2 \sim 4$
W-3
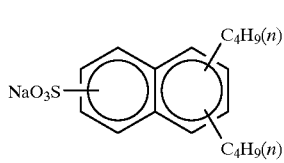
F-1
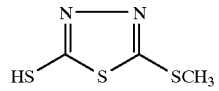
F-2
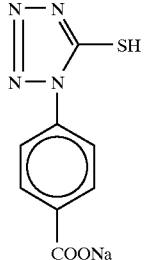
F-3
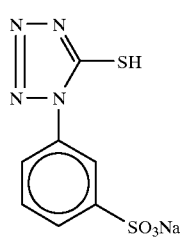
F-4
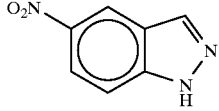

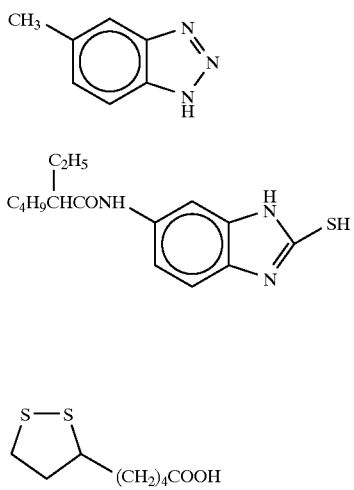

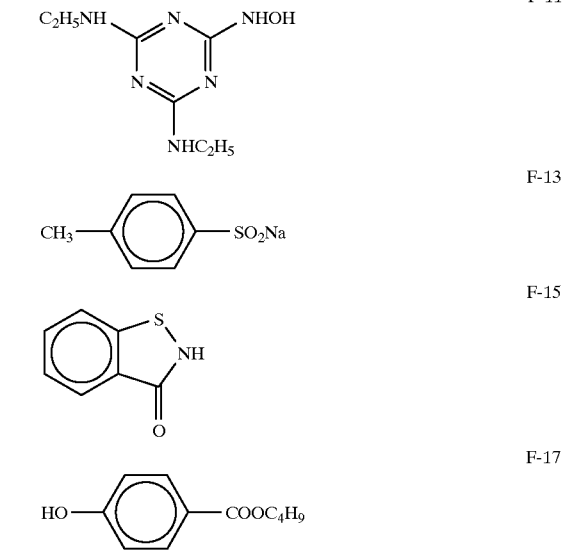

Then, as a comparative emulsion for Emulsion J, Emulsion J-1 was prepared in the same condition except for excluding $K_3[RhBr_6]$ added at the preparation of Emulsion J. Emulsion J-1 had a sphere-corresponding diameter of 0.43 μm, an aspect ratio of 4.0 and almost the same coefficient of variation. In order to obtain the same sensitivity as that of Emulsion J, the addition amount of sensitizers at the chemical sensitization was adjusted.

Further, as a comparative emulsion, Emulsion N was prepared as described below.

Preparation of Emulsion N

To 870 ml of water, 36 g of deionized, lime-processed ossein gelatin and 0.25 g of potassium bromide were added and dissolved. The resulting aqueous gelatin solution had a pH of 5.0. To the aqueous gelatin solution kept at 65° C., 36 ml of a 0.088 M (mol/l) silver nitrate aqueous solution (Solution 1) and 36 ml of a 0.088 M potassium bromide aqueous solution (Solution 2) were added over 10 minutes while stirring and subsequently, 176 ml of Solution 1 and 176 ml of Solution 2 were added by a normal double jet method over 7 minutes. Thereafter, 1,010 ml of a 0.82M silver nitrate aqueous solution (Solution 3) was added over 78 minutes at an initial flow velocity of 1.8 ml/min while increasing the flow rate, and at the same time, 0.82M potassium bromide and an aqueous solution of 0.08M potassium iodide (Solution 4) were added under the control to keep the silver voltage of +100 mV (counter saturation calomel electrode).

Further, 578 ml of a 0.51M silver nitrate aqueous solution (Solution 5) and an aqueous solution (Solution 6) containing 0.51M potassium bromide and $K_3[RhBr_6]$ were added over 24 minutes under the control at +100 mV. $K_3[RhBr_6]$ was added to give a coverage of $5.0 \times 10^{-7}$ mol/mol-Ag. After completion of the addition, the pH was 5.3. Thereafter, the temperature of the emulsion was lowered to 35° C., soluble salts were removed by a normal sedimentation method, the temperature was again raised to 40° C., 50 g of gelatin and 420 ml of water were added and dissolved, and then the pH was adjusted to 6.3. The resulting grains were monodisperse silver iodobromide cubic grains each having a side length of 0.43 μm and an iodide content of 5.7 mol% and the variation of coefficient of the grain size distribution was 13%.

Subsequently, the emulsion was subjected to optimal chemical sensitization at 60° C. using $9.2 \times 10^{-6}$ mol/mol-Ag of sodium thiosulfate, $2.1 \times 10^{-6}$ mol/mol-Ag of potassium chloroaurate and $2.5 \times 10^{-4}$ mol/mol-Ag of potassium thiocyanate to obtain Emulsion N.

Further, after the above-described chemical sensitization of the emulsion, Spectral Sensitizing Dye ExS-7 was added in an amount of $1.1 \times 10^{-3}$ mol/mol-Ag immediately before the coating and allowed to adsorb to silver halide at 40° C. for 20 minutes.

Using these Emulsions J-1 and N and Emulsion J prepared above, samples were prepared. Preparation of Samples 402 and 403:

Using Emulsion J-1 and Emulsion N, Sample 402 and Sample 403 were prepared by replacing Emulsion J in the eleventh layer of Sample 401 by Emulsion J-1 and by Emulsion N, respectively. The coating amount of the emulsion and the addition amount of Sensitizing Dye ExS-7 were finely adjusted so as to give the same gradation and sensitivity as those of Sample 401. In Sample 402, the coating amount needed be increased by about 15%. Accordingly, the coated silver amount increased in proportion thereto. Preparation of Samples 404 and 405:

Samples 404 and 405 were prepared by adding Comparative Compound (1) or (2) shown below as a comparative compound for the compound represented by formula (A-I), (A-II) or (A-III) of the present invention, to the eleventh layer of Sample 401 to give a coated amount of 21.4 mg/m².

Comparative Compound (1): (Compound (d) described in JP-A-59-97134)

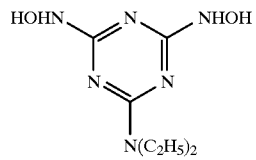

Comparative Compound (2): (Compound (1) described in JP-A-59-162546)

Preparation of Samples 406 to 408

Samples 406 to 408 were prepared by adding Compound A-50 represented by formula (A-I) of the present invention to the eleventh layer of Samples 401 to 403 to give an equimolar coating amount with that of the comparative compound used in Sample 404 or 405. Compound A-50 was emulsion-dispersed in High Boiling Point Organic Solvent HBS-1 used in the same layer in an amount of giving a weight ratio of 1, and the dispersion obtained was used.
Preparation of Samples 409 to 415

Samples 409 to 415 were prepared by replacing Compound A-50 of the present invention in Sample 406 by an equimolar amount of other coupler represented by formula (A-I), (A-II) or (A-III) as shown in Table E. The compound was added in the same manner as above.

TABLE E

| Sample | Emulsion (+Emulsion K) | Sphere-Corresponding Diameter (μm) | Aspect Ratio | Desensitizer (× $10^{-7}$ mol/mol-Ag) | | Compound of Formula (A-I), (A-II) or (A-III) | Sharpness | Interlayer Effect (ΔDM) | Photographic Properties (ΔD) |
|---|---|---|---|---|---|---|---|---|---|
| 401 (Comparison) | J | 0.47 | 4.2 | 5.0 | K₃[RhBr₆] | — | 100 | 0.10 | 121 |
| 402 (Comparison) | J-1 | 0.43 | 4.0 | | — | — | 89 | 0.06 | 112 |
| 403 (Comparison) | N | 0.46 (cubic) | 1.0 | 5.0 | K₃[RhBr₆] | — | 80 | 0.12 | 125 |
| 404 (Comparison) | J | 0.47 | 4.2 | 5.0 | K₃[RhBr₆] | Comparative Compound (1) | 103 | 0.12 | 114 |
| 405 (Comparison) | J | 0.47 | 4.2 | 5.0 | K₃[RhBr₆] | Comparative Compound (2) | 103 | 0.12 | 114 |
| 406 (Invention) | J | 0.47 | 4.2 | 5.0 | K₃[RhBr₆] | A-50 | 113 | 0.17 | 105 |
| 407 (Comparison) | J-1 | 0.43 | 4.0 | | — | A-50 | 101 | 0.10 | 104 |
| 408 (Comparison) | N | 0.46 (cubic) | 1.0 | 5.0 | K₃[RhBr₆] | A-50 | 93 | 0.13 | 110 |
| 409 (Invention) | J | 0.47 | 4.2 | 5.0 | K₃[RhBr₆] | A-3 | 111 | 0.16 | 102 |
| 410 (Invention) | J | 0.47 | 4.2 | 5.0 | K₃[RhBr₆] | A-8 | 111 | 0.16 | 102 |
| 411 (Invention) | J | 0.47 | 4.2 | 5.0 | K₃[RhBr₆] | A-13 | 112 | 0.15 | 101 |
| 412 (Invention) | J | 0.47 | 4.2 | 5.0 | K₃[RhBr₆] | A-18 | 113 | 0.17 | 100 |
| 413 (Invention) | J | 0.47 | 4.2 | 5.0 | K₃[RhBr₆] | A-55 | 113 | 0.17 | 100 |
| 414 (Invention) | J | 0.47 | 4.2 | 5.0 | K₃[RhBr₆] | A-10 | 109 | 0.14 | 103 |
| 415 (Invention) | J | 0.47 | 4.2 | 5.0 | K₃[RhBr₆] | A-31 | 108 | 0.14 | 104 |
| 416* (Invention) | J | 0.47 | 4.2 | 5.0 | K₃[RhBr₆] | A-50 (10th layer) | 109 | 0.13 | 105 |
| 417* (Invention) | J | 0.47 | 4.2 | 5.0 | K₃[RhBr₆] | A-50 (12th layer) | 108 | 0.14 | 104 |

*Sample 416 contains A-50 also in the tenth layer and Sample 417 contains A-50 also in the twelfth layer.

Preparation of Samples 416 and 417

Sample 416 was prepared by adding Compound A-50 of the present invention in the tenth layer as a yellow filter layer of Sample 401 to give a coated amount of ½ (by mol) the amount used in the eleventh layer of Sample 406. Sample 417 was prepared by adding Compound A-50 of the present invention in the twelfth layer as a high-sensitivity blue-sensitive emulsion layer of Sample 401 in the same amount as used in the eleventh layer of Sample 406. In the addition, a dispersion was used the same as above.

The thus-prepared Samples 401 to 417 each was cut into a size of 24 mm (width) ×160 cm according to the method described in Example 1, the same perforations were punched, FM signals were recorded on the magnetic layer, and the samples each was housed in a cartridge shown in FIGS. 1 to 7 to provide a color light-sensitive material.

These light-sensitive materials were examined on the following capabilities.

(1) Sharpness

A fresh light-sensitive material was used, exposed through a green filter fixed to the front surface of the wedge for sensitometry and then subjected to the color development described later. The magenta dye image obtained was evaluated by measuring the MTF (Modulation Transfer Function) value. Measurement of MTF followed the method described in *Journal of Applied Photographic Engineering*, Vol. 6(1), 1-8 (1980). However, the development was performed through the processing steps described later. The MTF value was expressed by a relative value to the value of Sample 401 taken as 100. The larger the value, the more improved the sharpness.

(2) Interlayer effect

A fresh light-sensitive material was used, exposed with gradation through a blue filter fixed to the front surface of the wedge for sensitometry, subsequently uniformly exposed to green light through a green filter fixed in this turn, and then subjected to the color development described later. The uniform exposure to green light was performed by finely adjusting the exposure amount so that each sample gave a magenta density of 1.5 on the minimum density area obtained when the gradation exposure to blue light was performed.

The dye image obtained was measured on the density. The magenta density ($DM_1$) at the point of exposure amount necessary for giving a yellow density of (minimum density +2.0) was obtained and the difference in density ($\Delta DM = DM_2$ (=1.5) $-DM_1$) from the magenta density ($DM_2=1.5$) on the minimum yellow density area was obtained. This was used as a measure for evaluating easiness to have the interlayer effect. The larger the $\Delta DM$ value, the greater the interlayer effect and the more improved the image quality.

(3) Aging storability of light-sensitive material One group of the color light-sensitive materials was stored at 25° C. and 60% RH for 7 days and another group was housed in a closed pressure proof container so as to accelerate aging and stored at 40° C. for 7 days under pressurization in the container to 5 atm with an air. Each sample was taken out from the cartridge, exposed to white light through a wedge for sensitometry, subjected to the color development described below and measured on the yellow density to obtain the characteristic curve.

On the characteristic curve, a point of the exposure amount necessary for giving the yellow density of the minimum density +2.0 was obtained for samples stored at 25° C. and 60% RH and further, the density at a point of the same exposure amount was read for samples with the same sample number but stored at 40° C. under pressurization to 5 atm. After subtracting the minimum density value from the density values obtained, the density ratio (DY (%) =$\Delta$D) thereof to the density value (=2.0) at 25° C. and 60% RH was obtained. The closer to 100 the value, the smaller the change in the photographic properties during storage and the more excellent the aging storability.

The results are shown together in Table E.

The color development processing used in examining capabilities (1), (2) and (3) is described below.

Using an automatic developing machine FP-360B manufactured by Fuji Photo Film Co., Ltd., Fuji Color Nega Super G Ace 400 (manufactured by Fuji Photo Film Co., Ltd.) photographed in a camera was processed (running processing) through the following steps every 1 $m^2$ per day over 15 days. The machine was modified such that the overflow solution of the bleaching bath was not flown into the subsequent bath but all was discharged to the waste water tank. To this FP-360B, an evaporation compensation means described in *JIII Journal of Technical Disclosure*, No. 94-4992 was mounted.

The processing procedure and the composition of each processing solution are shown below. (Processing Procedure)

| Step | Processing Time | Processing Temperature (° C.) | Replenishing Amount* (ml) | Tank Volume (l) |
|---|---|---|---|---|
| Color development | 3 min 5 sec | 38.0 | 20 | 17 |
| Bleaching | 50 sec | 38.0 | 5 | 5 |
| Fixing (1) | 50 sec | 38.0 | — | 5 |
| Fixing (2) | 50 sec | 38.0 | 8 | 5 |
| Water washing | 30 sec | 38.0 | 17 | 3.5 |
| Stabilization (1) | 20 sec | 38.0 | — | 3 |
| Stabilization (2) | 20 sec | 38.0 | 15 | 3 |
| Drying | 1 min 30 sec | 60 | | |

*The replenishing amount was per 1.1 in of the light-sensitive material in a width of 35 mm (corresponding to 1 roll of 24 Ex.)

The stabilizing solution was flown from (2) to (1) in a countercurrent system and the overflow solution of washing water was all introduced into fixing (2). Also, the fixing solution was flown from (2) to (1) connected by piping in a countercurrent system. The carried-over amount of developer into the bleaching step, that of bleaching solution into the fixing step, and that of fixing solution into the water washing step were 2.5 ml, 2.0 ml, and 2.0 ml, respectively, per 1.1 m of the light-sensitive material in a width of 35 mm. The cross-over time was 6 seconds in each interval and this time was included in the processing time of the previous step.

The open area of the above-described processor was 100 $cm^2$ for the color developer, 120 $cm^2$ for the bleaching solution and about 100 $cm^2$ for other processing solutions.

The composition of each processing solution is shown below.

| | Tank Solution (g) | Replenisher (g) |
|---|---|---|
| (Color Developer) | | |
| Diethylenetriaminepentaacetic acid | 2.0 | 2.0 |
| 1-Hydroxyethylidene-1,1-diphosphonic acid | 2.0 | 2.0 |
| Sodium sulfite | 3.9 | 5.3 |
| Potassium carbonate | 37.5 | 39.0 |
| Potassium bromide | 1.4 | 0.4 |
| Potassium iodide | 1.3 mg | — |
| Disodium N,N-bis(sulfonato-ethyl)hydroxylamine | 2.0 | 2.0 |
| Hydroxylamine sulfate | 2.4 | 3.3 |
| 2-Methyl-4-[N-ethyl-N-(β-hydrbxyethyl)amino]aniline sulfate | 4.5 | 6.4 |
| Water to make | 1.0 l | 1.0 l |
| pH (adjusted by potassium hydroxide and sulfuric acid) | 10.05 | 10.18 |
| (Bleaching Solution) | | |
| Ammonium 1,3-diaminopropane-tetraacetato ferrate monohydrate | 118 | 180 |
| Ammonium broinide | 80 | 115 |
| Ammonium nitrate | 14 | 21 |

-continued

|  | Tank Solution (g) | Replenisher (g) |
| --- | --- | --- |
| Succinic acid | 40 | 60 |
| Maleic acid | 33 | 50 |
| Water to make | 1.0 l | 1.0 l |
| pH (adjusted by aqueous ammonia) | 4.4 | 4.0 |
| (Fixing Solution) | | |
| Ammonium methanesulfinate | 10 | 30 |
| Ammonium methanethiosulfonate | 4 | 12 |
| Aqueous solution of ammonium thiosulfate (700 g/l) | 280 ml | 840 ml |
| Imidazole | 7 | 20 |
| Ethylenediaminetetraacetic acid | 15 | 45 |
| Water to make | 1.0 l | 1.0 l |
| pH (adjusted by aqueous ammonia and acetic acid) | 7.4 | 7.45 |

(Washing Water)

Tap water was passed through a mixed bed column filled with an H-type strongly acidic cation exchange resin (Amberlite IR-120B, produced by Rhom and Haas) and an OH-type strongly basic anion exchange resin (Amberlite IR-400, produced by the same company) to reduce the calcium and magnesium ion concentrations each to 3 mg/l or less and then thereto 20 mg/l of sodium isocyanurate dichloride and 150 mg/l of sodium sulfate were added. The resulting salt had a pH of from 6.5 to 7.5.

| (Stabilizing Solution) The tank solution and the replenisher were common. | |
| --- | --- |
| | (unit: g) |
| Sodium p-toluenesulfinate | 0.03 |
| Polyoxyethylene-p-monononylphenyl ether (average polymerization degree: 10) | 0.2 |
| Ethylenediaminetetraacetate disodium salt | 0.05 |
| 1,2,4-Triazole | 1.3 |
| 1,4-Bis(1,2,4-triazol-1-ylmethyl)-piperazine | 0.75 |
| 1,2-Benzoisothiazolin-3-one | 0.10 |
| Water to make | 1.0 l |
| pH | 8.5 |

It is seen from Table E that Samples 406 and 409 to 417 as color light-sensitive materails satisfying the constitution features of the present invention that the emulsion comprises tabular grains containing a desensitizer and uses the compound represented by formula (A-I), (A-II) or (A-III), exhibited small change in the photographic properties after storage with age, improved in the sharpness and the interlayer effect, and provided excellent image quality. Thus, the objects of the present invention are satisfactorily attained.

When Sample 406 was compared with Sample 416 or 417, it is seen that in order to achieve the objects of the present invention, the hydroxylamine-base compound is preferably incorporated into the emulsion layer comprising tabular grains containing a desensitizer.

Further, as described above, use of an emulsion containing tabular grains gives another advantage that the coated amount can be reduced and as a result, the coated silver amount can be reduced.

EXAMPLE 5

Preparation of Emulsion P

To 3.0 l of a 0.8% low molecular weight (molecular weight: 10,000) gelatin solution containing 0.1 mol of potassium bromide, 30 ml of a 0.5M silver nitrate solution and 30 ml of a 0.5M potassium bromide solution were added while stirring by a double jet method over 15 seconds. During the addition, the gelatin solution was kept at 40° C. Thus, nucleation was performed. At the nucleation, the gelatin solution had a pH of 5.0.

After the nucleation, the temperature was raised to 75° C. Thereto, 220 ml of a 10% deionized alkali-treated ossein gelatin solution was added and then the emulsion was ripened for 20 minutes. Thereafter, 805 ml of a 0.47M silver nitrate solution was added to ripen the emulsion.

After further ripening for 10 minute, 150 g of silver nitrate and a potassium bromide solution containing 2.7 mol% of potassium iodide for keeping the pBr at 1.7 were added over 60 minutes at an accelerated flow rate by a controlled double jet method where the final flow rate was controlled to be 19 times the initial flow rate, while keeping the potential at −20 mV, thereby growing the grains. After completion of the addition and growth, 30 ml of a 10% potassium iodide solution was added. Thereafter, a 1N sodium hydroxide aqueous solution was added to adjust the pH of the emulsion to 7.2, and then 327 ml of a 0.5M silver nitrate solution and a solution containing 0.5M potassium bromide and $K_3[RhBr_6]$ were added over 20 minutes at a potential of 0 mV by a controlled double jet method to form the shell. $K_3[RhBr_6]$ was added to give a coverage of $5.0 \times 10^{-7}$ mol/mol-Ag.

After formation of the shell, the emulsion was cooled to 35° C. and washed with water by a usual flocculation method. Thereto, 80 g of an alkali-treated ossein gelatin deionized at 40° C. was added and dissolved to adjust the pH and the pAg to 6.5 and 8.6, respectively, and the emulsion was stored in a cool and dark room.

The tabular grains obtained had a projected area circle-corresponding diameter (hereinafter referred to as a "circle-corresponding diameter") of 0.79 $\mu$m, a coefficient of variation of the circle-corresponding diameter of 20% and an aspect ratio of 10.2, tabular grains having an aspect ratio of 2 or more occupied 80% or more of the entire projected area of all silver halide grains, and the emulsion was a silver iodobromide emulsion (sphere-corresponding diameter: 0.42 $\mu$m) having a silver iodide content of 3.7 mol%. The grain was observed by a direct method through an electron microscope of 200 kv while cooling with liquid nitrogen. As a result, the grain was found to have 10 or more dislocation lines in the vicinity of the edges.

Spectral Sensitizing Dye ExS-7 was added in an amount of $1.5 \times 10^{-3}$ mol/mol-Ag and adsorbed to silver halide grains at 65° C. for 20 minutes. Thereafter, the emulsion was subjected to optimal chemical sensitization at 65° C. using sodium thiosulfate, potassium chloroaurate and potassium thiocyanate to prepare Emulsion P.

Emulsion P was a tabular grain having a sphere-corresponding diameter of 0.42 $\mu$m, an aspect ratio of 10.2 and a coefficient of variation of 18%, and 85% or more of the entire projected area of silver halide grains were tabular grains having an aspect ratio of 2 or more. The average iodide content was 5.7 mol%. The addition time of the desensitizer was the same as in Emulsion J and it was at the shell formation time, however, the addition amount was changed to $1.0 \times 10^{-6}$ mol.

Based on the preparation method of Emulsion P, Emulsion P-1 was prepared, where the desensitizer was omitted and the grains was grown after the nucleation of silver bromide while controlling the temperature, the time period of the double jet mixing, the concentrations of the aqueous halogen salt solution and the aqueous silver nitrate solution, and the pAg at the time of grain growth. Emulsion P-1 had a sphere-corresponding diameter of 0.38 μm, an aspect ratio of 10.0 and almost the same coefficient of variation. Emulsion P-1 was sensitive higher than Emulsion P and the difference in the sensitivity was corrected by chemical sensitization.

Samples shown in Table F were prepared by using Emulsion P or Emulsion P-1 in place of Silver Iodobromide Emulsion E used in the seventh layer as the low-sensitivity green-sensitive emulsion layer of Sample 401 in Example 4. To provide the same gradation, the coated amount and the addition amount of the sensitizing dye were finely controlled, and at this time, the coated amount was reduced by about 10% as a result of the change from Emulsion E to Emulsion P or Emulsion P-1. The coated amount of DIR Coupler ExY-1 used in the seventh layer was changed to 0.012 g/m² which was 0.8 times.

The dye image obtained was measured on the density. The cyan density ($DC_1$) at the point of exposure amount necessary for giving a magenta density of (minimum density +2.0) was obtained. On the other hand, the cyan density ($DC_2$) in the minimum magenta density area was read and the difference therebetween ($\Delta DC$) was used as a measure for evaluating easiness to have the interlayer effect from the green-sensitive layer to the red-sensitive layer.

(3) Aging storability of light-sensitive material

The magenta density was examined according to the method described in item (3) of Example 4.

The results obtained are shown in Table F.

It is clearly seen from Table F that in Samples 503 and 505 to 513 satisfying the constitution features of the present invention, change in the photographic properties, which varies depending on the storability, was prevented, and good improvement effects were exhibited on the sharpness and the

TABLE F

| | Emulsion in Seventh Layer | | | | | | | |
|---|---|---|---|---|---|---|---|---|
| Sample | Emulsion (+Emulsion F, G) | Sphere-Corresponding Diameter (μm) | Aspect Ratio | Desensitizer ($\times 10^{-7}$ mol/mol-Ag) | | Compound of Formula (A-I), (A-II) or (A-III) | Sharpness | Interlayer Effect ($\Delta DC$) | Photographic Properties ($\Delta D$) |
| 501 (Comparison) | P | 0.42 | 10.2 | 5.0 | $K_3[RhBr_6]$ | — | 100 | 0.10 | 118 |
| 502 (Comparison) | P-1 | 0.38 | 10.0 | | — | — | 90 | 0.07 | 109 |
| 503 (Invention) | P | 0.42 | 10.2 | 5.0 | $K_3[RhBr_6]$ | A-17 | 112 | 0.15 | 101 |
| 504 (Comparison) | P-1 | 0.38 | 10.0 | | — | A-17 | 102 | 0.09 | 110 |
| 505 (Invention) | P | 0.42 | 10.2 | 5.0 | $K_3[RhBr_6]$ | A-2 | 109 | 0.14 | 103 |
| 506 (Invention) | P | 0.42 | 10.2 | 5.0 | $K_3[RhBr_6]$ | A-14 | 110 | 0.14 | 103 |
| 507 (Invention) | P | 0.42 | 10.2 | 5.0 | $K_3[RhBr_6]$ | A-16 | 111 | 0.15 | 102 |
| 508 (Invention) | P | 0.42 | 10.2 | 5.0 | $K_3[RhBr_6]$ | A-18 | 112 | 0.15 | 102 |
| 509 (Invention) | P | 0.42 | 10.2 | 5.0 | $K_3[RhBr_6]$ | A-50 | 112 | 0.15 | 100 |
| 510 (Invention) | P | 0.42 | 10.2 | 5.0 | $K_3[RhBr_6]$ | A-20 | 108 | 0.12 | 104 |
| 511 (Invention) | P | 0.42 | 10.2 | 5.0 | $K_3[RhBr_6]$ | A-26 | 107 | 0.12 | 105 |
| 512* (Invention) | P | 0.42 | 10.2 | 5.0 | $K_3[RhBr_6]$ | A-17 | 113 | 0.15 | 100 |
| 513* (Invention) | P | 0.42 | 10.2 | 5.0 | $K_3[RhBr_6]$ | A-17 | 113 | 0.15 | 101 |

*1: The eighth layer contained 25.7 mg/m² of A-50.
*2: The sixth layer contained 17.1 mg/m² of A-50.

In preparing samples, with respect to the addition amount of the compounds represented by formulae (A-I) to (A-III) of the present invention, A-1 was added to give a coated amount of 43.5 mg/m² and other compounds were added to give an equimolar coated amount. The compounds each was mixed with the coupler and added. In the addition to the eighth layer of Sample 512 and to the sixth layer of Sample 513, a dispersion obtained by separately emulsion-dispersing the compound according to Example 4 was used.

The thus-prepared Samples 501 to 513 were processed in the same manner as in Example 4 and evaluated on the capabilities in the same manner.

(1) Sharpness

Samples each was exposed through a red filter fixed to the front surface of the wedge for sensitometry and subjected to the color development processing described in Example 3. The cyan dye image was measured on the MTF value in the same manner as in Example 4.

(2) Interlayer effect

Samples each was exposed with gradation through a green filter fixed to the front surface of the wedge for sensitometry, subsequently uniformly exposed to red light through a green filter, and then subjected to the color development described in Example 3. The uniform exposure to red light was performed by finely adjusting the exposure amount so that each sample gave a cyan density of 1.5 on the minimum density area obtained when the gradation exposure to green light was performed.

interlayer effect to prove improvement of the image quality, thus, the objects of the present invention were satisfactorily attained. It is also seen that by using the emulsion comprising tabular silver halide grains, not only the above-described objects can be attained but also another advantage can be provided such that the coated silver amount can be reduced as a result of reduction in the coated amount.

EXAMPLE 6

Samples 601 to 611 were prepared in the same manner as Samples 501 to 511 in Example 5 except that Emulsion A used in the third layer as the low-sensitivity red-sensitive emulsion layer of Sample 401 in Example 4 was replaced by Emulsion P or P-1 prepared in Example 5 and the compound represented by formula (A-I), (A-II) or (A-II) was used in the third layer, and capabilities of these samples were examined. The coated amount of Emulsion P or P-1 could be reduced from that of Emulsion A to provide samples having the same gradation. However, the desensitizer in Emulsion P was changed to $K_3[Cr(CN)_6]$ and the addition amount thereof was $2.0 \times 10^{-7}$ mol/mol-Ag.

The cyan dye image was examined on the sharpness and the interlayer effect was examined on the effect from the red-sensitive layer to the green-sensitive layer. Then, it is verified that Samples 603 and 605 to 611 satisfying the constitution features of the present invention were improved in both the sharpness and the interlayer effect as compared with comparative samples. With respect to the photographic properties, change in the cyan dye image was obviously improved and thus, it was verified that samples of the present invention had excellent storability.

When taken account of the results in Examples 4, 5 and 6, it is easily presumed that a color light-sensitive material in which at least one of respective light-sensitive layers comprises an emulsion comprising tabular silver halide grains having an aspect ratio of 2.0 or more, a part of the tabular grains contains a desensitizer, and the compound represented by formula (A-I), (A-II) or (A-III) of the present invention is used in the layer containing the emulsion, can be further improved in the aging storability and in the image quality such as sharpness and the interlayer effect.

According to the present invention, a silver halide photographic light-sensitive material having at least one light-sensitive silver halide emulsion layer and a light-insensitive layer is provided, wherein at least one of light-sensitive silver halide emulsion layers contains an emulsion comprising silver halide grains in which 50% or more of the entire projected area of all silver halide grains are tabular silver halide grains having an aspect ratio of 2.0 or more and at least a part of the tabular grains contains a desensitizer, and the same layer and/or a light-insensitive layer or other light-sensitive silver halide emulsion layer contains a compound represented by formula (A-I), (A-II) or (A-III), and the silver halide photographic light-sensitive material is suppressed, when it is stored with age, in change of the photographic properties such as sensitivity and fog, thereby exhibiting stable photographic properties, excellent in the image quality such as sharpness and easiness to have an interlayer effect, and reduced in the coated silver amount. Also, a package housing the light-sensitive material is provided.

While the invention has been described in detail and with reference to specific embodiments thereof, it will be apparent to one skilled in the art that various changes and modifications can be made therein without departing from the spirit and scope thereof.

What is claimed is:

1. A silver halide photographic light-sensitive material comprising a support having thereon at least one light-sensitive silver halide emulsion layer and at least one light-insensitive layer, wherein at least one of said at least one light-sensitive silver halide emulsion layer is a light-sensitive silver halide emulsion layer containing a silver halide emulsion in which (1) 50% or more of the entire projected area of all silver halide grains are tabular silver halide grains having an aspect ratio of 2.0 or more and (2) a desensitizer selected from the group consisting of at least one compound containing a metal atom belonging to Period 4, Period 5 or Period 6 of either Group 7, Group 8 or Group 9 and desensitizing dyes is contained such that the emulsion containing the desensitizer has a sensitivity which is at least 0.15 less than that of an emulsion which is the same emulsion except for containing no desensitizer, and said light-sensitive material contains a compound represented by formula (A-I), (A-II) or (A-III):

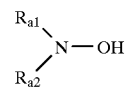
(A-I)

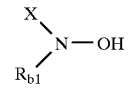
(A-II)

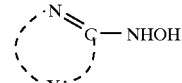
(A-III)

wherein in formula (A-I), $R_{a1}$ represents an alkyl group, an alkenyl group, an aryl group, an acyl group, an alkylsulfonyl group, an arylsulfonyl group, an alkylsulfinyl group, an arylsulfinyl group, a carbamoyl group, a sulfamoyl group, an alkoxycarbonyl group or an aryloxycarbonyl group, $R_{a2}$ represents a hydrogen atom or a group represented by $R_{a1}$, with the proviso that when $R_{a1}$ is an alkyl group, an alkenyl group or an aryl group, $R_{a2}$ is an acyl group, an alkylsulfonyl group, an arylsulfonyl group, an alkylsulfinyl group, an arylsulfinyl group, a carbamoyl group, a sulfamoyl group, an alkoxycarbonyl group or an aryloxycarbonyl group, and $R_{a1}$ and $R_{a2}$ may be combined with each other to form a 5-, 6- or 7-membered ring, with the proviso that an S-triazine ring is not formed, in formula (A-II), X represents a heterocyclic group excluding an S-triazine ring, $R_{b1}$ represents an alkyl group, an alkenyl group or an aryl group, and X and $R_{b1}$ may be combined with each other to form a 5-, 6- or 7-membered ring, with the proviso that an S-triazine ring is not formed, and in formula (A-III), Y represents a nonmetallic atom group necessary for forming a 5-membered ring together with —N=C—, or Y represents a nonmetallic atom group necessary for forming a 6-membered ring together with —N=C—group and the end of the group represented by Y bonded to the carbon atom of the —N=C—group is a group selected from —N($R_{c1}$)—, —C($R_{c2}$)($R_{c3}$)—, —C($R_{c4}$)=, —O—and —S—, where the left hand site of each group is bonded to the carbon atom of —N=C—, with the proviso that an S-triazine ring is not formed, and $R_{c1}$, $R_{c2}$, $R_{c3}$ and $R_{c4}$ each represents a hydrogen atom or a substituent.

2. A silver halide photographic light-sensitive material as claimed in claim 1, wherein said substituent represented by $R_{c1}$, $R_{c2}$, $R_{c3}$ and $R_{c4}$ in formula (A-III) is an alkyl group, an alkenyl group, an aryl group, an alkoxy group, an aryloxy group, an alkylthio group, an arylthio group, an alkylamino group, an arylamino group or a halogen atom.

3. A silver halide photographic light-sensitive material as claimed in claim 1, wherein in formula (A-I), $R_{a2}$ represents a hydrogen atom, an alkyl group, an alkenyl group or an aryl group and $R_{a1}$ represents an acyl group, an alkylsulfonyl group, an arylsulfonyl group, an alkylsulfinyl group, an arylsulfinyl group, a carbamoyl group, a sulfamoyl group, an alkoxycarbonyl group or an aryloxycarbonyl group, in formula (A-II), $R_{b1}$ represents an alkyl group or an alkenyl group, and in formula (A-III), Y represents a nonmetallic atom group necessary for forming a 5-membered ring.

4. A silver halide photographic light-sensitive material as claimed in claim 3, wherein in formula (A-I), $R_{a2}$ represents an alkyl group or an alkenyl group and $R_{a1}$ represents an acyl group, an alkylsulfonyl group, an arylsulfonyl group, a carbamoyl group, a sulfamoyl group, an alkoxycarbonyl group or an aryloxycarbonyl group, in formula (A-II), $R_{b1}$ represents an alkyl group, and in formula (A-III), the atom at said end of Y bonded to the carbon atom of the —N=C—group is a nitrogen atom.

5. A silver halide photographic light-sensitive material as claimed in claim 1, wherein 65% or more of the entire projected area of all silver halide grains are tabular silver halide grains having an aspect ratio of 2.0 or more.

6. A silver halide photographic light-sensitive material as claimed in claim 5, wherein 80% or more of the entire projected area of all silver halide grains are tabular silver halide grains having an aspect ratio of 2.0 or more.

7. A silver halide photographic light-sensitive material as claimed in claim 1, wherein said desensitizer is at least one compound containing a metal atom belonging to Period 4, Period 5 or Period 6 of either Group 7, Group 8 or Group 9 and said metal ion is used as a dopant in an amount of from $10^{-17}$ to $10^{-3}$ mol per mol of silver halide.

8. A silver halide photographic light-sensitive material as claimed in claim 1, wherein a magnetic recording layer containing magnetic particles is provided on said support on the side opposite to the side having said emulsion layer.

9. A package of a light-sensitive material comprising a cartridge body rotatably housing a spool wound around by a photographic light-sensitive material having an emulsion layer on a support, a leading end of said photographic light-sensitive material being able to be freely delivered outside said cartridge by rotation of said spool, said cartridge body having a photographic light-sensitive material delivering passage with a light-shielding mechanism for delivering said photographic light-sensitive material, and said spool having a spool shaft having fixed to an inner side of respective edges thereof a pair of flanges each with a lip for holding said photographic light-sensitive material, wherein said photographic light-sensitive material comprises a support having thereon at least one light-sensitive silver halide emulsion layer and at least one light-insensitive layer, wherein at least one of said at least one light-sensitive silver halide emulsion layer is a light-sensitive silver halide emulsion layer containing a silver halide emulsion in which (1) 50% or more of the entire projected area of all silver halide grains are tabular silver halide grains having an aspect ratio of 2.0 or more and (2) a desensitizer selected from the group consisting of at least one compound containing a metal atom belonging to Period 4, Period 5 or Period 6 of either Group 7, Group 8 or Group 9 and desensitizing dyes is contained such that the emulsion containing the desensitizer has a sensitivity which is at least 0.15 less than that of an emulsion which is the same emulsion except for containing no desensitizer, and said light-sensitive material contains a compound represented by formula (A-I), (A-II) or (A-III):

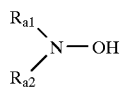

(A-I)

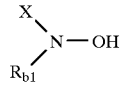

(A-II)

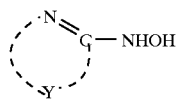

(A-III)

wherein in formula (A-I), $R_{a1}$ represents an alkyl group, an alkenyl group, an aryl group, an acyl group, an alkylsulfonyl group, an arylsulfonyl group, an alkylsulfinyl group, an arylsulfinyl group, a carbamoyl group, a sulfamoyl group, an alkoxycarbonyl group or an aryloxycarbonyl group, $R_{a2}$ represents a hydrogen atom or a group represented by $R_{a1}$, with the proviso that when $R_{a1}$ is an alkyl group, an alkenyl group or an aryl group, $R_{a2}$ is an acyl group, an alkylsulfonyl group, an arylsulfonyl group, an alkylsulfinyl group, an arylsulfinyl group, a carbamoyl group, a sulfamoyl group, an alkoxycarbonyl group or an aryloxycarbonyl group, and $R_{a1}$ and $R_{a2}$ may be combined with each other to form a 5-, 6- or 7-membered ring, with the proviso that an S-triazine ring is not formed, in formula (A-II), X represents a heterocyclic group excluding an S-triazine ring, $R_{b1}$ represents an alkyl group, an alkenyl group or an aryl group, and X and $R_{b1}$ may be combined with each other to form a 5-, 6- or 7-membered ring, with the proviso that an S-triazine ring is not formed, and in formula (A-III), Y represents a nonmetallic atom group necessary for forming a 5-membered ring together with —N=C—, or Y represents a nonmetallic atom group necessary for forming a 6-membered ring together with —N=C—group and the end of the group represented by Y bonded to the carbon atom of the —N=C—group is a group selected from —N($R_{c1}$)—, —C($R_{c2}$)($R_{c3}$)—, —C($R_{c4}$)=, —O— and —S—, where the left hand site of each group is bonded to the carbon atom or —N=C—, with the proviso that an S-triazine ring is not formed, and $R_{c1}$, $R_{c2}$, $R_{c3}$ and $R_{c4}$ each represents a hydrogen atom or a substituent.

10. A silver halide photographic light-sensitive material as claimed in claim 1, wherein said tabular silver halide grains have a circle-corresponding diameter of from 0.10 to 3 μm.

11. A silver halide photographic light-sensitive material as claimed in claim 1, wherein said tabular silver halide grains have a thickness of from 0.05 to 0.5 μm.

12. A silver halide photographic light-sensitive material as claimed in claim 10, wherein said tabular silver halide grains have a thickness of from 0.05 to 0.5 μm.

13. A silver halide photographic light-sensitive material as claimed in claim 1, wherein 50% or more by number of said silver halide grains have 10 or more dislocation lines per one grain.

14. A silver halide photographic light-sensitive material as claimed in claim 10, wherein 50% or more by number of said silver halide grains have 10 or more dislocation lines per one grain.

15. A silver halide photographic light-sensitive material as claimed in claim 11, wherein 50% or more by number of said silver halide grains have 10 or more dislocation lines per one grain.

16. A silver halide photographic light-sensitive material as claimed in claim 12, wherein 50% or more by number of said silver halide grains have 10 or more dislocation lines per one grain.

17. A silver halide photographic light-sensitive material as claimed in claim 1, wherein said desensitizer comprises at least one compound containing a metal atom belonging to Period 4, Period 5 or Period 6 of either Group 7, Group 8 or Group 9.

18. A package of a light-sensitive material as claimed in claim 9, wherein said desensitizer comprises at least one compound containing a metal atom belonging to Period 4, Period 5 or Period 6 of either Group 7, Group 8 or Group 9.

* * * * *